United States Patent
Nakashima et al.

(10) Patent No.: US 9,112,663 B2
(45) Date of Patent: Aug. 18, 2015

(54) WIRELESS COMMUNICATION SYSTEM, MOBILE STATION APPARATUS, BASE STATION APPARATUS, COMMUNICATION CONTROL METHOD AND INTEGRATED CIRCUIT

(75) Inventors: Daiichiro Nakashima, Osaka (JP); Shohei Yamada, Osaka (JP); Shoichi Suzuki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 275 days.

(21) Appl. No.: 13/498,554

(22) PCT Filed: Jul. 9, 2010

(86) PCT No.: PCT/JP2010/061705
§ 371 (c)(1),
(2), (4) Date: Apr. 5, 2012

(87) PCT Pub. No.: WO2011/036933
PCT Pub. Date: Mar. 31, 2011

(65) Prior Publication Data
US 2012/0182910 A1    Jul. 19, 2012

(30) Foreign Application Priority Data

Sep. 28, 2009  (JP) ................................. 2009-223434

(51) Int. Cl.
*H04W 72/04* (2009.01)
*H04L 5/00* (2006.01)
(Continued)

(52) U.S. Cl.
CPC ............. *H04L 5/0057* (2013.01); *H04L 5/0016* (2013.01); *H04W 8/24* (2013.01); *H04W 72/02* (2013.01)

(58) Field of Classification Search
CPC ... H04L 5/0057; H04L 5/0016; H04W 72/02; H04W 8/24
USPC ......................................................... 370/281
See application file for complete search history.

(56) References Cited

U.S. PATENT DOCUMENTS 7,292,862 B2 * 11/2007 Sumasu et al. ............. 455/452.2
8,295,778 B2 * 10/2012 Kotecha et al. ................ 455/69
(Continued)

FOREIGN PATENT DOCUMENTS

| CN | 1972515 A | 5/2007 |
|---|---|---|
| EP | 2 282 576 A1 | 2/2011 |
| KR | 10-2008-0089808 A | 10/2008 |

OTHER PUBLICATIONS

"3rd Generation Partnership Project; Technical Specification Group Radio Access Network; Evolved Universal Terrestrial Radio Access (E-UTRA); Physical layer procedures (Release 8);" 3GPP TS 36.213 V8.7.0 (May 2009).

(Continued)

*Primary Examiner* — Luat Phung
(74) *Attorney, Agent, or Firm* — Birch Stewart Kolasch & Birch, LLP

(57) ABSTRACT

To efficiently control channel quality indicators CQIs in response to a plurality of downlink component frequency bands in a wireless communication system using a plurality of component frequency bands, and enable a mobile station apparatus to suitably transmit signals including the channel quality indicators CQIs, the mobile station apparatus is provided with an uplink control data generation part 407 that generates a channel quality indicator in response to each of the downlink component frequency bands, an uplink control channel selection part 409 that selects a particular radio resource when a plurality of radio resources, which are beforehand allocated from the base station apparatus to transmit the channel quality indicator for each of the downlink component frequency bands, occurs in the same time frame, and a transmission processing part 405 that arranges the channel quality indicator generated in the uplink control data generation part 407 in the radio resource selected in the uplink control channel selection part 409 to transmit to the base station apparatus.

18 Claims, 26 Drawing Sheets

(51) Int. Cl.
*H04W 8/24* (2009.01)
*H04W 72/02* (2009.01)

(56) References Cited

U.S. PATENT DOCUMENTS

| 8,699,602 | B2 | 4/2014 | Chen et al. | |
|---|---|---|---|---|
| 2005/0058097 | A1* | 3/2005 | Kang et al. | 370/329 |
| 2005/0281221 | A1* | 12/2005 | Roh et al. | 370/328 |
| 2007/0115796 | A1 | 5/2007 | Jeong et al. | |
| 2007/0232341 | A1 | 10/2007 | Sakata | |
| 2008/0253336 | A1 | 10/2008 | Parkvall et al. | |
| 2009/0111480 | A1* | 4/2009 | Wu et al. | 455/452.2 |
| 2009/0154588 | A1 | 6/2009 | Chen et al. | |
| 2010/0105390 | A1* | 4/2010 | Ishii | 455/436 |
| 2011/0142144 | A1* | 6/2011 | Allpress et al. | 375/259 |
| 2011/0255629 | A1* | 10/2011 | Ko et al. | 375/285 |
| 2012/0134275 | A1* | 5/2012 | Choi et al. | 370/241 |
| 2012/0147831 | A1 | 6/2012 | Golitschek | |

OTHER PUBLICATIONS

"CQI-RS for LTE-Advanced", NEC Group, 3GPP TSG-RAN WG1 Meeting #56bis, R1-091221, Mar. 23-27, 2009.

"Updated Views on Support of Wider Bandwith in LTE-Advanced", NTT Docomo, Inc., 3GPP TSG RAN WG1 Meeting #54bis, R1-083677, Sep. 29-Oct. 3, 2008.

International Search Report for PCT/JP2010/061705 dated for Aug. 24, 2010.

CATT, "CQI Feedback for LTE-A", 15.4, 3GPP TSG RAN WG1 Meeting #58 R1-093538, Shenzhen, China, Aug. 24, 2009.

CMCC, "UL ACK/NACK and CQI Feedback in Carrier Aggregation", 15.4, 3GPP TSG RAN WG1 Meeting #58 R1-093269, Shenzhen, China, Aug. 24, 2009.

LG Electronics, "UCI Transmission in case of Transmit Power Limitation", 15.4, 3GPP TSG RAN WG1 #57bis R1-092502, Los Angeles, CA, USA, Jun. 29, 2009.

LG Electronics, "Uplink Control Channel Transmission for LTE-Advanced", 12.1, 3GPP TSG RAN WG1 #56 R1-090656, Athens, Greece, Feb. 9, 2009.

LG Electronics, "Uplink Transmission Under UE Transmit Power Limitation in LTE-Advanced", 15.4, 3GPP TSG RAN WG1 #58 R1-093250, Shenzhen, China, Aug. 24-28, 2009.

QUALCOMM Europe, "CQI Feedback for Multicarrier Operation", 15.4, 3GPP TSG RAN WG1 #57bis R1-092708, Jun. 29, 2009, Los Angeles, USA.

Nokia Siemens Networks, Nokia, "Primary Component Carrier Selection, Monitoring, and Recovery", 3GPP TSG RAN WG1 #57 Meeting, US, San Francisco, May 4-8, 2009, R1-091779, 6 pages.

* cited by examiner

FIG.10

| DOWNLINK COMPONENT FREQUENCY BAND | FIRST DOWNLINK COMPONENT FREQUENCY BAND | SECOND DOWNLINK COMPONENT FREQUENCY BAND | THIRD DOWNLINK COMPONENT FREQUENCY BAND |
|---|---|---|---|
| PRIORITY | FIRST | SECOND | THIRD |

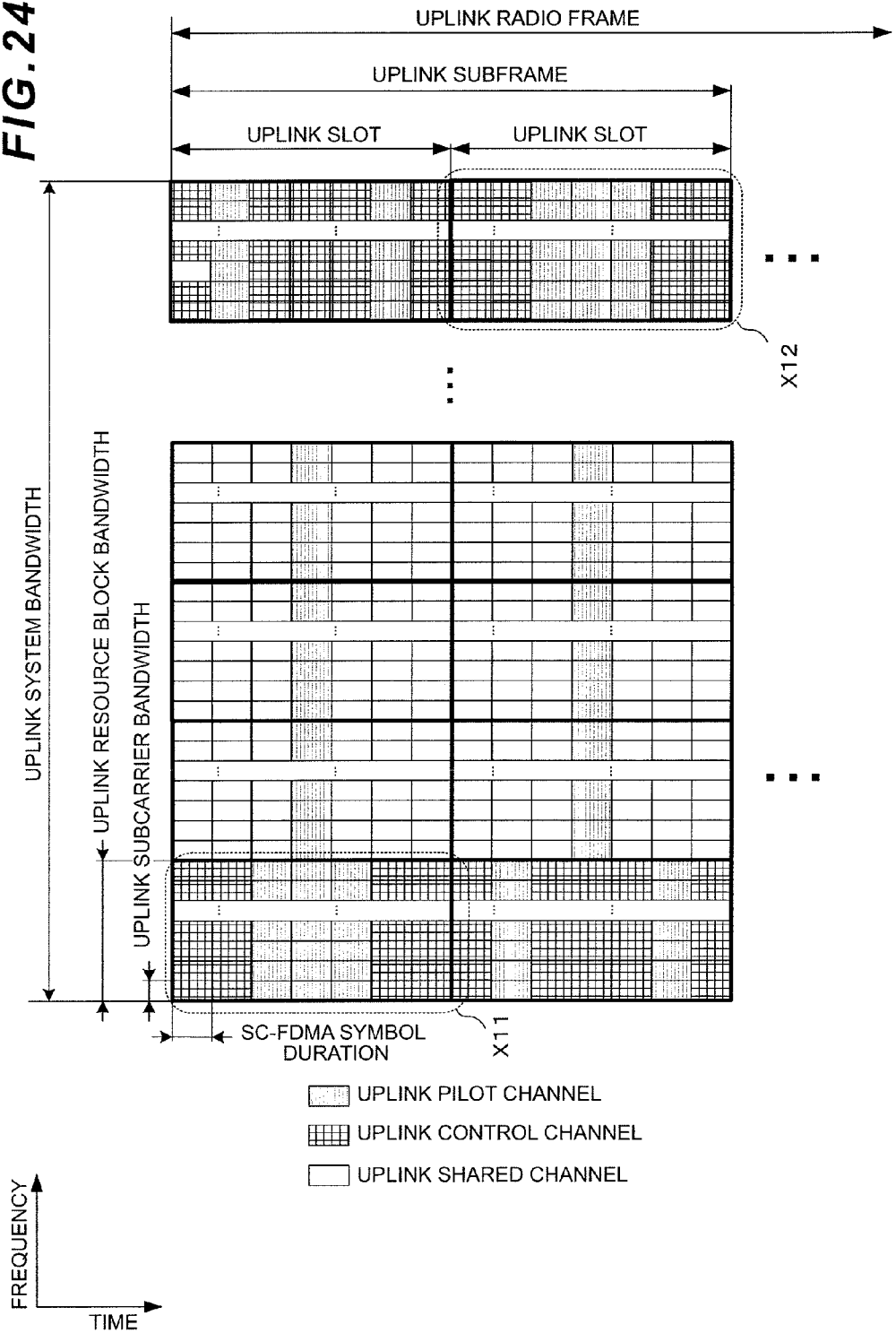

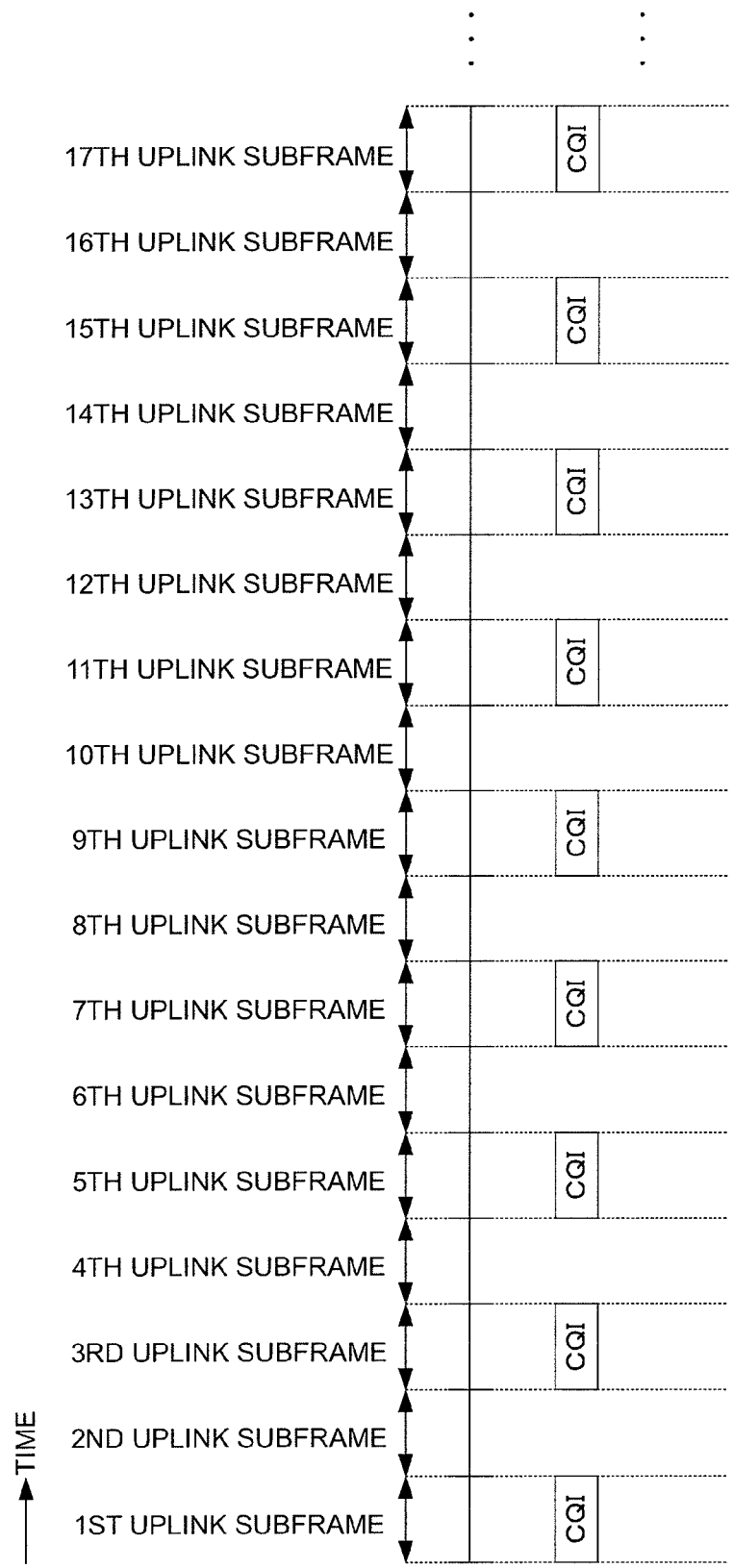

WIRELESS COMMUNICATION SYSTEM, MOBILE STATION APPARATUS, BASE STATION APPARATUS, COMMUNICATION CONTROL METHOD AND INTEGRATED CIRCUIT

TECHNICAL FIELD

The present invention relates to a wireless communication system, mobile station apparatus, base station apparatus, communication control method and control program for efficiently controlling channel quality indicators CQIs in response to a plurality of downlink component frequency bands in a wireless communication system using a plurality of component frequency bands and enabling a mobile station apparatus to suitably transmit signals including the channel quality indicators CQIs.

BACKGROUND ART

<Channel Quality Indicator (CQI)>

Described below is the channel quality indicator CQI in EUTRA (Evolved Universal Terrestrial Radio Access; hereinafter, referred to as "EUTRA"). The channel quality indicator CQI is a measurement result of channel quality measured by a mobile station apparatus using a downlink reference signal of a downlink pilot channel received from a base station apparatus, and is information indicative of channel quality of a downlink system band for each mobile station apparatus. For example, information, which is indicative of modulation scheme-coding rate considered suitable for the downlink shared channel based on the measured quality information, is configured as the channel quality indicator CQI. More specifically, on the condition that the error rate of information data arranged on the downlink shared channel does not exceed 0.1, information indicative of a combination of modulation scheme and coding rate with the highest communication efficiency is configured as the channel quality indicator CQI.

The mobile station apparatus periodically transmits the channel quality indictor CQI to the base station apparatus, using an uplink control channel beforehand assigned from the base station apparatus. In addition, in starting communication connection with a mobile station apparatus, the base station apparatus allocates periodical radio resources (hereinafter, CQI arrangement-capable control channels) for the mobile station apparatus to arrange the channel quality indicator CQI. In addition, herein, the radio resources indicate radio resources comprised of a predetermined frequency band and time band. In addition, code multiplexing is also applied to the uplink control channel for arranging the channel quality indicator CQI in EUTRA, but is omitted herein, for convenience in description.

Using the channel quality indicator CQI received from the mobile station apparatus, the base station apparatus performs radio resource allocation (frequency scheduling) of a downlink shared channel to the mobile station apparatus, and selection of the modulation scheme and coding rate (adaptive modulation and coding) of the downlink shared channel. For example, the base station apparatus assigns the downlink shared channel to a downlink resource block of good channel quality indicator CQI for the mobile station apparatus. Further, the base station apparatus sets the modulation scheme of the downlink shared channel from among QPSK (Quadrature Phase Shift Keying), 16 QAM (16 Quadrature Amplitude Modulation), and 64 QAM (64 Quadrature Amplitude Modulation), corresponding to the channel quality indicator CQI.

<Component Frequency Band>

Meanwhile, 3GPP (3rd Generation Partnership Project) has started studies of the 4th Generation (hereinafter, referred to as "4G") radio access scheme (Advanced EUTRA; hereinafter, referred to as "A-EUTRA") and 4G network (Advanced EUTRAN) of cellular mobile communications.

In A-EUTRA, it is studied supporting wider frequency bands than EUTRA, and ensuring compatibility with EUTRA. Therefore, in A-EUTRA, studied are techniques (referred to as Spectrum aggregation or Carrier aggregation) that the base station apparatus performs communications using a system band comprised of a plurality of component frequency bands with a frequency band of EUTRA regarded as a single unit (component frequency band) (in addition, the component frequency band is sometimes referred to as a carrier component or component carrier.) (Non-patent Document 1) In the techniques, the base station apparatus performs communications with a mobile station apparatus supporting EUTRA using any one of component frequency bands in each of uplink and downlink, while performing communications with a mobile station apparatus supporting A-EUTRA using one or more component frequency bands in each of uplink and downlink.

PRIOR ART DOCUMENT

Non-Patent Document

Non-patent Document 1: 3GPP TSG RAN1 #54bis, Prague, Czech Republic 29-3 September, 2008, R1-083677 "Updated Views on Support of Wider Bandwidth in LTE-Advanced"

DISCLOSURE OF INVENTION

Problems to be Solved by the Invention

Also in A-EUTRA in the case of using a plurality of component frequency bands, it is required applying frequency scheduling, adaptive modulation and coding, and actualizing high throughput and high-speed communications. For the actualization, also in A-EUTRA using a plurality of component frequency bands, it is necessary to configure the channel quality indicator CQI in response to each downlink component frequency band between the base station apparatus and mobile station apparatus. In other words, in order for the mobile station apparatus to transmit the channel quality indicator in response to each downlink component frequency band, the base station apparatus needs to assign the position of radio resources of the uplink control channel and the cycle of radio resources for each downlink component frequency band.

However, depending on settings of the base station apparatus on the cycle of radio resources of the uplink control channel to transmit each channel quality indicator CQI, and the position of the uplink subframe to start allocation of radio resources, the case occurs that a plurality of uplink control channels is concurrently arranged in the same uplink subframe, and the transmission signal becomes a multicarrier signal. In the mobile station apparatus, the need arises for setting the transmission power at a lower value than in the case of transmitting a single-carrier signal so that the power is an input level that the power amplifier is capable of supporting in consideration of increases in PAPR (Peak-to-Average Power Ratio), and it is difficult for mobile station apparatus limited in power to transmit signals to meet the required quality.

The present invention was made in view of such circumstances, and it is an object of the invention to provide a wireless communication system, mobile station apparatus, base station apparatus, communication control method and control program for efficiently controlling channel quality indicators CQIs in response to a plurality of downlink component frequency bands in a wireless communication system using a plurality of component frequency bands and enabling a mobile station apparatus to suitably transmit signals including the channel quality indicators CQIs.

Means for Solving the Problem (1) To attain the above-mentioned object, the invention took measures as described below. That is, a wireless communication system of the invention is a wireless communication system comprised of a mobile station apparatus that receives signals transmitted from a base station apparatus using a plurality of downlink component frequency bands each having a beforehand determined frequency bandwidth, and the base station apparatus that receives a signal transmitted from the mobile station apparatus using one or more uplink component frequency bands each having a beforehand determined frequency bandwidth, and is characterized in that the base station apparatus is provided with a reception processing part that receives a signal including a channel quality indicator indicative of channel quality of a downlink component frequency band transmitted from the mobile station apparatus, and that the mobile station apparatus is provided with an uplink control data generation part that generates a channel quality indicator in response to each of the downlink component frequency bands, an uplink control channel selection part that selects a particular radio resource when a plurality of radio resources, which are beforehand allocated from the base station apparatus to transmit the channel quality indicator for each of the downlink component frequency bands, occurs in the same time frame, and a transmission processing part that arranges the channel quality indicator generated in the uplink control data generation part in the radio resource selected in the uplink control channel selection part to transmit to the base station apparatus.

Thus, when a plurality of radio resources, which are beforehand allocated from the base station apparatus to transmit the channel quality indicator for each of the downlink component frequency bands, occurs in the same time frame, the mobile station apparatus selects a particular radio resource. Therefore, when a plurality of radio resources of uplink control channels to transmit the channel quality indicator CQI for each of the downlink component frequency bands occurs in the same uplink subframe, by selecting a particular radio resource, it is possible to maintain the single-carrier attribute of transmission signal, and mobile station apparatuses limited in power are capable of transmitting signals to meet the required quality.

(2) Further, in the wireless communication system of the invention, it is a feature that the uplink control channel selection part selects a radio resource allocated to transmit a channel quality indicator of a downlink component frequency band of high priority based on information indicative of priorities for each of the downlink component frequency bands, and that the transmission processing part transmits the channel quality indicator of the downlink component frequency band of high priority.

Thus, the mobile station apparatus selects the radio resource allocated to transmit the channel quality indicator of the downlink component frequency band of high priority based on the information indicative of priorities for each of the downlink component frequency bands, and therefore, preferentially transmits the channel quality indicator CQI of the downlink component frequency band of high priority to the base station apparatus, and the base station apparatus is capable of performing suitable scheduling on the downlink component frequency band of high priority in scheduling, using the channel quality indicator CQI.

(3) Furthermore, in the wireless communication system of the invention, it is a feature that the uplink control data generation part generates acknowledgement/negative-acknowledgment in response to data received in the downlink component frequency band, the uplink control selection part selects a radio resource allocated to an uplink component frequency band used in transmitting the acknowledgment/negative-acknowledgment when the uplink control data generation part generates the acknowledgement/negative-acknowledgment, and that the transmission processing part arranges the acknowledgement/negative-acknowledgment and the channel quality indicator in the radio resource selected in the uplink control channel selection part to transmit to the base station apparatus.

Thus, the mobile station apparatus arranges the acknowledgement/negative-acknowledgment and the channel quality indicator in the selected radio resource to transmit to the base station apparatus, and is capable of transmitting the acknowledgement/negative-acknowledgment ACK/NACK with a higher priority than the channel quality indicator CQI, and the base station apparatus is capable of achieving suitable retransmission control of the downlink shared channel.

(4) Still furthermore, in the wireless communication system of the invention, it is a feature that the uplink control channel selection part selects a radio resource allocated to transmit the channel quality indicator of a downlink component frequency band in which is arranged information indicative of an uplink component frequency band used in transmitting the acknowledgement/negative-acknowledgment.

Thus, the mobile station apparatus selects the radio resource allocated to transmit the channel quality indicator of the downlink component frequency band in which is arranged the information indicative of an uplink component frequency band used in transmitting acknowledgement/negative-acknowledgment, and therefore, when a plurality of control channels to transmit the channel quality indicator CQI is set in the uplink component frequency band assigned the radio resource of the uplink control channel to transmit acknowledgement/negative-acknowledgment ACK/NACK, the base station apparatus is capable of instantaneously selecting the downlink component frequency band such that the base station apparatus wants the mobile station apparatus to transmit the channel quality indicator CQI.

(5) Moreover, in the wireless communication system of the invention, the mobile station apparatus is characterized by further having a channel quality indicator change part that changes content indicated by the channel quality indicator corresponding to either the case where a plurality of radio resources, which are beforehand allocated from the base station apparatus to transmit the channel quality indicator for each of the downlink component frequency bands, occurs in the same time frame, or the case where a plurality of radio resources does not occur.

Thus, the mobile station apparatus changes content indicated by the channel quality indicator corresponding to either the case where a plurality of radio resources, which are beforehand allocated to from the base station apparatus transmit the channel quality indicator for each of the downlink component frequency bands, occurs in the same time frame, or the case where a plurality of radio resources does not occur.

Therefore, the mobile station apparatus is capable of transmitting the channel quality indicator CQI of different meaning without changing the number of bits of the channel quality indicator CQI in the case where a plurality of radio resources of uplink control channels to transmit the channel quality indicator CQI for each of the downlink component frequency bands occurs in the same uplink subframe, and in the case such radio resources do not occur.

(6) Further, in the wireless communication system of the invention, the channel quality indicator change part is characterized by changing the content indicated by the channel quality indicator by changing a bandwidth of a frequency band targeted for indication of the channel quality.

Thus, since the base station apparatus changes a bandwidth of a frequency band targeted for indication of the channel quality, the base station apparatus is capable of receiving the suitable channel quality indicator CQI from the mobile station apparatus when the base station apparatus wants the channel quality indicator CQI associated with all the downlink component frequency bands more than the channel quality indicator CQI associated with a particular downlink component frequency band, and is capable of performing radio resource allocation and determination of modulation scheme and coding rate of the downlink shared channel for a plurality of downlink component frequency bands.

(7) Furthermore, in the wireless communication system of the invention, it is a feature that the bandwidth of the frequency band is divided into a plurality of sub-bands each comprised of a predetermined frequency bandwidth, the uplink control data generation part generates a channel quality indicator of a sub-band with the most excellent channel quality, and that the channel quality indicator change part changes the frequency bandwidth of the sub-band.

Thus, since the mobile station apparatus changes the frequency bandwidth of the sub-band, it is possible to transmit the channel quality indicator CQI of different meaning without changing the number of bits of the channel quality indicator CQI in the case where a plurality of radio resources of uplink control channels to transmit the channel quality indicator CQI for each of the downlink component frequency bands occurs in the same uplink subframe, and in the case such radio resources do not occur.

(8) Still furthermore, in the wireless communication system of the invention, it is a feature that the uplink control channel selection part selects a radio resource allocated to transmit the channel quality indicator indicative of the most excellent channel quality among channel quality indicators for each of the downlink component frequency bands generated in the uplink control data generation part, and that the transmission processing part transmits the channel quality indicator of the downlink component frequency band with the most excellent channel quality.

Thus, since the mobile station apparatus selects a radio resource allocated to transmit the channel quality indicator indicative of the most excellent channel quality among channel quality indicators for each of the downlink component frequency bands, it is possible to maintain the single-carrier attribute of transmission signal, and mobile station apparatuses limited in power are capable of transmitting signals to meet the required quality. Further, the base station apparatus receives the channel quality indicator CQI of the downlink component frequency band with the good channel quality from the mobile station apparatus, and therefore, is capable of obtaining the maximum gain of frequency scheduling and the maximum gain of adaptive modulation.

(9) Moreover, in the wireless communication system of the invention, the base station apparatus is characterized by having a radio resource control part that sets priorities related to selection of radio resources to transmit the channel quality indicator, for each of the downlink component frequency bands, and a base-station side transmission processing part that transmits information indicative of the priorities set in the radio resource control part to the mobile station apparatus.

Thus, since the base station apparatus transmits the information indicative of the priorities to the mobile station apparatus, the mobile station apparatus preferentially transmits the channel quality indicator CQI of the downlink component frequency band of high priority to the base station apparatus, and the base station apparatus is capable of performing suitable scheduling on the downlink component frequency band of high priority in scheduling, using the channel quality indicator CQI.

(10) Further, a mobile station apparatus of the invention is a mobile station apparatus that receives signals transmitted from a base station apparatus using a plurality of downlink component frequency bands each having a beforehand determined frequency bandwidth, and is characterized by having an uplink control data generation part that generates a channel quality indicator indicative of channel quality in response to each of the downlink component frequency bands, an uplink control channel selection part that selects a particular radio resource when a plurality of radio resources, which are beforehand allocated from the base station apparatus to transmit the channel quality indicator for each of the downlink component frequency bands, occurs in the same time frame, and a transmission processing part that arranges the channel quality indicator generated in the uplink control data generation part in the radio resource selected in the uplink control channel selection part to transmit to the base station apparatus.

Thus, when a plurality of radio resources, which are beforehand allocated from the base station apparatus to transmit the channel quality indicator for each of the downlink component frequency bands, occurs in the same time frame, the mobile station apparatus selects a particular radio resource. Therefore, when a plurality of radio resources of uplink control channels to transmit the channel quality indicator CQI for each of the downlink component frequency bands occurs in the same uplink subframe, by selecting a particular radio resource, it is possible to maintain the single-carrier attribute of transmission signal, and mobile station apparatuses limited in power are capable of transmitting signals to meet the required quality.

(11) Furthermore, a mobile station apparatus of the invention is a mobile station apparatus that receives signals transmitted from a base station apparatus using a plurality of downlink component frequency bands each having a beforehand determined frequency bandwidth, and is characterized by having an uplink control data generation part that generates a channel quality indicator indicative of channel quality in response to each of the downlink component frequency bands, an uplink control channel selection part that selects a radio resource allocated to transmit a channel quality indicator of a downlink component frequency band of high priority based on information indicative of priorities for each of the downlink component frequency bands when a plurality of radio resources, which are beforehand allocated from the base station apparatus to transmit the channel quality indicator for each of the downlink component frequency bands, occurs in the same time frame, and a transmission processing part that arranges the channel quality indicator generated in the uplink control data generation part in the radio resource, allocated to transmit the channel quality indicator of the downlink component frequency band of high priority, selected in the uplink control channel selection part and that transmits the channel quality indicator to the base station apparatus.

Thus, since the mobile station apparatus arranges the generated channel quality indicator in the selected radio resource allocated to transmit the channel quality indicator of the downlink component frequency band of high priority, and transmits the channel quality indicator to the base station apparatus, when a plurality of radio resources of uplink control channels to transmit the channel quality indicator CQI for each of the downlink component frequency bands occurs in the same uplink subframe, by selecting a particular radio resource, it is possible to maintain the single-carrier attribute of transmission signal, and mobile station apparatuses limited in power are capable of transmitting signals to meet the required quality. Further, the mobile station apparatus preferentially transmits the channel quality indicator CQI of the downlink component frequency band of high priority to the base station apparatus, and the base station apparatus is capable of performing suitable scheduling on the downlink component frequency band of high priority in scheduling, using the channel quality indicator CQI.

(12) Further, a base station apparatus of the invention is a base station apparatus that receives a signal transmitted from a mobile station apparatus using one or more uplink component frequency bands each having a beforehand determined frequency bandwidth, and is characterized by having a reception processing part that receives a signal including a channel quality indicator indicative of channel quality of a downlink component frequency band transmitted from the mobile station apparatus, a radio resource control part that sets priorities related to selection of radio resources to transmit the channel quality indicator, for each of the downlink component frequency bands, and a base-station side transmission processing part that transmits information indicative of the priorities set in the radio resource control part to the mobile station apparatus.

Thus, since the base station apparatus transmits the information indicative of the priorities to the mobile station apparatus, the mobile station apparatus preferentially transmits the channel quality indicator CQI of the downlink component frequency band of high priority to the base station apparatus, and the base station apparatus is capable of performing suitable scheduling on the downlink component frequency band of high priority in scheduling, using the channel quality indicator CQI.

(13) Furthermore, a communication control method of the invention is a communication control method of a wireless communication system comprised of a mobile station apparatus that receives signals transmitted from a base station apparatus using a plurality of downlink component frequency bands each having a beforehand determined frequency bandwidth, and the base station apparatus that receives a signal transmitted from the mobile station apparatus using one or more uplink component frequency bands each having a beforehand determined frequency bandwidth, and is characterized by including at least the steps of, in the mobile station apparatus, generating a channel quality indicator in response to each of the downlink component frequency bands, selecting a particular radio resource when a plurality of radio resources, which are beforehand allocated from the base station apparatus to transmit the channel quality indicator for each of the downlink component frequency bands, occurs in the same time frame, and arranging the generated channel quality indicator in the selected radio resource to transmit to the base station apparatus, and in the base station apparatus, receiving a signal including the channel quality indicator indicative of channel quality of a downlink component frequency band transmitted from the mobile station apparatus.

Thus, when a plurality of radio resources, which are beforehand allocated from the base station apparatus to transmit the channel quality indicator for each of the downlink component frequency bands, occurs in the same time frame, the mobile station apparatus selects a particular radio resource. Therefore, when a plurality of radio resources of uplink control channels to transmit the channel quality indicator CQI for each of the downlink component frequency bands occurs in the same uplink subframe, by selecting a particular radio resource, it is possible to maintain the single-carrier attribute of transmission signal, and mobile station apparatuses limited in power are capable of transmitting signals to meet the required quality.

(14) Still furthermore, a communication control method of the invention is a communication control method of a wireless communication system comprised of a mobile station apparatus that receives signals transmitted from a base station apparatus using a plurality of downlink component frequency bands each having a beforehand determined frequency bandwidth, and the base station apparatus that receives a signal transmitted from the mobile station apparatus using one or more uplink component frequency bands each having a beforehand determined frequency bandwidth, and is characterized by including at least the steps of, in the base station apparatus, setting priorities related to on selection of radio resources to transmit a channel quality indicator indicative of channel quality of a downlink component frequency band, for each of the downlink component frequency bands, and transmitting information indicative of the set priorities to the mobile station apparatus, and in the mobile station apparatus, generating a channel quality indicator in response to each of the downlink component frequency bands, selecting a radio resource allocated to transmit a channel quality indicator of a downlink component frequency band of high priority based on the information indicative of the priorities for each of the downlink component frequency bands when a plurality of radio resources, which are beforehand allocated from the base station apparatus to transmit the channel quality indicator for each of the downlink component frequency bands, occurs in the same time frame, and arranging the generated channel quality indicator in the selected radio resource allocated to transmit the channel quality indicator of the downlink component frequency band of high priority to transmit to the base station apparatus.

Thus, when a plurality of radio resources, which are beforehand allocated from the base station apparatus to transmit the channel quality indicator for each of the downlink component frequency bands, occurs in the same time frame, the mobile station apparatus selects a radio resource allocated to transmit the channel quality indicator of the downlink component frequency band of high priority based on the information indicative of the priorities for each of the downlink component frequency bands. Therefore, when a plurality of radio resources of uplink control channels to transmit the channel quality indicator CQI for each of the downlink component frequency bands occurs in the same uplink subframe, by selecting a particular radio resource, it is possible to maintain the single-carrier attribute of transmission signal, and mobile station apparatuses limited in power are capable of transmitting signals to meet the required quality. Further, the mobile station apparatus preferentially transmits the channel quality indicator CQI of the downlink component frequency band of high priority to the base station apparatus, and the base station apparatus is capable of performing suitable scheduling on the downlink component frequency band of high priority in scheduling, using the channel quality indicator CQI.

(15) Further, a control program of the invention is a control program in a mobile station apparatus that receives signals transmitted from a base station apparatus using a plurality of downlink component frequency bands each having a beforehand determined frequency bandwidth, and is characterized by making a series of processing computer readable and executable commands where the processing includes the processing of generating a channel quality indicator indicative of channel quality in response to each of the downlink component frequency bands in an uplink control data generation part, the processing of selecting a particular radio resource in an uplink control channel selection part when a plurality of radio resources, which are beforehand allocated from the base station apparatus to transmit the channel quality indicator for each of the downlink component frequency bands, occurs in the same time frame, and the transmission processing of arranging the channel quality indicator generated in the uplink control data generation part in the radio resource selected in the uplink control channel selection part to transmit to the base station apparatus in a transmission processing part.

Thus, when a plurality of radio resources, which are beforehand allocated from the base station apparatus to transmit the channel quality indicator for each of the downlink component frequency bands, occurs in the same time frame, the mobile station apparatus selects a particular radio resource. Therefore, when a plurality of radio resources of uplink control channels to transmit the channel quality indicator CQI for each of the downlink component frequency bands occurs in the same uplink subframe, by selecting a particular radio resource, it is possible to maintain the single-carrier attribute of transmission signal, and mobile station apparatuses limited in power are capable of transmitting signals to meet the required quality.

(16) Furthermore, a control program of the invention is a control program in a mobile station apparatus that receives signals transmitted from a base station apparatus using a plurality of downlink component frequency bands each having a beforehand determined frequency bandwidth, and is characterized by making a series of processing computer readable and executable commands where the processing includes the processing of generating a channel quality indicator in response to each of the downlink component frequency bands in an uplink control data generation part, the processing of selecting a radio resource allocated to transmit a channel quality indicator of a downlink component frequency band of high priority based on information indicative of priorities for each of the downlink component frequency bands in an uplink control channel selection part when a plurality of radio resources, which are beforehand allocated from the base station apparatus to transmit the channel quality indicator for each of the downlink component frequency bands, occurs in the same time frame, and the processing of arranging the channel quality indicator generated in the uplink control data generation part in the radio resource, allocated to transmit the channel quality indicator of the downlink component frequency band of high priority, selected in the uplink control channel selection part and transmitting the channel quality indicator to the base station apparatus in a transmission processing part.

Thus, when a plurality of radio resources, which are beforehand allocated from the base station apparatus to transmit the channel quality indicator for each of the downlink component frequency bands, occurs in the same time frame, the mobile station apparatus selects a radio resource allocated to transmit the channel quality indicator of the downlink component frequency band of high priority based on the information indicative of priorities for each of the downlink component frequency bands. Therefore, when a plurality of radio resources of uplink control channels to transmit the channel quality indicator CQI for each of the downlink component frequency bands occurs in the same uplink subframe, by selecting a particular radio resource, it is possible to maintain the single-carrier attribute of transmission signal, and mobile station apparatuses limited in power are capable of transmitting signals to meet the required quality. Further, the mobile station apparatus preferentially transmits the channel quality indicator CQI of the downlink component frequency band of high priority to the base station apparatus, and the base station apparatus is capable of performing suitable scheduling on the downlink component frequency band of high priority in scheduling, using the channel quality indicator CQI.

(17) Still furthermore, a control program of the invention is a control program in a base station apparatus that receives a signal transmitted from a mobile station apparatus using one or more uplink component frequency bands each having a beforehand determined frequency bandwidth, and is characterized by making a series of processing computer readable and executable commands where the processing includes the processing of receiving a signal including a channel quality indicator indicative of channel quality of a downlink component frequency band transmitted from the mobile station apparatus in a reception processing part, the processing of setting priorities related to selection of radio resources to transmit the channel quality indicator indicative of channel quality of a downlink component frequency band, for each of the downlink component frequency bands in a radio resource control part, and the processing of transmitting information indicative of the priorities set in the radio resource control part to the mobile station apparatus in a base-station side transmission processing part.

Thus, since the base station apparatus transmits the information indicative of the priorities to the mobile station apparatus, the mobile station apparatus preferentially transmits the channel quality indicator CQI of the downlink component frequency band of high priority to the base station apparatus, and the base station apparatus is capable of performing suitable scheduling on the downlink component frequency band of high priority in scheduling, using the channel quality indicator CQI.

Advantageous Effect of the Invention

According to the present invention, in a wireless communication system using a plurality of component frequency bands, it is possible to efficiently control channel quality indicators CQIs in response to a plurality of downlink component frequency bands, and the mobile station apparatus is capable of suitably transmitting a signal including the channel quality indicator CQI. By this means, the mobile station apparatus is capable of maintaining the single-carrier attribute of transmission signal, and mobile station apparatuses limited in power are capable of transmitting signals to meet the required quality.

BRIEF DESCRIPTION OF DRAWINGS

FIG. 10 is a diagram showing an example of priorities of channel quality indicators CQIs for each downlink component frequency band in Embodiment 1 of the invention;

FIG. 24 is a diagram illustrating a schematic configuration of an uplink radio frame from a mobile station apparatus to a base station apparatus according to conventional techniques; and FIG. 25 is a schematic diagram showing an example of assignment in the time domain of CQI arrangement-capable control channels according to conventional techniques.

BEST MODE FOR CARRYING OUT THE INVENTION

Figure 1:
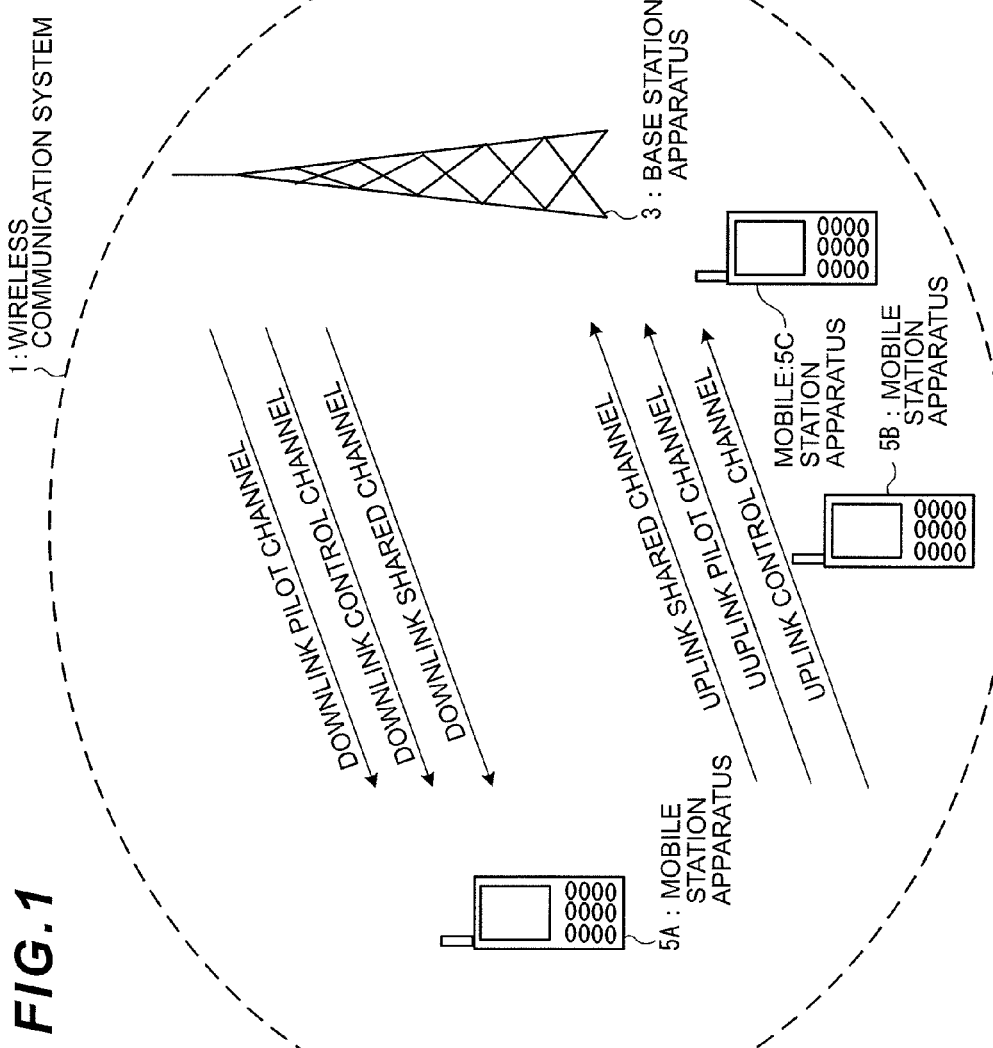
FIG. 1 is a diagram to explain the outline of the whole aspect of a wireless communication system according to Embodiments of the invention.

As the third-generation (3G) radio access scheme of cellular mobile communications, the W-CDMA (Wideband Code Division Multiple Access) scheme is standardized in 3GPP, and cellular mobile communications service by the scheme has been started. Further, in 3GPP are studied evolution (EUTRA) of 3G and evolution (Evolved Universal Terrestrial Radio Access Network) of 3G network.

In downlink that is the communication direction from a base station apparatus to a mobile station apparatus in EUTRA, the OFDM (Orthogonal Frequency Division Multiplexing) scheme that is multicarrier transmission is applied. Further, in uplink that is the communication direction from the mobile station apparatus to the base station apparatus in EUTRA, the DFT (Discrete Fourier Transform)-Spread OFDM scheme that is single-carrier transmission is applied.

<Uplink Channel Configuration>

A schematic configuration of an uplink radio frame in EUTRA will be described below. FIG. 24 is a illustrating a schematic configuration of an uplink radio frame from a mobile station apparatus to a base station apparatus according to conventional techniques. In this figure, the horizontal axis represents the time domain, and the vertical axis represents the frequency domain. An uplink radio frame is comprised of an uplink resource block pair (time-frequency band). The uplink resource block pair is a radio resource allocation unit for each mobile station apparatus, and is comprised of a frequency band and a time band each with a beforehand determined width. One uplink resource block pair is comprised of two uplink resource blocks that are contiguous in the time domain. Further, in this figure, one uplink resource block is comprised of 12 uplink subcarriers in the frequency domain, while being comprised of 7 SC-FDMA symbols (Single Carrier-Frequency Division Multiple Access) in the time domain. The uplink system bandwidth is a communication bandwidth in uplink of the base station apparatus.

Further, in FIG. 24, in the time domain, there are uplink slots each comprised of 7 SC-FDMA symbols, an uplink subframe comprised of 2 uplink slots, and an uplink radio frame comprised of 10 uplink subframes. In addition, in the time-axis direction, one uplink subframe is a time frame that is a unit in the time-axis direction of radio resource allocation to each mobile station apparatus in uplink. Further, a unit comprised of one uplink subcarrier and one SC-FDMA symbol is referred to as an uplink resource element. In addition, in the uplink radio frame, a plurality of uplink resource blocks is arranged corresponding to the uplink system bandwidth.

At least uplink shared channels used in transmission of information data and uplink control channels used in transmission of control data are arranged in each uplink subframe. In FIG. 24, each white region represents an uplink shared channel, and a region hatched in a lattice shape represents an uplink control channel. In addition, in this figure, each region hatched by vertical lines represents an uplink pilot channel. On the uplink control channel, a control data signal comprised of any one of a channel quality indicator CQI of downlink, acknowledgement/negative-acknowledgment ACK/NACK in response to a downlink shared channel, and scheduling request SR is arranged in one uplink resource block pair and is transmitted. Details of the channel quality indicator CQI of downlink and acknowledgement/negative-acknowledgment ACK/NACK will be described later.

Further, the uplink resource block pair used in the uplink control channel is an uplink resource block pair at opposite ends of the band of the uplink system bandwidth, and is comprised of uplink resource blocks in the symmetry relationship in the frequency domain. For example, in FIG. 24, uplink resource blocks X11, X12 are combined and form a single uplink resource block pair.

<Acknowledgement/Negative-Acknowledgment ACK/NACK>

Acknowledgement/negative-acknowledgment ACK/NACK in EUTRA will be described below. Acknowledgement/negative-acknowledgment ACK/NACK in uplink is information indicative of an error result of data arranged in the downlink shared channel received from the base station apparatus in the mobile station apparatus, and indicates acknowledgement ACK when the data decoded in the mobile station apparatus does not have any error, while indicating negative-acknowledgment NACK when the data decoded in the mobile station has some error. The mobile station apparatus transmits acknowledgement/negative-acknowledgment ACK/NACK using radio resources of the uplink control channel beforehand associated with radio resources used in the downlink control channel including radio resource allocation information of the downlink shared channel. In addition, code multiplexing is also used in the uplink control channel to arrange acknowledgement/negative-acknowledgment ACK/NACK in EUTRA, but is omitted herein for convenience in description.

The base station apparatus controls retransmission of the downlink shared channel to the mobile station apparatus, using acknowledgement/negative-acknowledgment ACK/NACK received from the mobile station apparatus. When the base station apparatus detects acknowledgement ACK as acknowledgement/negative-acknowledgment ACK/NACK, the base station apparatus recognizes that there is no error in the data which is decoded in the mobile station apparatus from the downlink shared channel transmitted from the base station apparatus, and makes preparations for transmitting new data. Meanwhile, when the base station apparatus detects negative-acknowledgement NACK as acknowledgement/negative-acknowledgment ACK/NACK, the base station apparatus recognizes that there is some error in the data which is decoded in the mobile station apparatus from the downlink shared channel transmitted from the base station apparatus, and makes preparations for retransmitting the transmitted data. Described below is the assignment method of CQI arrangement-capable control channels.

FIG. 25 is a schematic diagram showing an example of assignment in the time domain of CQI arrangement-capable control channels according to conventional techniques. This figure is a diagram showing the time domain on an uplink subframe basis of FIG. 25, and the horizontal axis represents time. In FIG. 25, each rectangle provided with characters CQI represents a CQI arrangement-capable control channel. This figure shows that the base station apparatus assigns a CQI arrangement-capable control channel every two uplink subframes (first, third, fifth, seventh . . . uplink subframes) to the mobile station apparatus.

<Concurrent Occurrence of Channel Quality Indicator CQI and Acknowledgement/Negative-Acknowledgment ACK/NACK>

In addition, to prevent the PAPR of transmission power of the mobile station apparatus from increasing in conventional wireless communication systems, it is required to ensure single-carrier (for example, DFT-Spread OFDM scheme) (hereinafter, referred to as a single-carrier attribute) in uplink. If the mobile station apparatus arranges two or more control data signals (for example, channel quality indicator CQI and acknowledgement/negative-acknowledgment ACK/NACK) in radio resources of a plurality of uplink control channels in one uplink subframe and transmits the signals, the transmission signal is of multicarrier signal, and the PAPR increases.

Therefore, in the case of transmitting the channel quality indicator CQI, when acknowledgement/negative-acknowledgment ACK/NACK is also arranged in an uplink subframe with the channel quality indicator CQI arranged therein, the mobile station apparatus uses radio resources of the uplink control channel assigned to the channel quality indicator CQI, and transmits the channel quality indicator CQI and acknowledgement/negative-acknowledgment ACK/NACK together in a signal configuration different from the case of transmitting only the channel quality indicator CQI. By this means, the single-carrier attribute of transmission signal is maintained, and mobile station apparatuses limited in power are capable of transmitting the channel quality indicator CQI and acknowledgement/negative-acknowledgment ACK/NACK to meet the required quality.

Embodiments of the invention will specifically be described below with reference to drawings. First, the whole aspect of the wireless communication system according to the Embodiments and the configuration of a radio frame will be described using FIGS. 1, 2 and 3. Next, the configuration of the wireless communication system according to the Embodiments will be described using FIGS. 4 to 9. Then, the operation processing of the wireless communication system according to the Embodiments will be described using FIGS. 10 to 13.

<The Whole Aspect of the Wireless Communication System>

FIG. 1 is a diagram to explain the outline of the whole aspect of the wireless communication system according to Embodiments of the invention. In the wireless communication system 1 shown in the figure, a base station apparatus 3 and a plurality of mobile station apparatuses 5A, 5B and 5C perform wireless communications. Further, this figure shows that downlink that is the communication direction from the base station apparatus 3 to the mobile station apparatuses 5A, 5B and 5C includes downlink pilot channels, downlink control channels and downlink shared channels and is comprised thereof. Meanwhile, this figure shows that uplink that is the communication direction from the mobile station apparatuses 5A, 5B and 5C to the base station apparatus 3 includes uplink shared channels, uplink pilot channels and uplink control channels and is comprised thereof. Hereinafter, in the Embodiments, the mobile station apparatuses 5A, 5B and 5C are referred to as a mobile station apparatus 5.

<Configuration of the Downlink Radio Frame>

Figure 2:
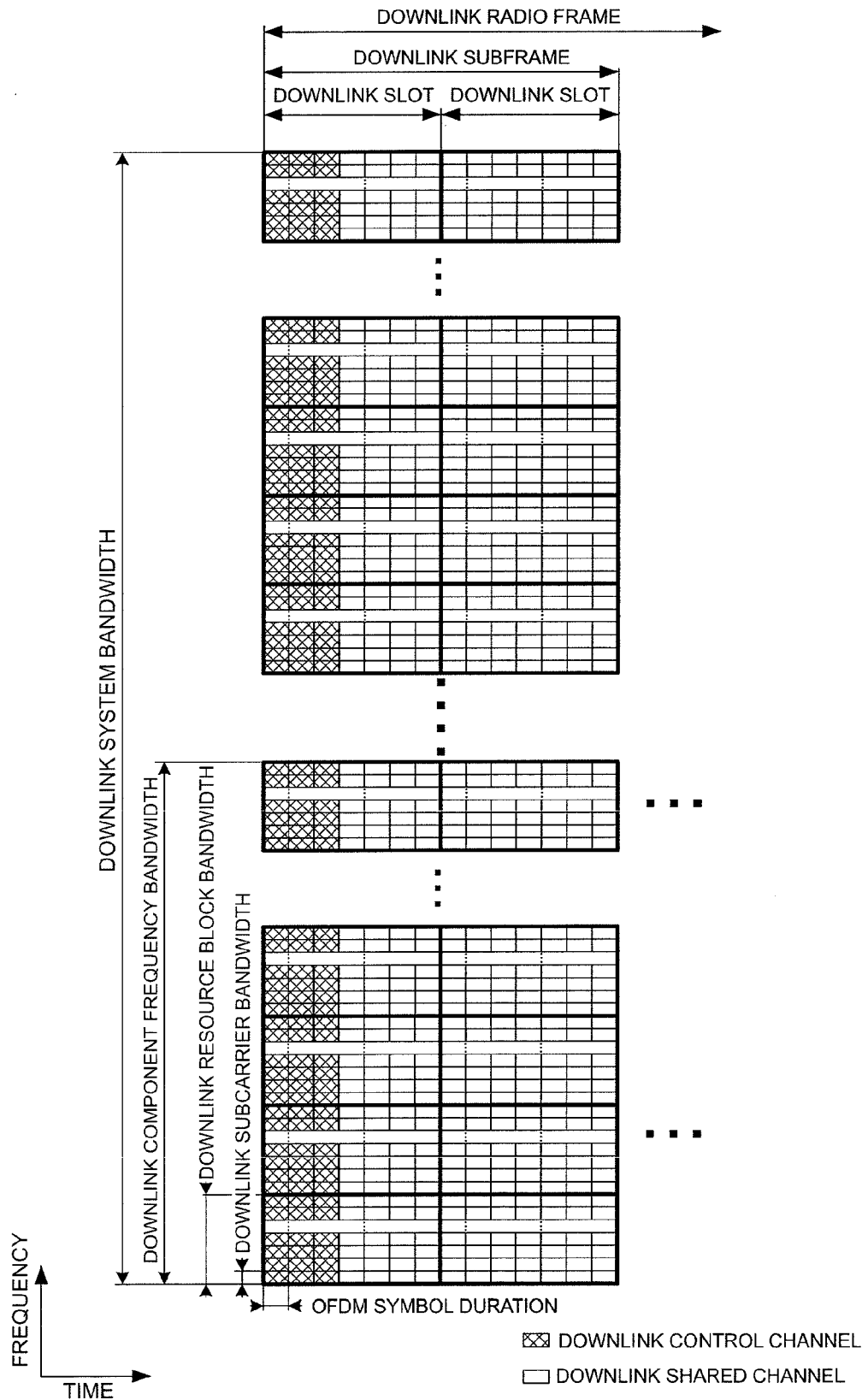
FIG. 2 is a diagram illustrating a schematic configuration of a downlink radio frame from a base station apparatus 3 to a mobile station apparatus 5 according to Embodiments of the invention.

FIG. 2 is a diagram illustrating a schematic configuration of a downlink radio frame from the base station apparatus 3 to the mobile station apparatus 5 according to Embodiments of the invention. In this figure, the horizontal axis represents the frequency domain, and the vertical axis represents the time domain. The downlink radio frame is a unit for radio resource allocation and the like, and is comprised of a downlink resource block pair comprised of a frequency band and a time band each with a beforehand determined width. One downlink resource block pair is comprised of two downlink resource blocks that are contiguous in the time domain.

Further, in this figure, one downlink resource block is comprised of 12 downlink subcarriers in the frequency domain, while being comprised of 7 OFDM symbols in the time domain. The downlink system bandwidth is a communication bandwidth in downlink of the base station apparatus 3, and is comprised of a plurality of downlink component frequency bandwidths. In the wireless communication system 1, the downlink component frequency band is a band with a beforehand determined frequency bandwidth. For example, the downlink system band with a bandwidth of 60 MHz is comprised of three downlink component frequency bands with a bandwidth of 20 MHz. In addition, in the downlink component frequency band, a plurality of downlink resource blocks is arranged corresponding to the downlink component frequency bandwidth. For example, the downlink component frequency band with a bandwidth of 20 MHz is comprised of 100 downlink resource blocks. Further, for example, the downlink component frequency bandwidth is a frequency bandwidth that mobile station apparatuses supporting EUTRA are capable of using in communications, and the downlink system bandwidth is a frequency bandwidth that mobile station apparatuses supporting A-EUTRA are capable of using in communications.

Meanwhile, in the time domain shown in the figure, there are downlink slots each comprised of 7 OFDM symbols, a downlink subframe comprised of 2 downlink slots, and a downlink radio frame comprised of 10 downlink subframes. In addition, a unit comprised of one downlink subcarrier and one OFDM symbol is referred to as a downlink resource element. In each downlink subframe are arranged at least downlink shared channels used in transmission of information data and downlink control channels used in transmission of control data. In the figure, omitted in the figure, but downlink reference signals of downlink pilot channels used in estimation of channel variations of the downlink shared channel and downlink control channel are arranged in a plurality of downlink resource elements while being dispersed. Herein, the downlink reference signals are used in downlink pilot channels and are known signals in the wireless communication system 1.

In the downlink control channel are arranged signals generated from control data of a mobile station identifier, radio resource allocation information of the downlink shared channel, radio resource allocation information of the uplink shared channel, multi-antenna related information, modulation scheme, coding rate, retransmission parameter, etc.

<Configuration of the Uplink Radio Frame>

Figure 3:
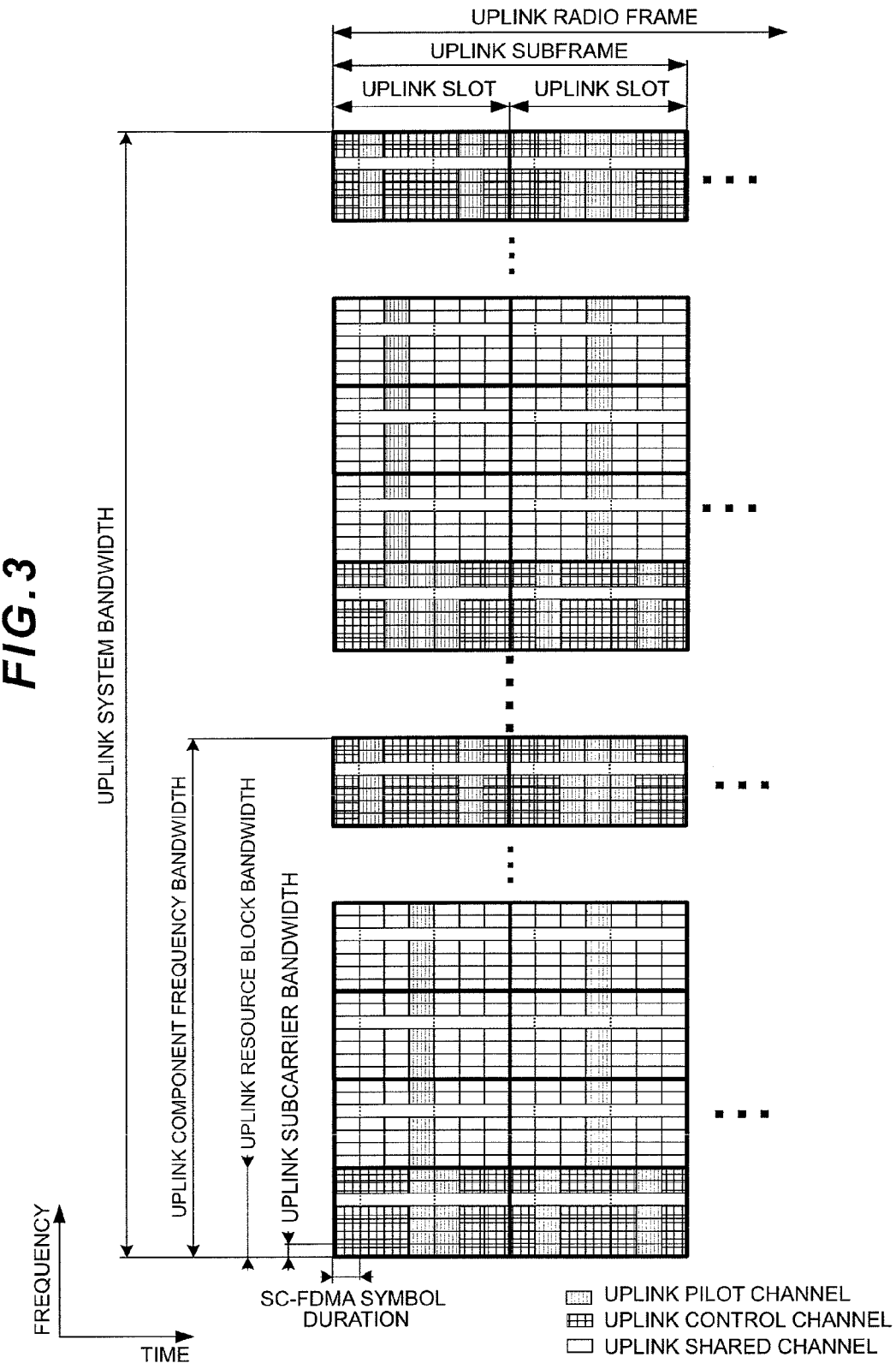
FIG. 3 is a diagram illustrating a schematic configuration of an uplink radio frame from the mobile station apparatus 5 to the base station apparatus 3 according to Embodiments of the invention.

FIG. 3 is a diagram illustrating a schematic configuration of an uplink radio frame from the mobile station apparatus 5 to the base station apparatus 3 according to Embodiments of the invention. In this figure, the horizontal axis represents the frequency domain, and the vertical axis represents the time domain. The uplink radio frame is a unit for radio resource allocation and the like, and is comprised of an uplink resource block pair comprised of a frequency band and a time band each with a beforehand determined width. One uplink resource block pair is comprised of two uplink resource blocks that are contiguous in the time domain.

Further, in this figure, one uplink resource block is comprised of 12 uplink subcarriers in the frequency domain, while being comprised of 7 SC-FDMA symbols in the time domain. The uplink system bandwidth is a communication bandwidth in uplink of the base station apparatus 3, and is comprised of a plurality of uplink component frequency bandwidths. In the wireless communication system 1, the uplink component frequency band is a band with a beforehand determined frequency bandwidth. For example, the uplink system band with a bandwidth of 60 MHz is comprised of three uplink component frequency bands with a bandwidth of 20 MHz. In addition, in the uplink component frequency band, a plurality of uplink resource blocks is arranged corresponding to the uplink component frequency bandwidth. For example, the uplink component frequency band with a bandwidth of 20 MHz is comprised of 100 uplink resource blocks. Further, for example, the uplink component frequency bandwidth is a frequency bandwidth that mobile station apparatuses supporting EUTRA are capable of using in communications, and the uplink system bandwidth is a frequency bandwidth that mobile station apparatuses supporting A-EUTRA are capable of using in communications.

Further, in the time domain shown in the figure, there are uplink slots each comprised of 7 SC-FDMA symbols, an uplink subframe (time frame) comprised of 2 uplink slots, and an uplink radio frame comprised of 10 uplink subframes. In addition, a unit comprised of one uplink subcarrier and one SC-FDMA symbol is referred to as an uplink resource element.

In each uplink subframe are arranged at least uplink shared channels used in transmission of information data and uplink control channels used in transmission of control data. The uplink control channel transmits control data comprised of a channel quality indicator CQI in response to downlink, acknowledgement/negative-acknowledgment ACK/NACK in response to a downlink shared channel, or scheduling request SR. Further, on the uplink control channel, different types of signal configurations are used in the case of transmitting control data comprised of the channel quality indicator CQI, the case of transmitting control data comprised of acknowledgement/negative-acknowledgment ACK/NACK, and the case of transmitting control data comprised of the scheduling request SR.

Further, the uplink resource block pair used in the uplink control channel is comprised of two uplink resource blocks, positioned in different uplink slots, in the symmetry relationship in the frequency domain in the uplink component frequency band. For example, in FIG. 3, in an uplink subframe within the uplink component frequency band with the lowest frequencies, a single uplink resource block pair used in the uplink control channel is comprised of an uplink resource block with the lowest frequencies in the first uplink slot and an uplink resource block with the highest frequencies in the second uplink slot.

In the uplink pilot channel used in estimation of channel variations of the uplink shared channel and the uplink control channel, uplink reference signals are arranged in different SC-FDMA symbols between the case where the uplink pilot channel is arranged in the same uplink resource block as the uplink shared channel and the case where the uplink pilot channel is arranged in the same uplink resource block as the uplink control channel. Herein, the uplink reference signals are used in uplink pilot channels and are known signals in the wireless communication system 1.

When the uplink pilot channel is arranged in the same uplink resource block as the uplink shared channel, the uplink reference signal is arranged in the 4th SC-FDMA symbol in the uplink slot. When the uplink pilot channel is arranged in the same uplink resource block as the uplink control channel including control data comprised of the channel quality indicator CQI, the uplink reference signal is arranged in the 2nd and 6th SC-FDMA symbols in the uplink slot. When the uplink pilot channel is arranged in the same uplink resource block as the uplink control channel including control data comprised of acknowledgement/negative-acknowledgment ACK/NACK, the uplink reference signal is arranged in the 3rd, 4th and 5th SC-FDMA symbols in the uplink slot. When the uplink pilot channel is arranged in the same uplink resource block as the uplink control channel including control data comprised of the scheduling request SR, the uplink reference signal is arranged in the 3rd, 4th and 5th SC-FDMA symbols in the uplink slot.

The figure shows the case where the uplink control channel is arranged in the first uplink resource block from the edge of each uplink component frequency band, but there are cases that the second uplink resource block, third uplink resource block or the like from the edge of the uplink component frequency band is used in the uplink control channel.

In addition, in the wireless communication system 1 according to the Embodiments of the invention, the OFDM scheme is applied in downlink, and the N×DFT-Spread OFDM scheme is applied in uplink. Herein, the N×DFT-Spread OFDM scheme is a scheme for transmitting and receiving signals using the DFT-Spread OFDM scheme on a basis of uplink component frequency band, and is a scheme for performing communications using a plurality of processing parts related to DFT-Spread OFDM transmission and reception in the uplink subframe in the wireless communication system 1 using a plurality of uplink component frequency bands.

Embodiment 1

<Entire Configuration of the Base Station Apparatus>

Figure 4:
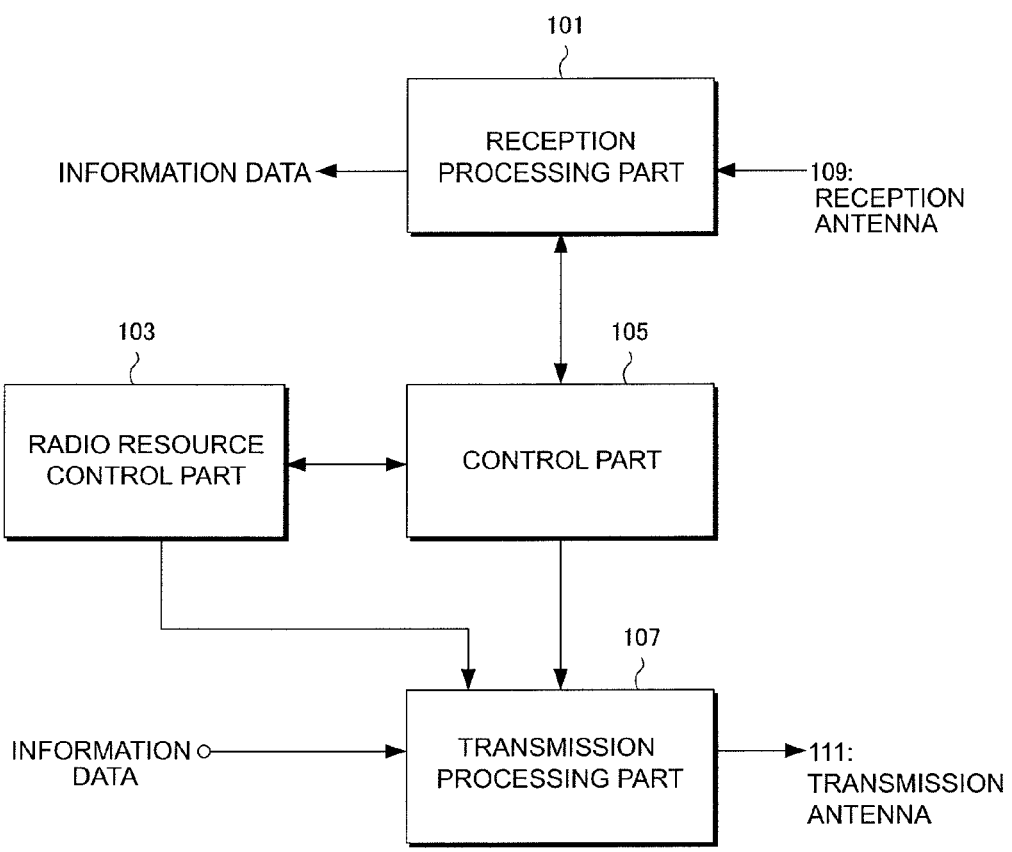
FIG. 4 is a schematic block diagram illustrating a configuration of the base station apparatus 3 according to Embodiments of the invention.
Figure 5:
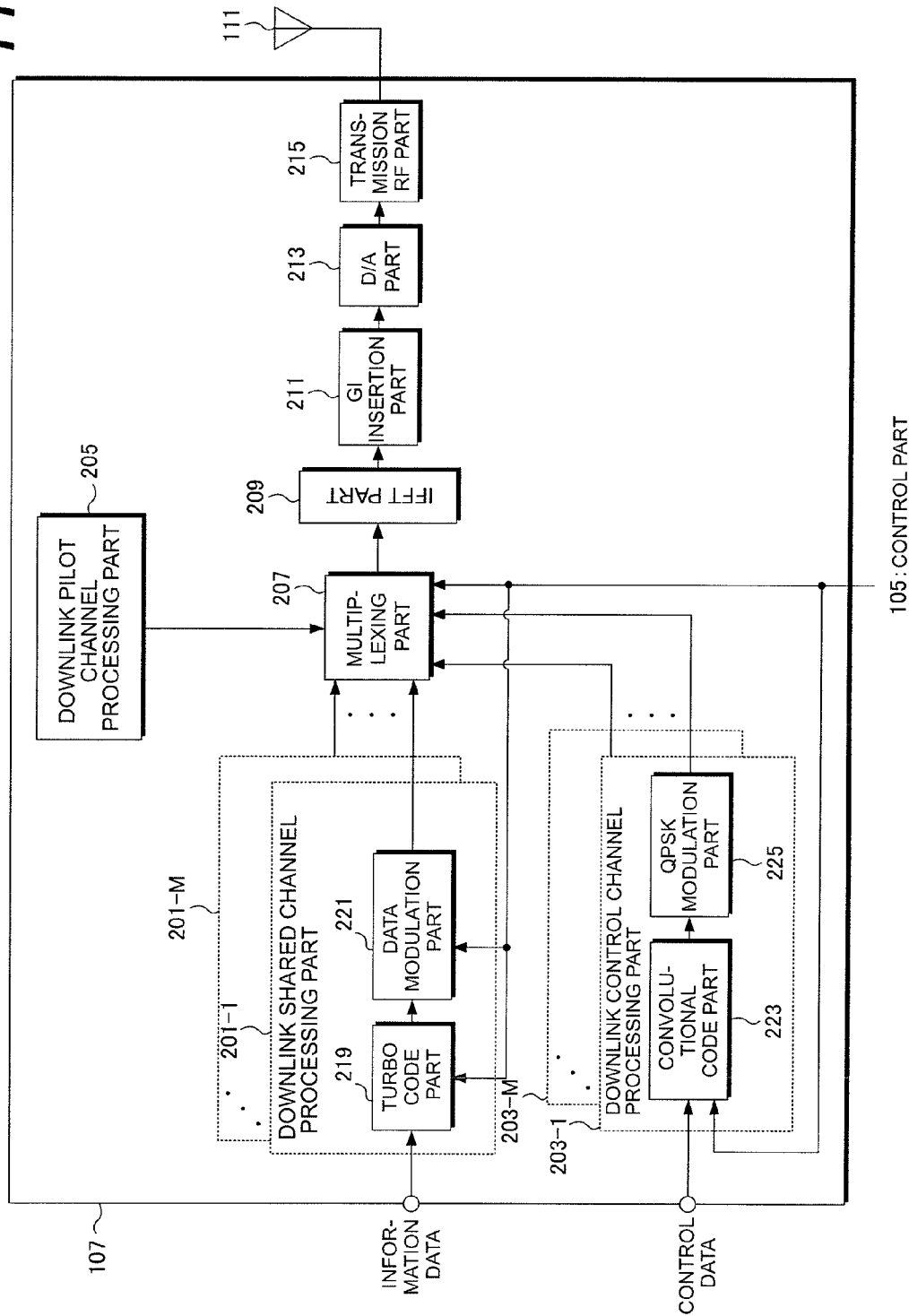
FIG. 5 is a schematic block diagram illustrating a configuration of a transmission processing part 107 of the base station apparatus 3 according to Embodiments of the invention.
Figure 6:
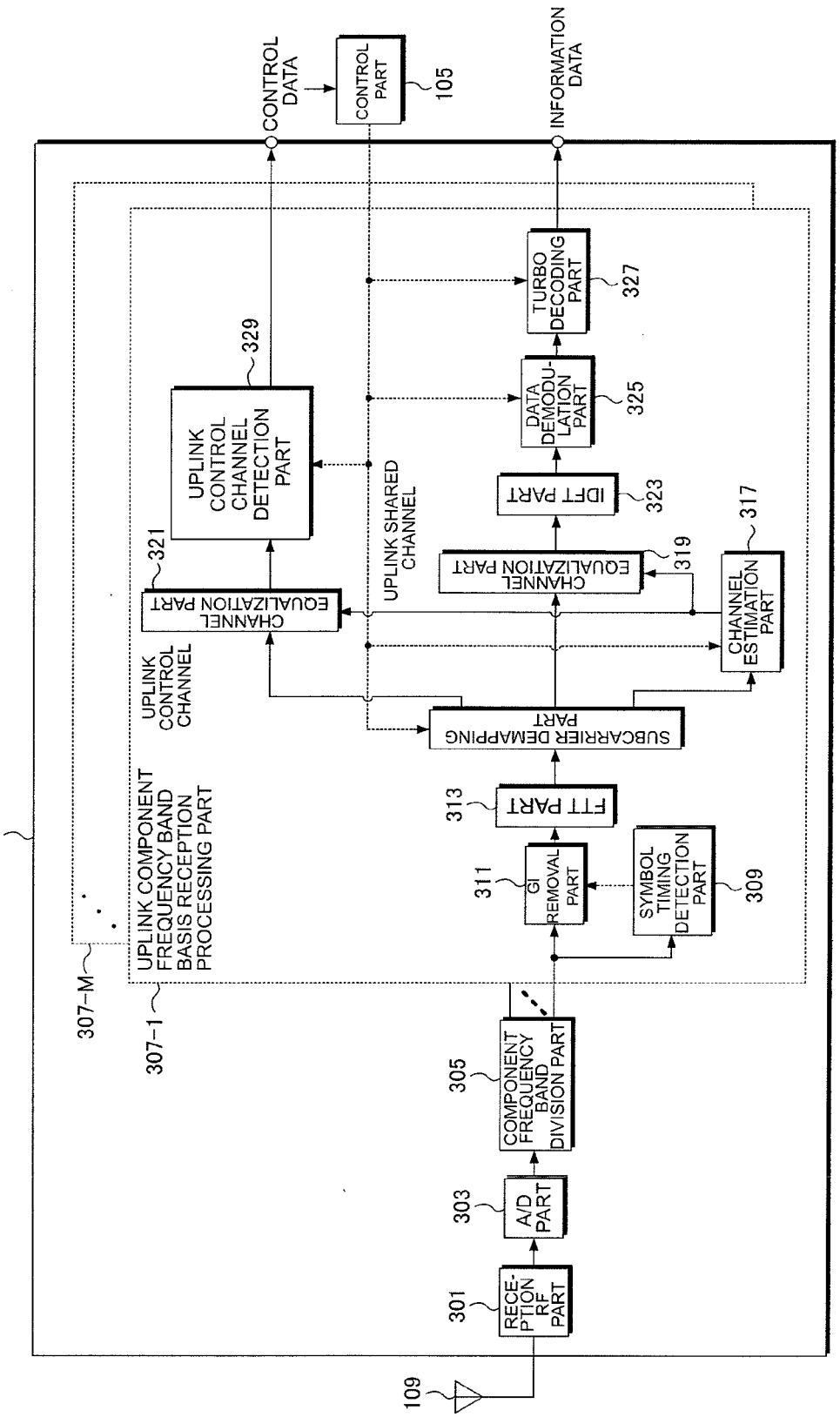
FIG. 6 is a schematic block diagram illustrating a configuration of a reception processing part 101 of the base station apparatus 3 according to Embodiments of the invention.

The configuration of the base station apparatus 3 according to this Embodiment will be described below using FIGS. 4, 5 and 6. FIG. 4 is a schematic block diagram illustrating a configuration of the base station apparatus 3 according to this Embodiment of the invention. As shown in the figure, the base station apparatus 3 includes a reception processing part 101, radio resource control part 103, control part 105 and transmission processing part (base-station side transmission processing part) 107 and is comprised of thereof.

The reception processing part 101 demodulates and decodes reception signals of the uplink control channel and uplink shared channel received from the mobile station apparatus 5 with a reception antenna 109, and extracts control data and information data, according to instructions from the control part 105. The reception processing part 101 outputs the extracted control data to the control part 105, and outputs the information data to the higher layer. For example, the reception processing part 101 receives the uplink control channel comprised of control data including the channel quality indicator CQI from the mobile station apparatus 5 to demodulate and decode, and outputs the extracted channel quality indicator CQI in response to the downlink component frequency band to the control part 105. Further, for example, the reception processing part 101 performs detection of the uplink control channel comprised of control data including acknowledgement/negative acknowledgement ACK/NACK, and outputs, to the control part 105, a control signal indicating whether a signal, which is transmitted from the mobile station apparatus 5 using an uplink control channel that is beforehand associated with radio resources used in the downlink control channel including the radio resource allocation information of the downlink shared channel and that is assigned to transmit acknowledgement/negative acknowledgement ACK/NACK, is acknowledgement ACK or negative-acknowledgement NACK. Details of the reception processing part 101 will be described later.

The radio resource control part 103 sets transmission power, discontinuous transmission/reception cycle, radio resource allocation of the downlink control channel, radio resource allocation of the uplink control channel, radio resource allocation of the downlink shared channel, radio resource allocation of the uplink shared channel, assignment cycle of the uplink control channel to transmit the channel quality indicator CQI, modulation scheme•coding rate of each of various channels, etc. of each mobile station apparatus 5.

The radio resource control part 103 sets a value of transmission power, radio resource allocation of each channel, modulation scheme•coding rate, etc. based on the channel quality indicator CQI in response to each downlink component frequency band, received from the mobile station apparatus 5, input via the control part 105. Further, the radio resource control part 103 performs radio resource allocation of the downlink shared channel based on acknowledgement/negative-acknowledgment ACK/NACK input via the control part 105. More specifically, the radio resource control part 103 performs radio resource allocation of the downlink shared channel including new information data when the acknowledgement/negative-acknowledgment ACK/NACK is acknowledgement ACK, while performing radio resource allocation of the downlink shared channel including retransmission information data that has been transmitted when the acknowledgement/negative-acknowledgment ACK/NACK is negative-acknowledgment NACK.

Further, the radio resource control part 103 sets priorities, for each downlink component frequency band, used by the mobile station apparatus 5 in selection of radio resources when a plurality of radio resources of uplink control channels, which are beforehand allocated to the mobile station apparatus 5 from the base station apparatus 3 to transmit the channel quality indicator CQI for each downlink component frequency band, occurs in the same uplink subframe. Details of the priorities related to selection of radio resources of the mobile station apparatus set for each downlink component frequency band will be described later. The radio resource control part 103 transmits radio resource information including information of the priorities related to selection of radio resources of the mobile station apparatus set for each downlink component frequency band to the mobile station apparatus 5 via the transmission processing part 107. Further, the radio resource control part 103 outputs the radio resource control information to the control part 105.

The control part 105 performs control of radio resource allocation, modulation scheme and coding rate of the downlink shared channel and downlink control channel on the transmission control part 107, based on the radio resource control information input from the radio resource control part 103. Further, the control part 105 generates control data to be transmitted using the downlink control channel based on the radio resource control information, and outputs the control data to the transmission processing part 107.

The control part 105 performs control of radio resource allocation, modulation scheme and coding rate of the uplink shared channel and uplink control channel on the reception control part 101, based on the radio resource control information input from the radio resource control part 103. Further, the control part 105 receives control data, which is transmitted from the mobile station apparatus 5 using the uplink control channel, input from the reception processing part 101, and outputs the input control data to the radio resource control part 103. For example, the control part 105 receives control data related to the channel quality indicator CQI and acknowledgement/negative-acknowledgment ACK/NACK input from the reception processing part 103, and outputs the channel quality indicator CQI and acknowledgement/negative-acknowledgment ACK/NACK to the radio resource control part 103.

The transmission processing part 107 generates signals to transmit using the downlink control channel and downlink shared channel based on the control signal input from the control part 105, and transmits the signals via a transmission antenna 111. The transmission part 107 transmits the radio resource control information comprised of setting information of the channel quality indicator CQI and the like input from the radio resource control part 103 and the information data input from the higher layer, using the downlink shared channel, and transmits the control data input from the control part 105 using the downlink control channel. For example, the transmission processing part 107 transmits the information of the priorities related to selection of radio resources of the mobile station apparatus set for each downlink component frequency band to the mobile station apparatus 5 using the downlink shared channel. In addition, to simplify the description, hereinafter, it is assumed that the information data includes the radio resource control information. Details of the transmission processing part 107 will be described later.

<Configuration of the Transmission Processing Part 107 of the Base Station Apparatus>

Details of the transmission processing part 107 of the base station apparatus 3 will be described below. FIG. 5 is a schematic block diagram illustrating a configuration of the transmission processing part 107 of the base station apparatus 3 according to Embodiments of the invention. As shown in the figure, the transmission processing part 107 includes a plurality of downlink shared channel processing parts 201, a plurality of downlink control channel processing parts 203, downlink pilot channel processing part 205, multiplexing part 207, IFFT (Inverse Fast Fourier Transform) part 209, GI (Guard Interval) insertion part 211, D/A (Digital/Analog conversion) part 213, transmission RF (Radio Frequency) part 215 and transmission antenna 111 and is comprised thereof. In addition, in the downlink shared channel processing parts 201 and the downlink control channel processing parts 203, each of respective parts has the same configuration and function, and one of the parts is represented to describe.

Further, as shown in the figure, each of the downlink shared channel processing parts 201 is provided with a turbo code part 219 and a data modulation part 221. Meanwhile, as shown in the figure, each of the downlink control channel processing parts 203 is provided with a convolutional code part 223 and a QPSK modulation part 225. The downlink shared channel processing part 201 performs baseband signal processing to transmit the information data to the mobile station apparatus 5 with the OFDM scheme. The turbo code part 219 performs turbo coding to enhance error tolerance of data on the input information data with a coding rate input from the control part 105, and outputs the resultant to the data modulation part 221. The data modulation part 221 modulates the coded data coded by the turbo code part 219 with a modulation scheme input from the control part 105, for example, a modulation scheme of QPSK, 16QAM, 64QAM or the like, and generates a signal sequence of modulation symbols. The data modulation part 221 outputs the generated signal sequence to the multiplexing part 207.

The downlink control channel processing part 203 performs baseband signal processing to transmit the control data input from the control part 105 with the OFDM scheme. The convolutional code part 223 performs convolutional coding to enhance error tolerance of the control data based on a coding rate input from the control part 105. Herein, the control data is controlled on a bit-by-bit basis. Further, the convolutional code part 223 also performs rate matching on the bit subjected to the convolutional coding processing based on the coding rate input from the control part 105 so as to adjust the number of output bits. The convolutional code part 223 outputs the coded control data to the QPSK modulation part 225. The QPSK modulation part 225 modulates the control data, which is coded in the convolutional code part 223, with the QPSK modulation scheme, and outputs a signal sequence of modulated modulation symbols to the multiplexing part 207. The downlink pilot channel processing part 205 generates a downlink reference signal that is a known signal in the mobile station 205, and outputs the signal to the multiplexing part 207.

The multiplexing part 207 multiplexes the signal input from the downlink pilot channel processing part 205, the signals input from respective downlink shared channel processing parts 201, and the signals input from respective downlink control channel processing parts 203 into a downlink radio frame according to instructions from the control part 105. The control part 105 receives radio resource control information on radio resource allocation of the downlink shared channel and radio resource allocation of the downlink control channel set in the radio resource control part 103, and based on the radio resource control information, controls the processing of the multiplexing part 207.

In addition, the multiplexing part 207 performs multiplexing between the downlink shared channel and the downlink control channel in time multiplexing as shown in FIG. 2. Further, the multiplexing part 207 performs multiplexing among the downlink pilot channel and other channels by time-frequency multiplexing. Furthermore, the multiplexing part 207 performs multiplexing of downlink shared channels to respective mobile station apparatuses 5 on a downlink resource block pair basis, and sometimes multiplexes downlink shared channels to a single mobile station apparatus 5 using a plurality of downlink resource block pairs. Meanwhile, the multiplexing part 207 performs multiplexing of downlink control channels to respective mobile station apparatuses 5 using a plurality of downlink resource elements that are separately dispersed within the same downlink component frequency band. The multiplexing part 207 outputs the multiplexed signal to the IFFT part 209.

The IFFT part 209 performs inverse fast Fourier transform on the signal multiplexed by the multiplexing part 207, performs modulation of the OFDM scheme, and outputs the resultant to the GI insertion part 211. The GI insertion part 211 adds a guard interval to the signal on which the IFFT part 209 performs modulation of the OFDM scheme, and thereby generates a digital baseband signal comprised of symbols in the OFDM scheme. As is known, the guard interval is generated by replicating part of the first or end of symbols to transmit. The GI insertion part 211 outputs the generated digital baseband signal to the D/A part 213. The D/A part 213 converts the digital baseband signal input from the GI insertion part 211 into an analog signal, and outputs the signal to the transmission RF part 215. The transmission RF part 215 generates an in-phase component and quadrature component of the intermediate frequency from the analog signal input from the D/A part 213, and removes excess frequency components with respect to the intermediate frequency band. Next, the transmission RF part 215 converts (up-converts) the signal of the intermediate frequency into a signal of the high frequency, removes excess frequency components, amplifies the power, and transmits the signal to the mobile station apparatus 5 via the transmission antenna 111.

<Configuration of the Reception Processing Part 101 of the Base Station Apparatus>

Details of the reception processing part 101 of the base station apparatus 3 will be described below. FIG. 6 is a schematic block diagram illustrating a configuration of the reception processing part 101 of the base station apparatus 3 according to Embodiments of the invention. As shown in the figure, the reception processing part 101 includes a reception RF part 301, A/D (Analog/Digital conversion) part 303, component frequency band division part 305, and a plurality of uplink component frequency band basis reception processing parts 307, and is comprised thereof. Further, as shown in the figure, the uplink component frequency band basis reception processing part 307 is provided with a symbol timing detection part 309, GI removal part 311, FTT part 313, subcarrier demapping part 315, channel estimation part 317, uplink shared channel-channel equalization part 319, uplink control channel-channel equalization part 321, IDFT part 323, data demodulation part 325, turbo decoding part 327, and uplink control channel detection part 329. In addition, each of the uplink component frequency band basis reception processing parts 307 has the same configuration and function, and one of the parts is represented to describe.

The reception RF part 301 properly amplifies a signal received in the reception antenna 109, converts (down-converts) into the intermediate frequency, removes unnecessary frequency components, controls the amplification level so as to maintain the signal level suitably, and performs quadrature demodulation based on the in-phase component and quadrature component of the received signal. The reception RF part 301 outputs the analog signal subjected to quadrature demodulation to the A/D part 303. The A/D part 303 converts the analog signal on which the reception RF part 301 performs quadrature demodulation into a digital signal, and outputs the converted digital signal to the component frequency band division part 305. The component frequency band division part 305 divides the reception signal for each uplink component frequency band of the uplink system bandwidth to output to each uplink component frequency band basis reception processing part 307.

The uplink component frequency band basis reception processing part 307 performs demodulation and decoding on the uplink shared channel and the uplink control channel within the uplink component frequency band, and detects information data and control data. The symbol timing detection part 309 detects timing of symbols based on the signal input from the component frequency band division part 305, and outputs a control signal indicative of the detected timing of symbol boundary to the GI removal part 311. The GI removal part 311 removes a portion corresponding to the guard interval from the signal input from the component frequency band division part 305 based on the control signal from the symbol timing detection part 309, and outputs the signal of the remaining portion to the FFT part 313. The FFT part 313 performs fast Fourier transform on the signal input from the GI removal part 311, performs demodulation of the DFT-Spread-OFDM scheme, and outputs the resultant to the subcarrier demapping part 315. In addition, the number of points of the FFT part 313 is equal to the number of points of the IFFT part 209 of the mobile station apparatus 5, described later.

The subcarrier demapping part 315 divides the signal demodulated by the FFT part 313 into a signal of the uplink pilot channel, a signal of the uplink shared channel and a signal of the uplink control channel, based on the control signal input from the control part 105. The subcarrier demapping part 315 outputs the divided signal of the uplink pilot channel to the channel estimation part 317, outputs the divided signal of the uplink shared channel to the uplink shared channel-channel equalization part 319, and further, outputs the divided signal of the uplink control channel to the uplink control channel-channel equalization part 321. Further, when there is a plurality of candidates for radio resources to arrange the uplink control channel, the subcarrier demapping part 315 outputs signals of all candidates for the uplink control channel to the uplink control channel-channel equalization part 321, based on the control signal from the control part 105.

The channel estimation part 317 estimates a variation of the channel using an uplink reference signal of the uplink pilot channel divided by the subcarrier demapping part 315 and a known signal. The channel estimation part 317 outputs the estimated channel estimation value to the uplink shared channel-channel equalization part 319 and the uplink control channel-channel equalization part 321. The uplink shared channel-channel equalization part 319 equalizes the amplitude and phase of the signal of the uplink shared channel divided by the subcarrier demapping part 315, based on the channel estimation value input from the channel estimation part 317. Herein, equalization indicates the processing for restoring the variation of the channel that the signal underwent during wireless communications to the original state. The uplink shared channel-channel equalization part 319 outputs the adjusted signal to the IDFT part 323.

The IDFT part 323 performs inverse discrete Fourier transform on the signal input from the uplink shared channel-channel equalization part 319, and outputs the resultant to the data demodulation part 325. The data demodulation part 325 demodulates the signal of the uplink shared channel transformed in the IDFT part 323, and outputs the demodulation signal of the uplink shared channel to the turbo decoding part 327. The demodulation is demodulation corresponding to the modulation scheme used in the data modulation part 221 of the mobile station apparatus 5, and the modulation scheme is input from the control part 105. The turbo decoding part 327 decodes information data from the demodulated signal of the uplink shared channel input from the data demodulation part 325. The coding rate is input from the control part 105.

The uplink control channel-channel equalization part 321 equalizes the amplitude and phase of the signal of the uplink control channel divided by the subcarrier demapping part 315, based on the channel estimation value input from the channel estimation part 317. The uplink control channel-channel equalization part outputs the equalized signal to the uplink control channel detection part 329. The uplink control channel detection part 329 demodulates and decodes the signal input from the uplink control channel-channel equalization part 321, corresponding to the type of control data, and detects the control data. Herein, the base station apparatus 3 beforehand grasps the type of control data transmitted from the mobile station apparatus 5. The uplink control channel detection part 329 outputs the detected control data to the control part 105.

Based on the control data and radio resource control information which is transmitted from the base station apparatus 3 to the mobile station apparatus 5 respectively using the downlink control channel and the downlink shared channel, the control part 105 controls the subcarrier demapping part 315, data demodulation part 325, turbo decoding part 327, channel estimation part 317, and uplink control channel detection part 329. Further, the control part 105 grasps radio resources in which each mobile station apparatus 5 arranges the uplink shared channel and the uplink control channel, based on the control data and radio resource control information that is transmitted from the base station apparatus 3 to the mobile station apparatus 5. When radio resources of a plurality of uplink control channels to transmit a channel quality indicator CQI are allocated to the same uplink subframe for some mobile station apparatus 5, the control part 105 outputs a control signal to the subcarrier demapping part 315 so as to output, to the channel equalization part, a signal corresponding to the uplink control channel to transmit the channel quality indicator CQI in response to the downlink component frequency band of high priority.

<Entire Configuration of the Mobile Station Apparatus>

Figure 7:
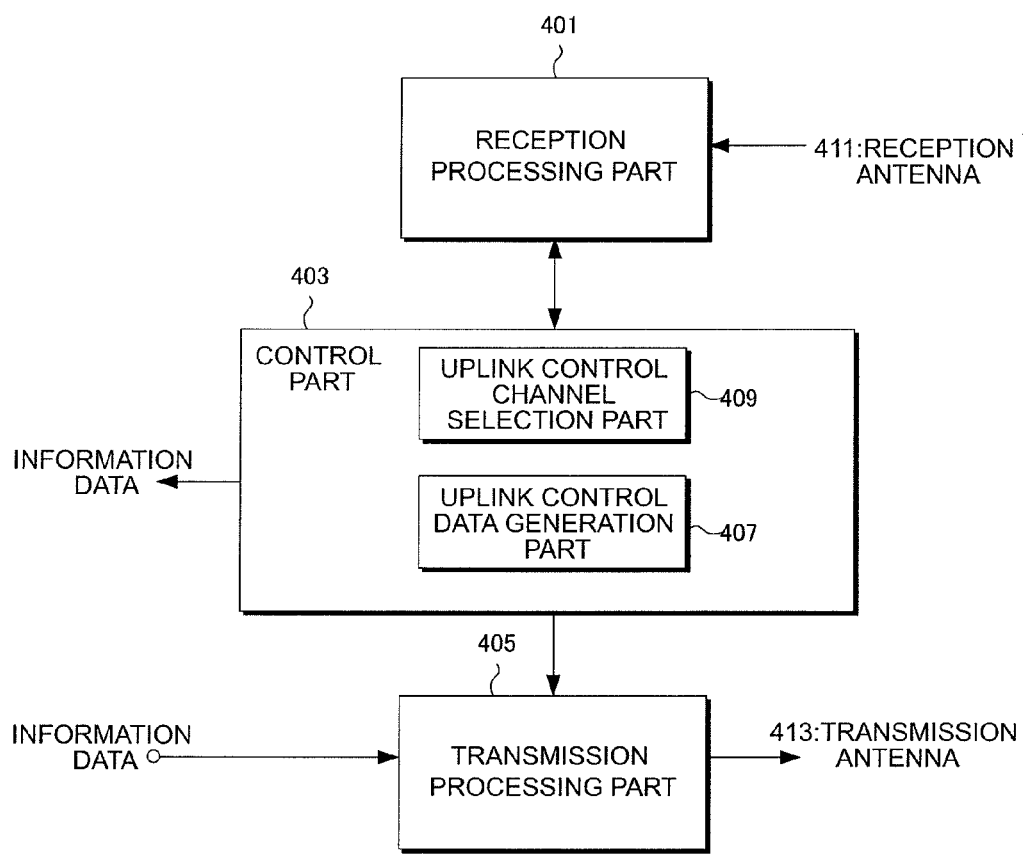
FIG. 7 is a schematic block diagram illustrating a configuration of the mobile station apparatus 5 according to Embodiment 1 of the invention.
Figure 8:
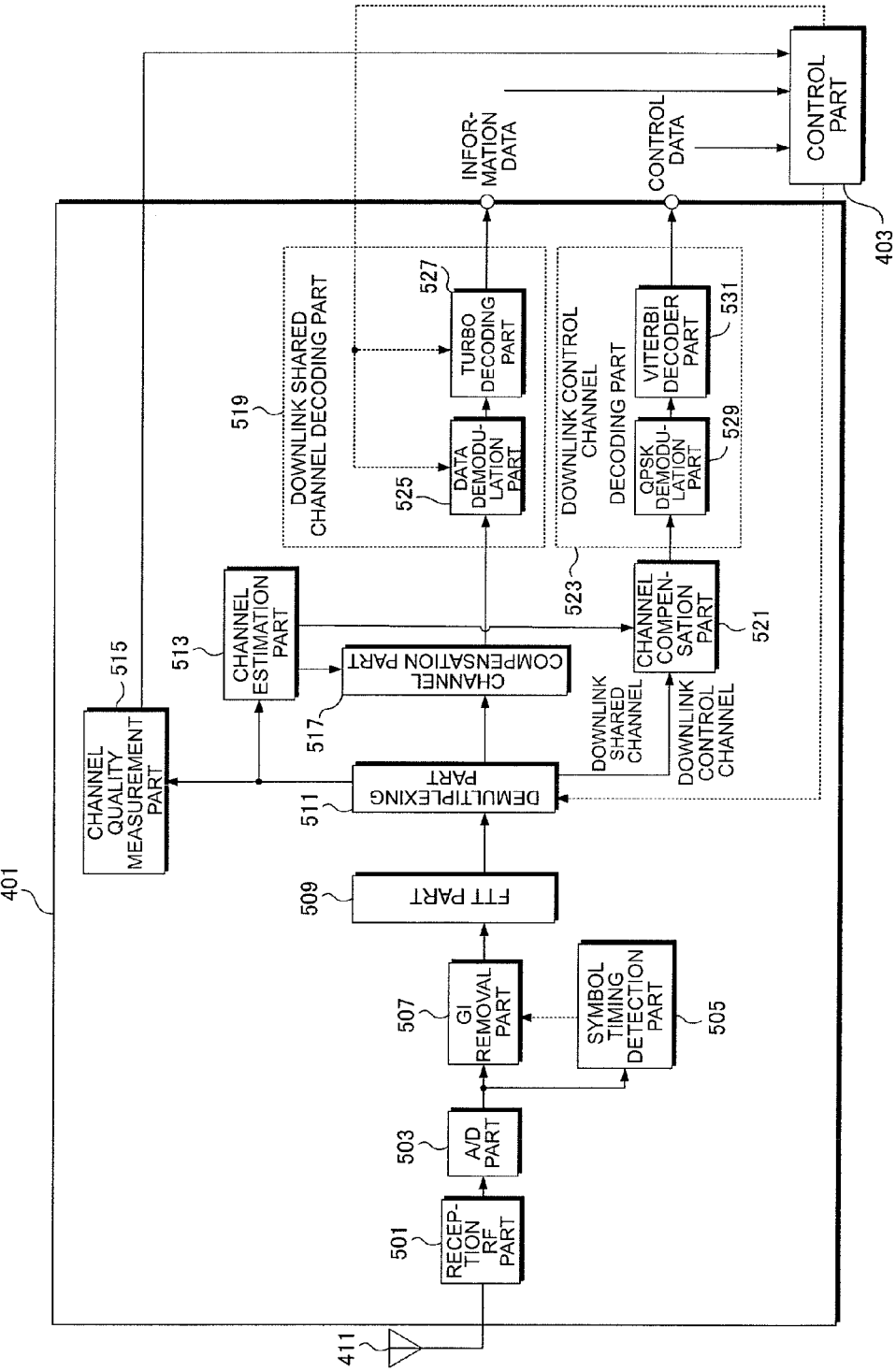
FIG. 8 is a schematic block diagram illustrating a configuration of a reception processing part 401 of the mobile station apparatus 5 according to Embodiment 1 of the invention.

The configuration of the mobile station apparatus 5 according to this Embodiment will be described below using FIGS. 7, 8 and 9. FIG. 7 is a schematic block diagram illustrating a configuration of the mobile station apparatus 5 according to Embodiment 1 of the invention. As shown in the figure, the mobile station apparatus 5 includes a reception processing part 401, control part 403 and transmission processing part 405 and is comprised of thereof. Further, the control part 403 is provided with an uplink control data generation part 407 and uplink control channel selection part 409.

The reception processing part 401 receives a signal from the base station apparatus 3, and demodulates and decodes the reception signal according to instructions from the control part 403. When the reception processing part 401 detects a signal of the downlink control channel to the apparatus 5, the part 401 decodes the signal of the downlink control channel, and outputs the acquired control data to the control part 403. Further, the reception processing part 401 outputs information data that is obtained by decoding the downlink shared channel to the apparatus 5 to a higher layer via the control part 403, based on instructions from the control part 403 after outputting the control data included in the downlink control channel to the control part 403. Furthermore, the reception processing part 401 outputs, to the control part 403, radio resource control information obtained by decoding the downlink shared channel, and information of priorities related to selection of radio resources of the mobile station apparatus set for each downlink component frequency band. Meanwhile, the reception processing part 401 measures channel quality using a downlink reference signal of the downlink pilot channel of each downlink component frequency band, and outputs the measurement result to the control part 403. Details of the reception processing part 401 will be described later.

The control part 403 is provided with the uplink control data generation part 407 and uplink control channel selection part 409. The control part 403 checks data which is transmitted using the downlink shared channel and is input from the reception processing part 401, outputs information data to the higher layer among the data, and controls the reception processing part 401 and transmission processing part 405 based on the radio resource control information and the information of priorities related to selection of radio resources of the mobile station apparatus set for each downlink component frequency band among the data. Further, similarly, the control part 403 controls the reception processing part 401 and transmission processing part 405 based on the control data.

Based on the information of priorities related to selection of radio resources of the mobile station apparatus set for each downlink component frequency band, which is input from the base station apparatus 3 via the reception processing part 401, the uplink control channel selection part 409 of the control part 403 selects a radio resource of a particular uplink control channel, when a plurality of radio resources of uplink control channels to transmit a channel quality indicator CQI for each downlink component frequency band, which is beforehand allocated from the base station apparatus 3, occurs in the same uplink subframe. More specifically, the uplink control channel selection part 409 selects the radio resource of the uplink control channel assigned to transmit the channel quality indicator CQI of the downlink component frequency band of the highest priority. In addition, when a single radio resource of the uplink control channel to transmit a channel quality indicator CQI for each downlink component frequency band, which is beforehand allocated from the base station apparatus 3, occurs in the same uplink subframe, the uplink control channel selection part 409 selects the radio resource.

The uplink control data generation part 407 of the control part 403 generates a channel quality indicator CQI from the channel quality of each downlink component frequency band input from the reception processing part 401. Based on the result of control of the uplink control channel selection part 409, the control part 403 controls the radio resource of the uplink control channel used by the transmission processing part 405 to transmit the channel quality indicator CQI of each downlink component frequency band. Then, the control part 403 outputs the control data comprised of the channel quality indicator CQI in response to each downlink component frequency band generated in the uplink control data generation part 407 to the transmission processing part 405, described later.

In addition, the control part 403 outputs the control data to the transmission processing part 405, where the control data is comprised of the channel quality indicator CQI, which is the channel quality indicator CQI generated in the uplink control data generation part 407, of the downlink component frequency band that is beforehand set to be transmitted using the radio resource of the uplink control channel selected in the uplink control channel selection part 409. In other words, when a plurality of radio resources of uplink control channels to transmit the channel quality indicator CQI for each downlink component frequency band, which is beforehand allocated from the base station apparatus 3, occurs in the same uplink subframe, the control part 403 outputs, to the transmission processing part 405, the control data comprised of the channel quality indicator CQI of the downlink component frequency band of the highest priority.

The transmission processing part 405 encodes the information data and control data according to instructions of the control part 403, arranges the modulated signals in uplink radio resources, and transmits the signal to the base station apparatus 3 via a transmission antenna 413. When a plurality of radio resources of uplink control channels to transmit the channel quality indicator CQI for each downlink component frequency band, which is beforehand allocated from the base station apparatus 3, occurs in the same uplink subframe, the transmission processing part 405 transmits the signal including the control data comprised of the channel quality indicator CQI of the downlink component frequency band of the highest priority input from the control part 403.

<Reception Processing Part 401 of the Mobile Station Apparatus>

Details of the reception processing part 401 of the mobile station apparatus 5 will be described below. FIG. 8 is a schematic block diagram illustrating a configuration of the reception processing part 401 of the mobile station apparatus 5 according to Embodiments of the invention. As shown in the figure, the reception processing part 401 includes a reception RF part 501, A/D part 503, symbol timing detection part 505, GI removal part 507, FTT part 509, demultiplexing part 511, channel estimation part 513, channel quality measurement part 515, downlink shared channel-channel compensation part 517, downlink shared channel decoding part 519, downlink control channel-channel compensation part 521, and downlink control channel decoding part 523, and is comprised thereof. Further, as shown in the figure, the downlink shared channel decoding part 519 is provided with a data demodulation part 525 and turbo decoding part 527. Meanwhile, as shown in the figure, the downlink control channel decoding part 523 is provided with a QPSK demodulation part 529 and Viterbi decoder part 531. The reception RF part 501 properly amplifies a signal received in a reception antenna 411, converts (down-converts) into the intermediate frequency, removes unnecessary frequency components, controls the amplification level so as to maintain the signal level suitably, and performs quadrature demodulation based on the in-phase component and quadrature component of the received signal.

The reception RF part 501 outputs the analog signal subjected to quadrature demodulation to the A/D part 503. The A/D part 503 converts the analog signal on which the reception RF part 501 performs quadrature demodulation into a digital signal, and outputs the converted digital signal to the symbol timing detection part 505 and GI removal part 507. The symbol timing detection part 505 detects timing of symbols based on the digital signal converted in the A/D part 503, and outputs a control signal indicative of the detected timing of symbol boundary to the GI removal part 507. The GI removal part 507 removes a portion corresponding to the guard interval from the digital signal output from the A/D part 503 based on the control signal from the symbol timing detection part 505, and outputs the signal of the remaining portion to the FFT part 509. The FFT part 509 performs fast Fourier transform on the signal input from the GI removal part 507, performs demodulation of the OFDM scheme, and outputs the resultant to the demultiplexing part 511.

The demultiplexing part 511 demultiplexes the signal demodulated by the FFT part 509 into a signal of the downlink control channel and a signal of the downlink shared channel, based on the control signal input from the control part 403. The demultiplexing part 511 outputs the demultiplexed signal of the downlink shared channel to the downlink shared channel-channel compensation part 517, and further outputs the demultiplexed signal of the downlink control channel to the downlink control channel-channel compensation part 521. Meanwhile, the demultiplexing part 511 demultiplexes downlink resource elements in which the downlink pilot channel is arranged, and outputs a downlink reference signal of the downlink pilot channel to the channel estimation part 513 and channel quality measurement part 515.

The channel estimation part 513 estimates a variation of the channel using the downlink reference signal of the downlink pilot channel demultiplexed by the demultiplexing part 511 and a known signal, and outputs a channel compensation value to adjust the amplitude and phase to the downlink shared channel-channel compensation part 517 and downlink control channel-channel compensation part 521 so as to compensate for the variation of the channel. The channel quality measurement part 515 measures the channel quality using the downlink reference signal of the downlink control channel on a downlink component frequency band basis, and outputs the measurement result of the channel quality of each downlink component frequency band to the control part 403. The downlink shared channel-channel compensation part 517 adjusts the amplitude and phase of the signal of the downlink shared channel demultiplexed by the demultiplexing part 511, according to the channel compensation value input from the channel estimation part 513. The downlink shared channel-channel compensation part 517 outputs the signal with the channel adjusted to the data demodulation part 525 of the downlink shared channel decoding part 519.

The downlink shared channel decoding part 519 demodulates and decodes the downlink shared channel based on instructions from the control part 403, and detects information data. The data demodulation part 525 demodulates the signal of the downlink shared channel input from the channel compensation part, and outputs the demodulated signal of the downlink shared channel to the turbo decoding part 527. The demodulation is demodulation corresponding to the modulation scheme used in the data modulation part 221 of the base station apparatus 3. The turbo decoding part 527 decodes the information data from the demodulated signal of the downlink shared channel input from the data demodulation part 525, and outputs the signal to the higher layer via the control part 403. In addition, to the control part 403 is also output the radio resource control information transmitted using the downlink shared channel, the radio resource information obtained by decoding the downlink shared channel and the information of priorities related to selection of radio resources of the mobile station apparatus set for each downlink component frequency band.

The downlink control channel-channel compensation part 521 adjusts the amplitude and phase of the signal of the downlink control channel demultiplexed by the demultiplexing part 511, according to the channel compensation value input from the channel estimation part 513. The downlink control channel-channel compensation part 521 outputs the adjusted signal to the QPSK demodulation part 529 of the downlink control channel decoding part 523.

The downlink control channel decoding part 523 demodulates and decodes the signal input from the channel compensation part 521 as described below, and detects control data. The QPSK demodulation part 529 performs QPSK demodulation on the signal of the downlink control channel to output to the Viterbi decoder part 531. The Viterbi decoder part 531 decodes the signal demodulated in the QPSK demodulation part 529, and outputs the decoded control data to the control part 403. Herein, the signal is represented on a bit-by-bit basis, and the Viterbi decoder part 531 also performs rate dematching to adjust the number of bits to perform the Viterbi decoding processing on the input bit.

In addition, the control part 403 determines whether the control data input from the Viterbi decoder part 531 has no error and is the control data to the apparatus 5, and when the part 403 determines that the control data has no error and is the control data to the apparatus 5, based on the control data, controls the demultiplexing part 511, data demodulation part 525, turbo decoding part 527 and transmission processing part 405.

<Transmission Processing Part 405 of the Mobile Station Apparatus>

Figure 9:
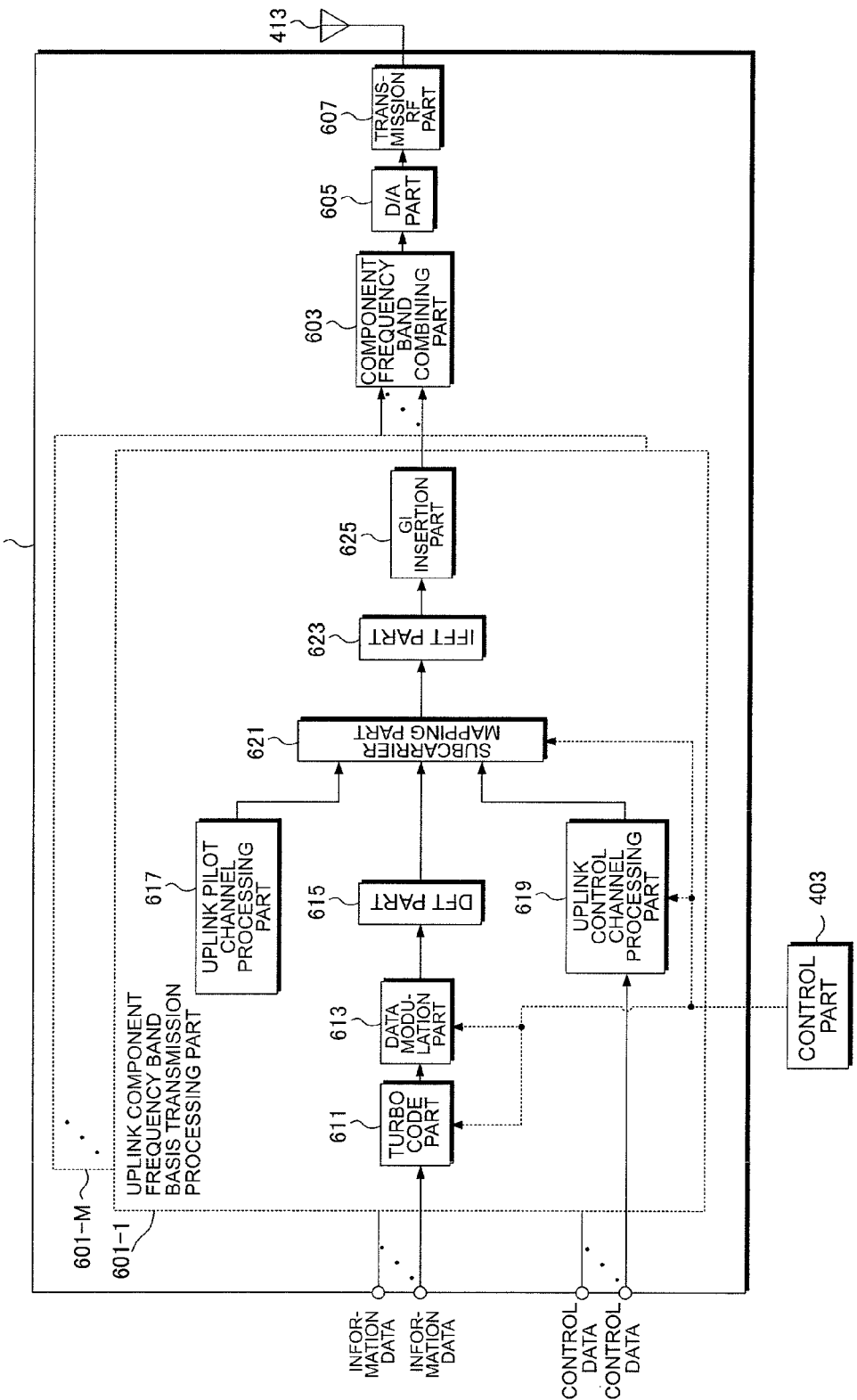
FIG. 9 is a schematic block diagram illustrating a configuration of a transmission processing part 405 of the mobile station apparatus 5 according to Embodiment 1 of the invention.

FIG. 9 is a schematic block diagram illustrating a configuration of the transmission processing part 405 of the mobile station apparatus 5 according to Embodiments of the invention. As shown in the figure, the transmission processing part 405 includes a plurality of uplink component frequency band basis transmission processing parts 601, component frequency band combining part 603, D/A part 605, transmission RF part 607 and transmission antenna 413 and is comprised thereof. Further, as shown in the figure, the uplink component frequency band basis transmission processing part 601 is provided with a turbo code part 611, data modulation part 613, DFT part 615, uplink pilot channel processing part 617, uplink control channel processing part 619, subcarrier mapping part 621, IFFT part 623 and GI insertion part 625. The mobile station apparatus 5 has the uplink component frequency band basis transmission processing parts 601 corresponding to the number of uplink component frequency bands that the apparatus 5 supports. In addition, each of the uplink component frequency band basis transmission processing parts 601 has the same configuration and function, and one of the parts is represented to describe.

The uplink component frequency band basis transmission processing part 601 encodes and modulates the information data and control data, and generates signals transmitted using the uplink shared channel and uplink control channel within the uplink component frequency band. For example, the uplink component frequency band basis transmission processing part 601 encodes and modulates the control data comprised of a channel quality indicator CQI, and generates a signal transmitted using the uplink control channel. The turbo code part 611 performs turbo coding to enhance error tolerance of data on the input information data with a coding rate designated from the control part 403, and outputs the resultant to the data modulation part 613. The data modulation part 613 modulates the coded data coded by the turbo code part 611 with a modulation scheme designated from the control part 403, for example, a modulation scheme of QPSK, 16QAM, 64QAM or the like, and generates a signal sequence of modulation symbols. The data modulation part 613 outputs the generated signal sequence of modulation symbols to the DFT part 615.

The DFT part 615 performs discrete Fourier transform on the signal output from the data modulation part 613 to output to the subcarrier mapping part 621. The uplink control channel processing part 619 performs baseband signal processing to transmit the control data input from the control part 403. The control data input to the uplink control channel processing part 619 is any one of the downlink channel quality indicator CQI, acknowledgement/negative-acknowledgment ACK/NACK, scheduling request SR and both of the downlink channel quality indicator CQI and acknowledgement/negative-acknowledgment ACK/NACK. The uplink control channel processing part 619 generates a different type of signal corresponding to the type of control data to perform the processing, and outputs the signal to the subcarrier mapping part 621. The type of control data to perform the processing is input to the uplink control channel processing part 619 from the control part 403. The uplink pilot channel processing part 617 generates an uplink reference signal that is a known signal in the base station apparatus 3, and outputs the signal to the subcarrier mapping part 621.

The subcarrier mapping part 621 arranges the signal input from the uplink pilot channel processing part 617, the signal input from the DFT part 615, and the signal input from the uplink control channel processing part 619 in subcarriers according to instructions from the control part 403, and outputs the resultant to the IFFT part 623. In addition, to maintain the single-carrier attribute of transmission signal, the subcarrier mapping part 621 does not arrange the signal of the uplink shared channel and the signal of the uplink control channel in the same uplink subframe and does not output the signal of the uplink shared channel and the signal of the uplink control channel in the same uplink subframe. Similarly, the subcarrier mapping part 621 does not arrange signals of a plurality of uplink shared channels in the same uplink subframe and does not output signals of a plurality of uplink shared channels in the same uplink subframe. Similarly, when the mobile station apparatus 5 is limited at least in the transmission power, the subcarrier mapping part 621 does not arrange signals of a plurality of uplink shared channels in the same uplink subframe and does not output signals of a plurality of uplink shared channels in the same uplink subframe. Actually, the control part 403 controls the subcarrier mapping part 621 to perform the aforementioned processing.

In addition, when the transmission power is limited, the mobile station apparatus 5 neither arranges nor transmits a plurality of uplink shared channels and a plurality of uplink control channels in the same uplink subframe in different uplink component frequency bands. When limitations are not imposed on the transmission power significantly, the mobile station apparatus 5 may arrange and transmit a plurality of uplink shared channels, a plurality of uplink control channels, and the uplink shared channel and uplink control channel in the same uplink subframe in different uplink component frequency bands.

In addition, with respect to the arrangement of signals of uplink pilot channels in the uplink shared channel and the arrangement of signals of uplink pilot channels in the uplink control channel, the subcarrier mapping part 621 arranges the signals by time multiplexing as shown in FIG. 3 to output. The IFFT part 623 performs inverse fast Fourier transform on the signal output from the subcarrier mapping part 621 to output to the GI insertion part 625. Herein, the number of points of the IFFT part 623 is higher than the number of points of the DFT part 615, and by using the DFT part 615, subcarrier mapping part 621 and IFFT part 623, the mobile station apparatus 5 performs modulation of the DFT-Spread-OFDM scheme on the signal to transmit using the uplink shared channel. The GI insertion part 625 adds a guard interval to the signal input from the IFFT part 623 to output to the component frequency band combining part 603.

The component frequency band combining part 603 combines signals for each uplink component frequency band input from the uplink component frequency band basis transmission processing parts 601 to output to the D/A part 605. The D/A part 605 converts the digital baseband signal input from the component frequency band combining part 603 into an analog signal, and outputs the signal to the transmission RF part 607. The transmission RF part 607 generates an in-phase component and quadrature component of the intermediate frequency from the analog signal input from the D/A part 605, and removes excess frequency components with respect to the intermediate frequency band. Next, the transmission RF part 607 converts (up-converts) the signal of the intermediate frequency into a signal of the high frequency, removes excess frequency components, amplifies the power, and transmits the signal to the base station apparatus 3 via the transmission antenna 413.

By the aforementioned configuration, the transmission processing part 405 arranges the channel quality indicator CQI generated in the uplink control data generation part 407 in the radio resource of the uplink control channel selected in the uplink control channel selection part 409 to transmit to the base station apparatus.

<Priorities Related to Selection of Radio Resources of the Mobile Station Apparatus Set for Each Downlink Component Frequency Band>

Described next are details of priorities related to selection of radio resources of uplink control channels to transmit the channel quality indicator CQI of the mobile station apparatus set 5 for each downlink component frequency band.

FIG. 10 is a diagram showing an example of priorities of channel quality indicators CQIs for each downlink component frequency band in Embodiment 1 of the invention. In addition, described herein is the case of three downlink component frequency bands (first downlink component frequency band, second downlink component frequency band and third downlink component frequency band). The radio resource control part 103 of the base station apparatus 3 ranks each downlink component frequency band as a priority. In FIG. 10, the radio resource control part 103 ranks the first downlink component frequency band as the first, the second downlink component frequency band as the second, and third downlink component frequency band as the third, and the base station apparatus 3 transmits information indicative of such priorities of channel quality indicators CQIs for each downlink component frequency band to the mobile station apparatus 5.

Based on the received information indicative of priorities of channel quality indicators CQIs for each downlink component frequency band, the mobile station apparatus 5 selects a radio resource of a particular uplink control channel, when a plurality of radio resources of uplink control channels to transmit the channel quality indicator CQI for each downlink component frequency band, which is beforehand allocated from the base station apparatus 3, occurs in the same time frame.

For example, when in the same uplink subframe occur the radio resource of the uplink control channel to transmit the channel quality indicator CQI in response to the first downlink component frequency band and the radio resource of the uplink control channel to transmit the channel quality indicator CQI in response to the second downlink component frequency band, the uplink control channel selection part 409 of the mobile station apparatus 5 selects the radio resource of the uplink control channel to transmit the channel quality indicator CQI in response to the first downlink component frequency band of a higher rank as the priority. The control part 403 outputs the channel quality indicator CQI of the first downlink component frequency band selected in the uplink control channel selection part 409 to the transmission processing part 405.

For example, when in the same uplink subframe occur the radio resource of the uplink control channel to transmit the channel quality indicator CQI in response to the second downlink component frequency band and the radio resource of the uplink control channel to transmit the channel quality indicator CQI in response to the third downlink component frequency band, the uplink control channel selection part 409 selects the radio resource of the uplink control channel to transmit the channel quality indicator CQI in response to the second downlink component frequency band of a higher rank as the priority. The control part 403 outputs the channel quality indicator CQI of the second downlink component frequency band selected in the uplink control channel selection part 409 to the transmission processing part 405.

For example, when in the same uplink subframe occur the radio resource of the uplink control channel to transmit the channel quality indicator CQI in response to the first downlink component frequency band, the radio resource of the uplink control channel to transmit the channel quality indicator CQI in response to the second downlink component frequency band, and the radio resource of the uplink control channel to transmit the channel quality indicator CQI in response to the third downlink component frequency band, the uplink control channel selection part 409 selects the radio resource of the uplink control channel to transmit the channel quality indicator CQI in response to the first downlink component frequency band of the highest rank as the priority. The control part 403 outputs the channel quality indicator CQI of the first downlink component frequency band selected in the uplink control channel selection part 409 to the transmission processing part 405.

<Configuration of the Uplink Control Channel for Transmission of the Channel Quality Indicator CQI>

Figure 11A:
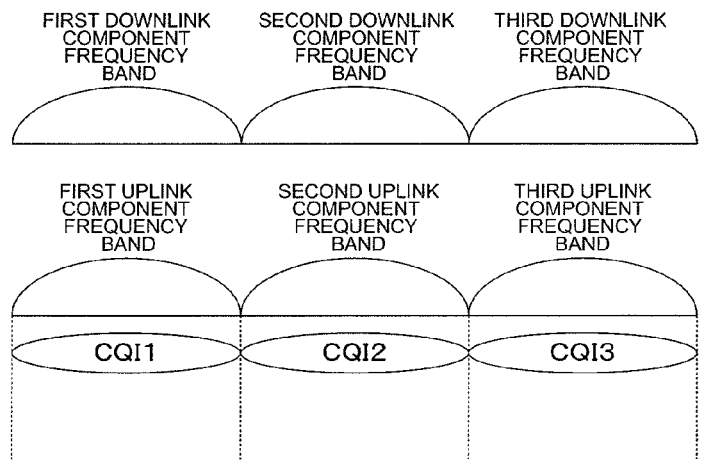
FIG. 11A is a diagram showing a setting in the frequency domain for a plurality of uplink control channels to transmit channel quality indicators CQIs in Embodiments of the invention.
Figure 11B:
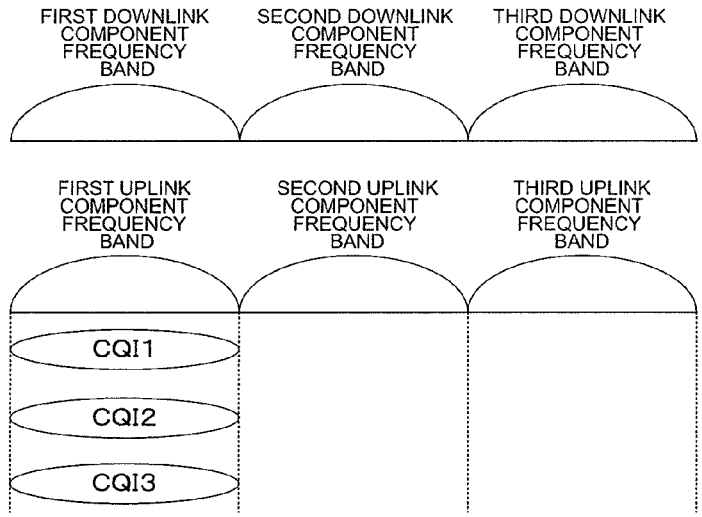
FIG. 11B is a diagram showing another setting in the frequency domain for a plurality of uplink control channels to transmit channel quality indicators CQIs in Embodiments of the invention.
Figure 11C:
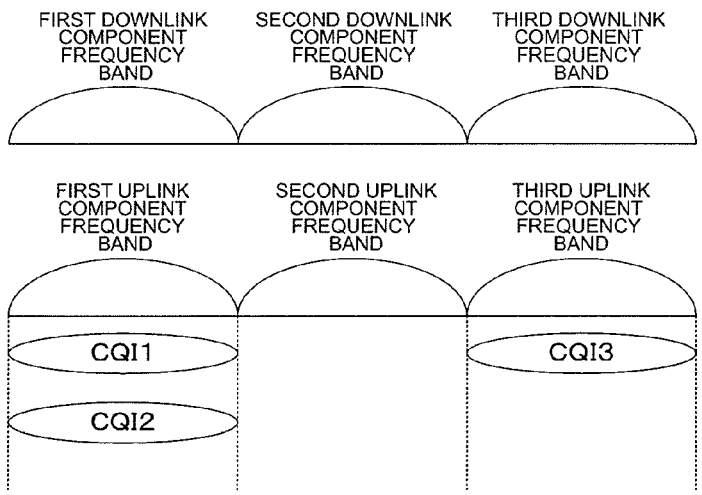
FIG. 11C is a diagram showing still another setting in the frequency domain for a plurality of uplink control channels to transmit channel quality indicators CQIs in Embodiments of the invention.

FIGS. 11A, 11B and 11C are diagrams showing settings in the frequency domain for a plurality of uplink control channels to transmit channel quality indicators CQIs in Embodiments of the invention. In addition, described herein is the case of three downlink component frequency bands (first downlink component frequency band, second downlink component frequency band and third downlink component frequency band), and three uplink component frequency bands (first uplink component frequency band, second uplink component frequency band and third uplink component frequency band).

For example, as shown in FIG. 11A, the radio resource control part 103 of the base station apparatus 3 sets each uplink component frequency band for the radio resource of the uplink control channel to transmit the channel quality indicator CQI in response to each downlink component frequency band, for the mobile station apparatus 5, and notifies the mobile station apparatus 5 of the information on the radio resources of the uplink control channels to transmit the channel quality indicator CQI.

In FIG. 11A, CQI 1 represents an uplink control channel to transmit the channel quality indicator CQI in response to the first downlink component frequency band, which the radio resource control part 103 sets on the first uplink component frequency band, CQI 2 represents an uplink control channel to transmit the channel quality indicator CQI in response to the second downlink component frequency band, which the radio resource control part 103 sets on the second uplink component frequency band, and CQI 3 represents an uplink control channel to transmit the channel quality indicator CQI in response to the third downlink component frequency band, which the radio resource control part 103 sets on the third uplink component frequency band. For example, as shown in FIG. 3, the uplink control channel to transmit each channel quality indicator CQI is configured by using an uplink resource block pair at ends of the frequency region of each uplink component frequency band.

Further, for example, as shown in FIG. 11B, the radio resource control part 103 of the base station apparatus 3 sets a single uplink component frequency band for radio resources of uplink control channels to transmit the channel quality indicator CQI in response to each downlink component frequency band, for the mobile station apparatus 5, and notifies the mobile station apparatus 5 of the information on the radio resources of the uplink control channels to transmit the channel quality indicator CQI.

In FIG. 11B, CQI 1 represents an uplink control channel to transmit the channel quality indicator CQI in response to the first downlink component frequency band, which the radio resource control part 103 sets on the first uplink component frequency band, CQI 2 represents an uplink control channel to transmit the channel quality indicator CQI in response to the second downlink component frequency band, which the radio resource control part 103 sets on the first uplink component frequency band, and CQI 3 represents an uplink control channel to transmit the channel quality indicator CQI in response to the third downlink component frequency band, which the radio resource control part 103 sets on the first uplink component frequency band. For example, as shown in FIG. 3, the uplink control channel to transmit each channel quality indicator CQI is configured by using one or more uplink resource block pairs from the end of the frequency region of the uplink component frequency band of the lowest frequency.

In addition, it is possible to use a configuration of combination of settings of radio resources of uplink control channels as described in FIGS. 11A and 11B. For example, as shown in FIG. 11C, the radio resource control part 103 of the base station apparatus 3 sets a plurality of uplink component frequency bands for the radio resource of the uplink control channel to transmit the channel quality indicator CQI in response to each downlink component frequency band, further sets part of uplink component frequency bands for radio resources of uplink control channels to transmit the channel quality indicators CQIs in response to a plurality of downlink component frequency bands for the mobile station apparatus 5, and notifies the mobile station apparatus 5 of the information on the radio resources of the uplink control channels to transmit the channel quality indicator CQI.

In FIG. 11C, CQI 1 represents an uplink control channel to transmit the channel quality indicator CQI in response to the first downlink component frequency band, which the radio resource control part 103 sets on the first uplink component frequency band, CQI 2 represents an uplink control channel to transmit the channel quality indicator CQI in response to the second downlink component frequency band, which the radio resource control part 103 sets on the first uplink component frequency band, and CQI 3 represents an uplink control channel to transmit the channel quality indicator CQI in response to the third downlink component frequency band, which the radio resource control part 103 sets on the third uplink component frequency band.

Figure 12:
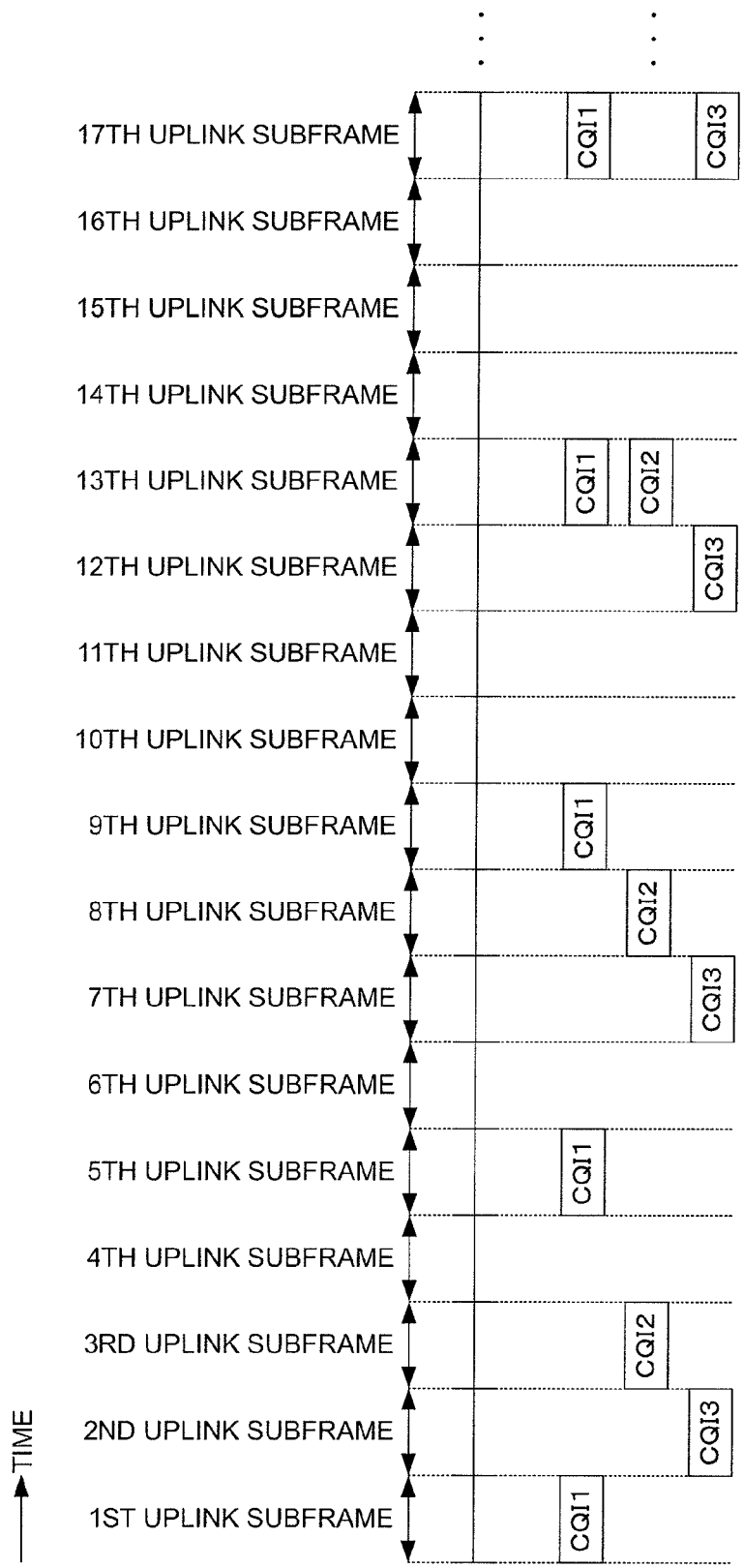
FIG. 12 is a diagram showing a setting in the time domain for a plurality of uplink control channels to transmit channel quality indicators CQIs in Embodiments of the invention.

FIG. 12 is a diagram showing a setting in the time domain for a plurality of uplink control channels to transmit channel quality indicators CQIs in Embodiments of the invention. FIG. 12 shows the setting on an uplink subframe basis. For the mobile station apparatus 5, the radio resource control part 103 of the base station apparatus 3 sets the radio resource of CQI 1 every four uplink subframes starting with the first uplink subframe, sets the radio resource of CQI 2 every five uplink subframes starting with the third uplink subframe, and further sets the radio resource of CQI 3 every five uplink subframes starting with the second uplink subframe. The radio resource control part 103 notifies the mobile station apparatus 5 of allocation cycles and allocation start uplink subframes of uplink control channels (CQI 1, CQI 2, CQI 3) to transmit the channel quality indicator CQI, through the transmission processing part 107.

As a result, the radio resources of CQI 1 and CQI 2 occur at the same time in the 13th uplink subframe, and the radio resources of CQI 1 and CQI 3 occur at the same time in the 17th uplink subframe. Using FIG. 10, described is the processing of the uplink control channel selection part 409 of the mobile station apparatus 5 in the 13th uplink subframe and the 17th uplink subframe. In the 13th uplink subframe, the uplink control channel selection part 409 selects CQI 1 that is the uplink control channel to transmit the channel quality indicator CQI in response to the first downlink component frequency band of high priority. In the 17th uplink subframe, the uplink control channel selection part 409 selects CQI 1 that is the uplink control channel to transmit the channel quality indicator CQI in response to the first downlink component frequency band of high priority.

<Flow of Selection of Uplink Control Channels to Transmit the Channel Quality Indicator CQI>

Figure 13:
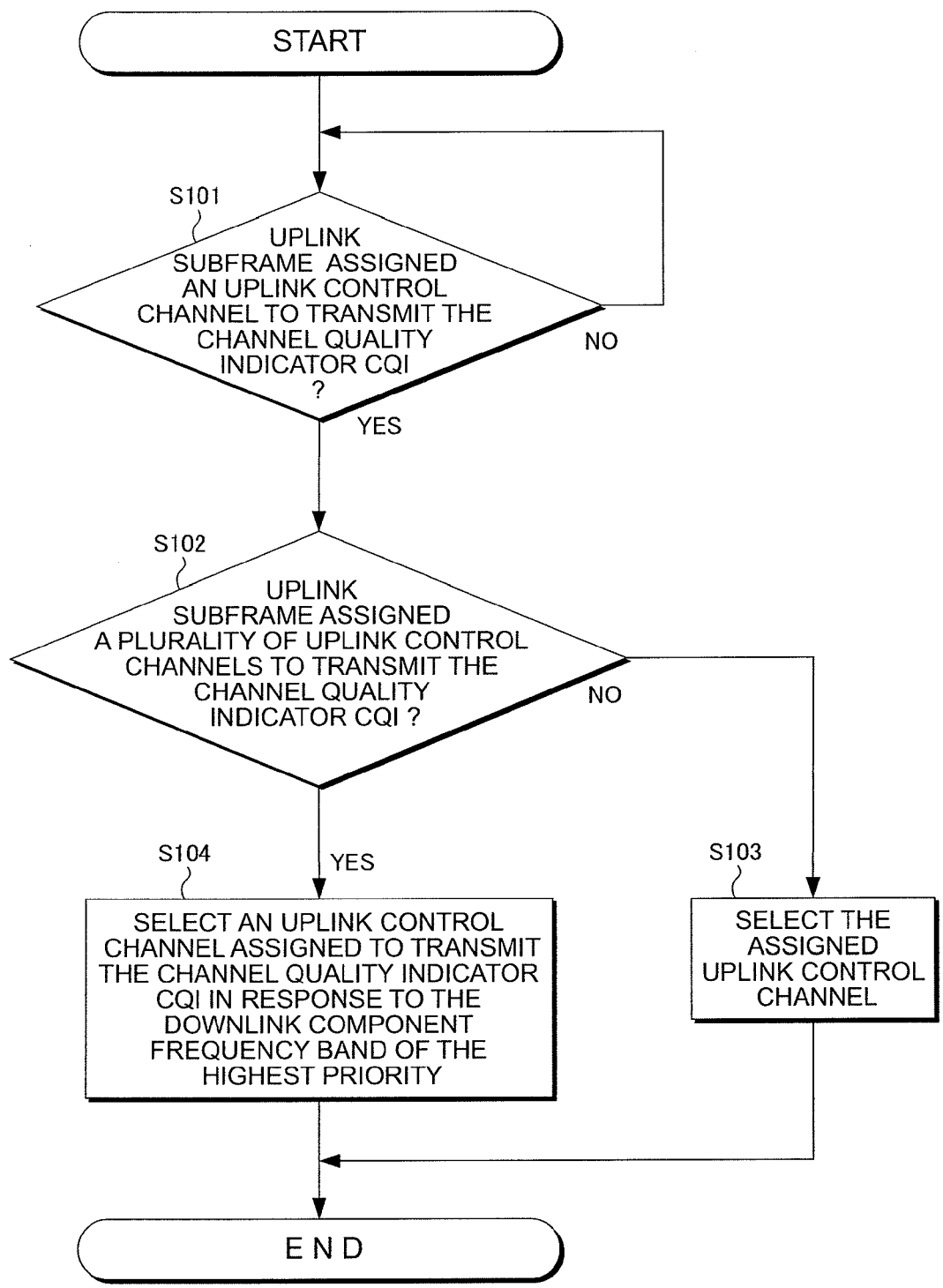
FIG. 13 is a flowchart showing an example of processing on an uplink subframe basis related to selection of uplink control channels to transmit the channel quality indicator CQI of the mobile station apparatus 5 according to Embodiment 1 of the invention.

FIG. 13 is a flowchart showing an example of processing on an uplink subframe basis related to selection of uplink control channels to transmit the channel quality indicator CQI of the mobile station apparatus 5 according to Embodiment 1 of the invention. The uplink control channel selection part 409 determines whether or not an uplink subframe is an uplink subframe assigned an uplink control channel to transmit the channel quality indicator CQI (step S101). When the uplink control channel selection part 409 determines that the uplink subframe is not an uplink subframe assigned an uplink control channel to transmit the channel quality indicator CQI, the processing proceeds again to step S101 in a next uplink subframe. Meanwhile, when the uplink control channel selection part 409 determines that the uplink subframe is an uplink subframe assigned an uplink control channel to transmit the channel quality indicator CQI, the uplink control channel selection part 409 determines whether or not the uplink subframe is an uplink subframe assigned a plurality of uplink control channels to transmit the channel quality indicator CQI (step S102).

When the uplink control channel selection part 409 determines that the uplink subframe is not an uplink subframe assigned a plurality of uplink control channels to transmit the channel quality indicator CQI, the uplink control channel selection part 409 selects the assigned uplink control channel (step S103). When the uplink control channel selection part 409 determines that the uplink subframe is an uplink subframe assigned a plurality of uplink control channels to transmit the channel quality indicator CQI, the uplink control channel selection part 409 selects an uplink control channel assigned to transmission of the channel quality indicator CQI in response to the downlink component frequency band of the highest priority (step S104). After step S103 and step S104, the mobile station apparatus 5 finishes the processing related to selection of uplink control channels to transmit the channel quality indicator CQI, and transmits the channel quality indicator CQI to the base station apparatus 3 using the selected uplink control channel.

The invention enables channel quality indicators CQIs in response to a plurality of downlink component frequency bands to be efficiently controlled and further enables the mobile station apparatus 5 to suitably transmit signals including the channel quality indicators CQIs. When a plurality of radio resources of uplink control channels to transmit the channel quality indicator CQI for each of the downlink component frequency bands occurs in the same uplink subframe, the mobile station apparatus 5 selects a particular radio resource, and is capable of maintaining the single-carrier attribute of transmission signal, and mobile station apparatuses limited in power are capable of transmitting signals to meet the required quality.

Further, the base station apparatus 3 sets priorities related to selection of radio resources of uplink control channels to transmit the channel quality indicator CQI for each downlink component frequency band, in consideration of the priority in scheduling for each downlink component frequency band for each mobile station apparatus 5, the mobile station apparatus 5 thereby preferentially transmits the channel quality indicator CQI of the downlink component frequency band of high priority to the base station apparatus 3, and the base station apparatus 3 is capable of performing suitable scheduling on the downlink component frequency band of high priority in scheduling, using the channel quality indicator CQI.

In addition, the base station apparatus 3 grasps the priorities related to selection of radio resources of uplink control channels to transmit the channel quality indicator CQI for each downlink component frequency band set on the mobile station apparatus 5, and radio resources of uplink control channels to transmit the channel quality indicator CQI, and therefore, when a plurality of radio resources of uplink control channels to transmit the channel quality indicator CQI occurs in the same uplink subframe, recognizes the radio resource of the uplink control channel used by the mobile station apparatus 5 in transmission, and the downlink component frequency band associated with the channel quality indicator CQI.

In addition, the invention is not limited to the wireless communication system 1 comprised of the number of downlink component frequency bands and the number of uplink component frequency bands used in the description in the aforementioned Embodiment, and is applicable to wireless communication systems 1 comprised of the different numbers of downlink component frequency bands and uplink component frequency bands. Further, the invention is applicable to wireless communication systems 1 where the number of downlink component frequency bands is higher than the number of uplink component frequency bands, and wireless communication systems 1 where the number of uplink component frequency bands is higher than the number of downlink component frequency bands.

In addition, the invention is not limited to the wireless communication system 1 comprised of the allocation cycle of radio resources of uplink control channels to transmit the channel quality indicator CQI used in the description in the above-mentioned Embodiment, and is applicable to wireless communication systems 1 using different allocation cycles. In addition, the invention may be applied only to mobile station apparatuses limited in power. Mobile station apparatuses without significant limitations in power i.e. mobile station apparatuses with considerably excess transmission power enabling transmission while satisfying the quality required for signals may transmit the channel quality indicator CQI using radio resources of a plurality of uplink control channels in the same uplink subframe, and the invention is applied to mobile station apparatuses limited in power so that such apparatuses select a radio resource of a particular uplink control channel to transmit the channel quality indicator CQI.

Embodiment 2

In Embodiment 2 of the invention, the mobile station apparatus 5 selects a radio resource of an uplink control channel to transmit the channel quality indicator CQI in the uplink component frequency band assigned a radio resource of an uplink control channel to transmit acknowledgement/negative-acknowledgment ACK/NACK, and transmits the channel quality indicator CQI of a downlink component frequency band assigned the selected radio resource.

Figure 14:
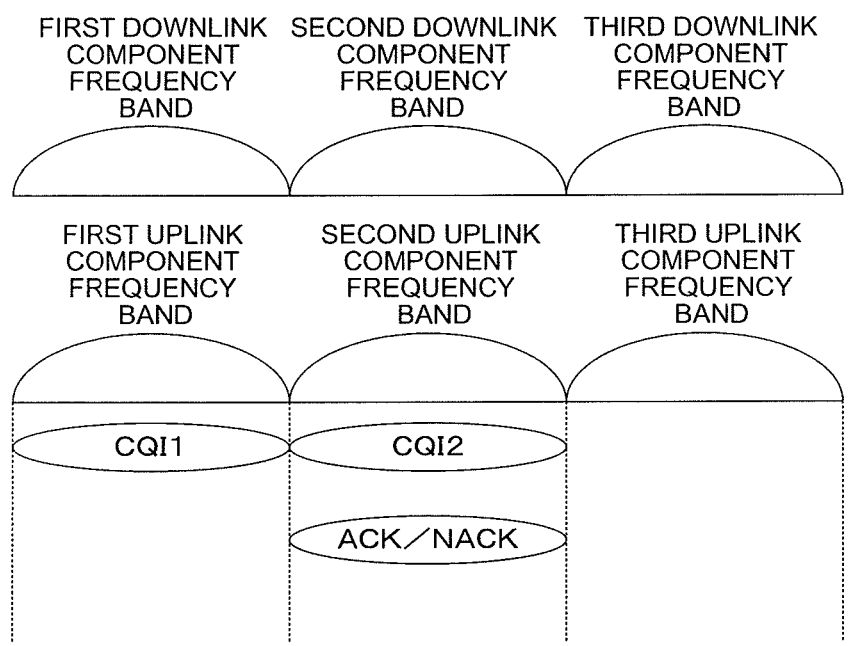
FIG. 14 is a diagram illustrating the case of concurrent occurrences of a plurality of uplink channels to transmit the channel quality indicator CQI and an uplink channel to transmit acknowledgement/negative-acknowledgement ACK/NACK in some uplink subframe in Embodiment 2 of the invention.

FIG. 14 is a diagram illustrating the case of concurrent occurrences of a plurality of uplink control channels to transmit the channel quality indicator CQI and an uplink control channel to transmit acknowledgement/negative-acknowledgement ACK/NACK in some uplink subframe in Embodiment 2 of the invention. In addition, described herein is the case of three downlink component frequency bands (first downlink component frequency band, second downlink component frequency band and third downlink component frequency band) and three uplink component frequency bands (first uplink component frequency band, second uplink component frequency band and third uplink component frequency band).

In the mobile station apparatus 5, in the first uplink component frequency band, the radio resource of uplink control channel CQI 1 to transmit the channel quality indicator CQI of the first downlink component frequency band is beforehand allocated from the radio resource control part 103 of the base station apparatus 3. Similarly, in the mobile station apparatus 5, in the second uplink component frequency band, beforehand allocated is the radio resource of uplink control channel CQI 2 to transmit the channel quality indicator CQI of the second downlink component frequency band. Further, the mobile station apparatus 5 receives a downlink control channel indicative of the uplink control channel to transmit acknowledgement/negative-acknowledgment ACK/NACK that is a radio resource of the second uplink component frequency band.

When the uplink control data generation part 407 generates control data indicative of acknowledgement/negative-acknowledgment ACK/NACK, the uplink control channel selection part 409 of the mobile station apparatus 5 selects the radio resource of the uplink control channel to transmit the channel quality indicator CQI in the uplink component frequency band in which is arranged the uplink control channel assigned to transmission of acknowledgement/negative-acknowledgment ACK/NACK. The transmission processing part 405 of the mobile station apparatus 5 generates a signal including the channel quality indicator CQI of the downlink component frequency band and acknowledgement/negative-acknowledgment ACK/NACK, which is assigned the radio resource of the uplink control channel selected in the uplink control channel selection part 409, and transmits the signal to the base station apparatus 3.

The uplink control channel processing part 619 of the mobile station apparatus 5 generates the signal including the channel quality indicator CQI and acknowledgement/negative-acknowledgment ACK/NACK in a form different from the signal including only the channel quality indicator CQI. For example, the uplink control channel processing part 619 performs modulation on the uplink reference signal with respect to the signal including only the channel quality indicator CQI, and generates the signal including the channel quality indicator CQI and acknowledgement/negative-acknowledgment ACK/NACK. The uplink control channel detection part 329 of the base station apparatus 3 detects acknowledgement/negative-acknowledgment ACK/NACK from the uplink reference signal of the received uplink control channel, and detects the channel quality indicator CQI from a signal except the uplink reference signal.

<Flow of Selection of Uplink Control Channels to Transmit the Channel Quality Indicator CQI>

Figure 15:
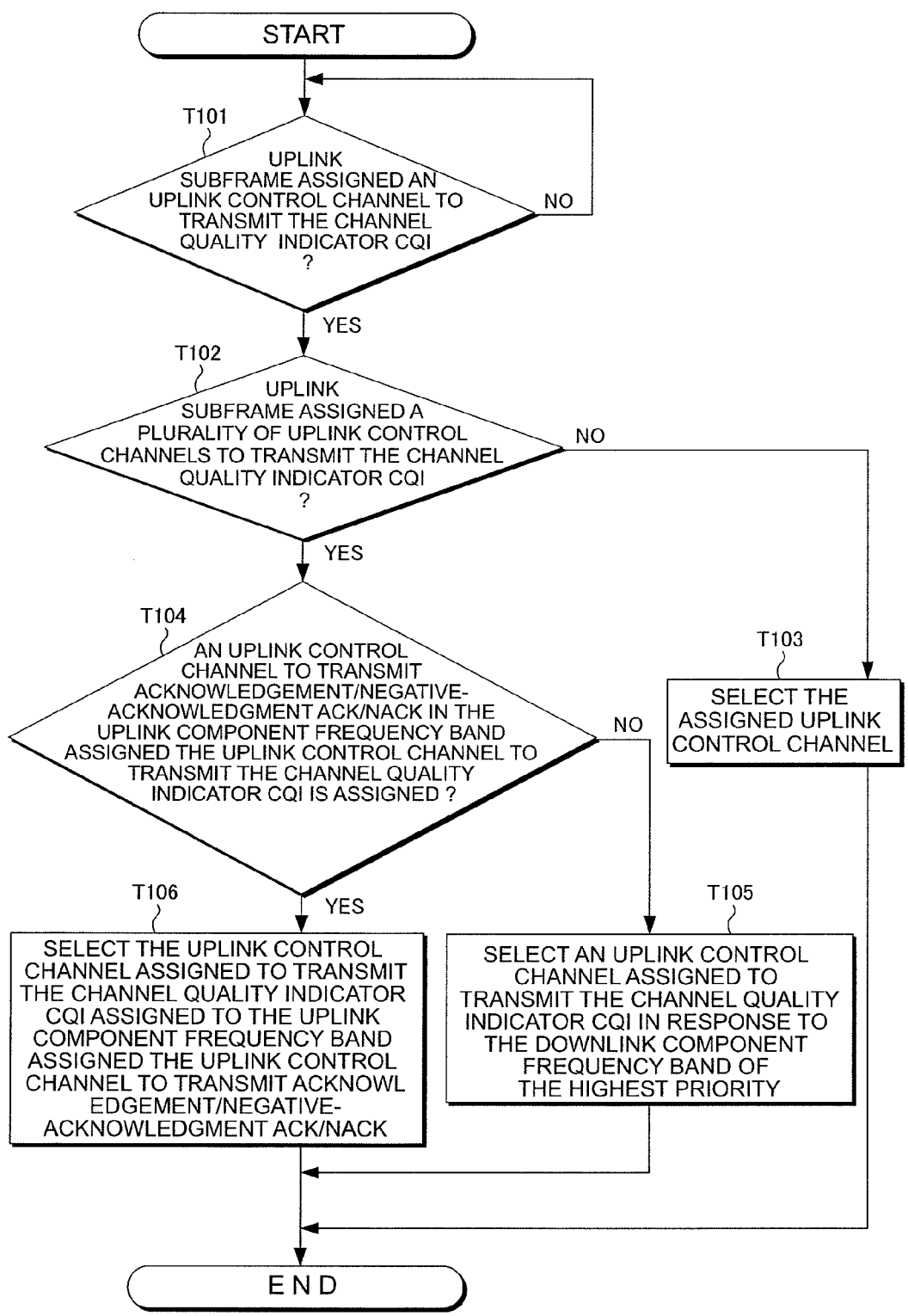
FIG. 15 is a flowchart showing an example of processing on an uplink subframe basis related to selection of uplink control channels to transmit the channel quality indicator CQI of the mobile station apparatus 5 according to Embodiment 2 of the invention.

FIG. 15 is a flowchart showing an example of processing on an uplink subframe basis related to selection of uplink control channels to transmit the channel quality indicator CQI of the mobile station apparatus 5 according to Embodiment 2 of the invention. The uplink control channel selection part 409 determines whether or not an uplink subframe is an uplink subframe assigned an uplink control channel to transmit the channel quality indicator CQI (step T101). When the uplink control channel selection part 409 determines that the uplink subframe is not an uplink subframe assigned an uplink control channel to transmit the channel quality indicator CQI, the processing proceeds again to step T101 in a next uplink subframe. Meanwhile, when the uplink control channel selection part 409 determines that the uplink subframe is an uplink subframe assigned an uplink control channel to transmit the channel quality indicator CQI, the uplink control channel selection part 409 determines whether or not the uplink subframe is an uplink subframe assigned a plurality of uplink control channels to transmit the channel quality indicator CQI (step T102).

When the uplink control channel selection part 409 determines that the uplink subframe is not an uplink subframe assigned a plurality of uplink control channels to transmit the channel quality indicator CQI, the uplink control channel selection part 409 selects the assigned uplink control channel (step T103). When the uplink control channel selection part 409 determines that the uplink subframe is an uplink subframe assigned a plurality of uplink control channels to transmit the channel quality indicator CQI, the uplink control channel selection part 409 determines whether or not the uplink subframe is assigned an uplink control channel to transmit acknowledgement/negative-acknowledgment ACK/NACK in the uplink component frequency band assigned the uplink control channel to transmit the channel quality indicator CQI (step T104).

When the uplink control channel selection part 409 determines that the uplink subframe is not assigned an uplink control channel to transmit acknowledgement/negative-acknowledgment ACK/NACK in the uplink component frequency band assigned the uplink control channel to transmit the channel quality indicator CQI, the uplink control channel selection part 409 selects an uplink control channel assigned to transmission of the channel quality indicator CQI in response to the downlink component frequency band of the highest priority (step T105). When the uplink control channel selection part 409 determines that the uplink subframe is assigned an uplink control channel to transmit acknowledgement/negative-acknowledgment ACK/NACK in the uplink component frequency band assigned the uplink control channel to transmit the channel quality indicator CQI, the uplink control channel selection part 409 selects an uplink control channel for transmission of the channel quality indicator CQI assigned to the uplink component frequency band assigned the uplink control channel to transmit acknowledgement/negative-acknowledgment ACK/NACK (step T106).

After step T103, step T105 and step S106, the mobile station apparatus 5 finishes the processing related to selection of uplink control channels to transmit the channel quality indicator CQI, and transmits the channel quality indicator CQI to the base station apparatus 3 using the selected uplink control channel.

The invention enables channel quality indicators CQIs in response to a plurality of downlink component frequency bands to be efficiently controlled and further enables the mobile station apparatus 5 to suitably transmit signals including the channel quality indicators CQIs. When in the same uplink subframe occur a radio resource of an uplink control channel to transmit acknowledgement/negative-acknowledgment ACK/NACK, and a plurality of radio resources of uplink control channels to transmit the channel quality indicator CQI for each of the downlink component frequency bands, the mobile station apparatus 5 selects the radio resource of the uplink control channel to transmit the channel quality indicator CQI assigned to the uplink component frequency band assigned the uplink control channel to transmit acknowledgement/negative-acknowledgment ACK/NACK among the plurality of radio resources. By this means, it is possible to maintain the single-carrier attribute of transmission signal, and mobile station apparatuses limited in power are capable of transmitting signals to meet the required quality.

Further, the mobile station apparatus 5 is capable of transmitting acknowledgement/negative-acknowledgment ACK/NACK with a higher priority than the channel quality indicator CQI, and the base station apparatus 3 is capable of actualizing suitable retransmission control of the downlink shared channel.

In addition, Embodiment 1 may be applied to the uplink component frequency band assigned the uplink control channel to transmit acknowledgement/negative-acknowledgment ACK/NACK. For example, with respect to the configuration of a plurality of uplink control channels to transmit the channel quality indicator CQI and the uplink control channel to transmit acknowledgement/negative-acknowledgment ACK/NACK as shown in FIG. 14, it is assumed that in the second uplink component frequency band is further configured a radio resource of an uplink control channel to transmit the channel quality indicator CQI of the third downlink component frequency band. In other words, in the case where a plurality of uplink control channels to transmit the channel quality indicator CQI is assigned to the uplink component frequency band assigned the uplink control channel to transmit acknowledgement/negative-acknowledgment ACK/NACK, Embodiment 1 may be applied to selection of uplink control channels to transmit the channel quality indicator CQI in the uplink component frequency band assigned the uplink control channel to transmit acknowledgement/negative-acknowledgment ACK/NACK.

Figure 16A:
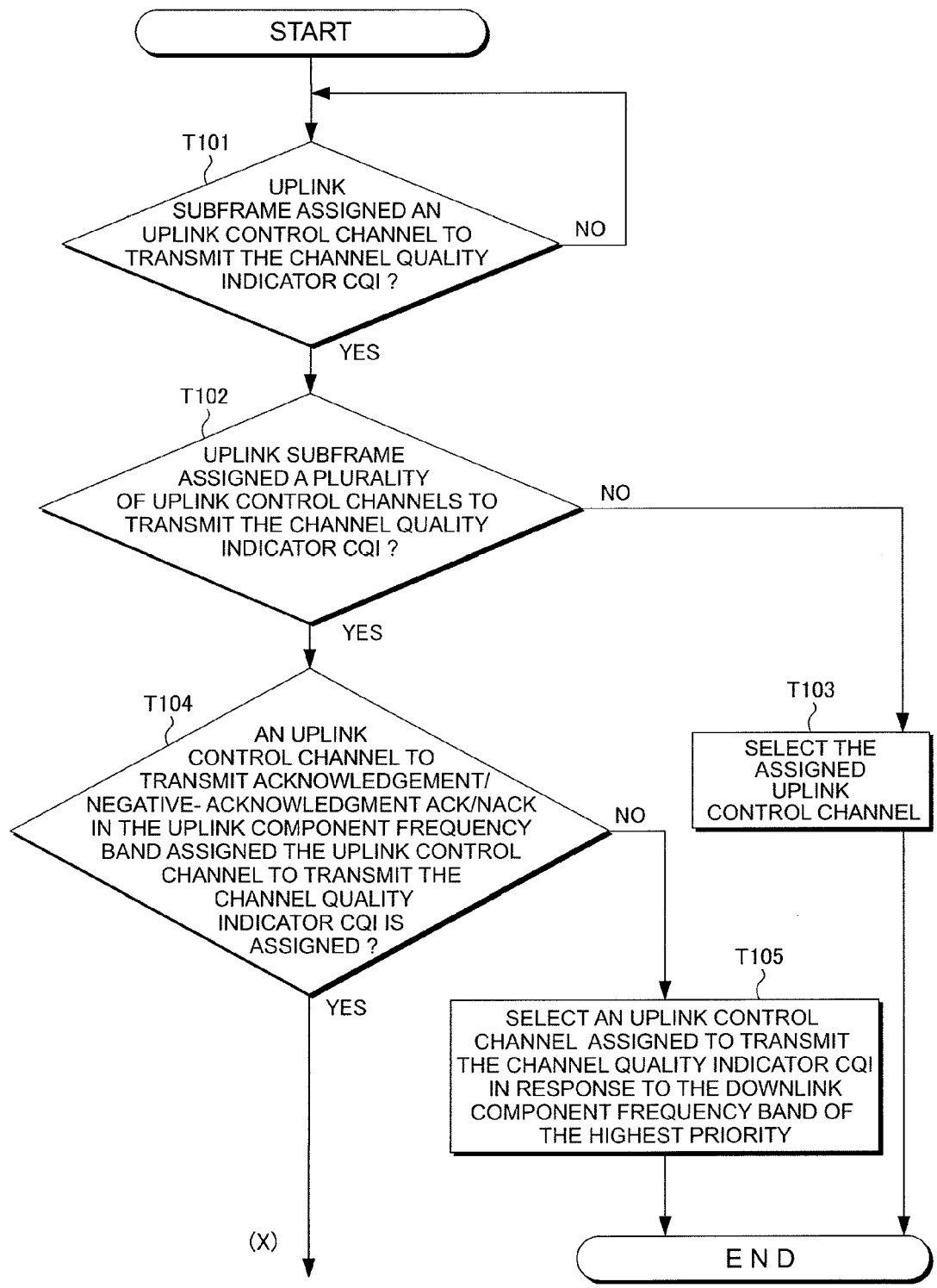
FIG. 16A is a flowchart showing another example of the processing on an uplink subframe basis related to selection of uplink control channels to transmit the channel quality indicator CQI of the mobile station apparatus 5 according to Embodiment 2 of the invention.
Figure 16B:
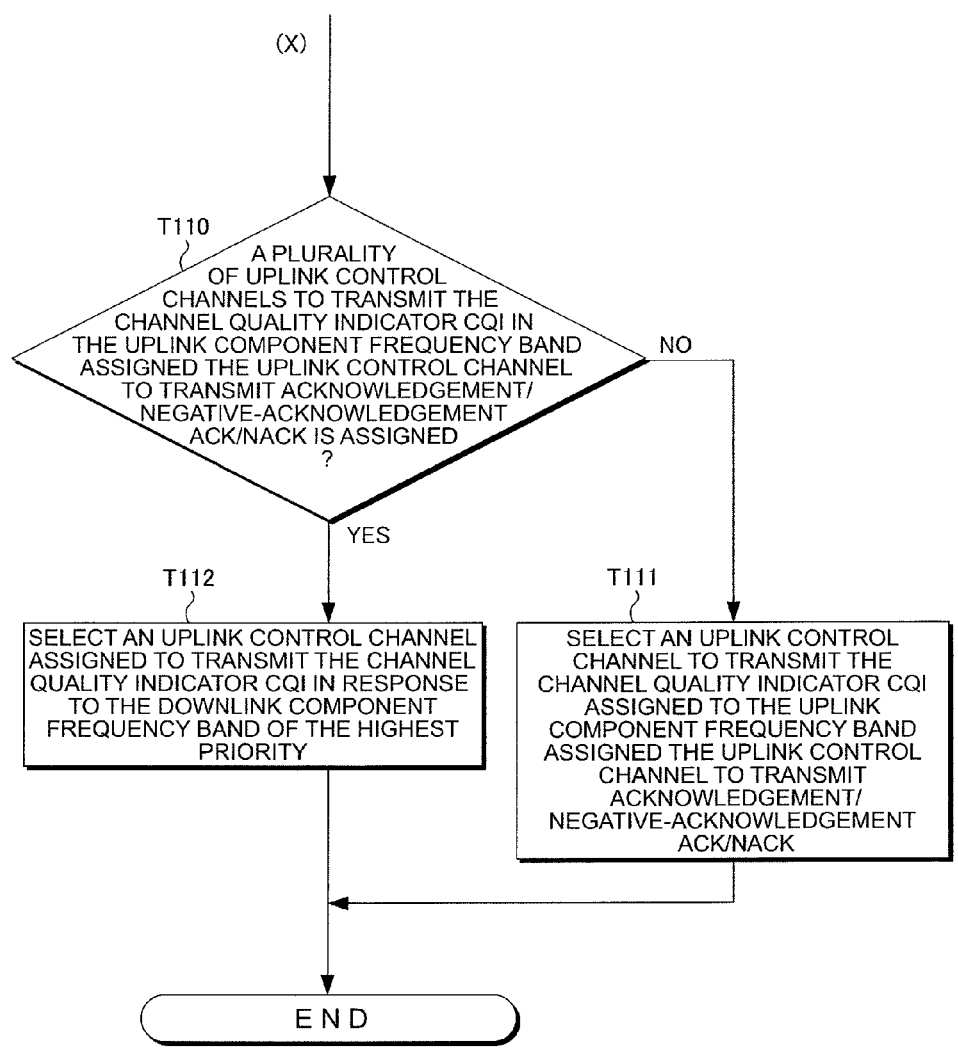
FIG. 16B is another flowchart showing another example of the processing on an uplink subframe basis related to selection of uplink control channels to transmit the channel quality indicator CQI of the mobile station apparatus 5 according to Embodiment 2 of the invention.

FIGS. 16A and 16B are flowcharts showing another example of the processing on an uplink subframe basis related to selection of uplink control channels to transmit the channel quality indicator CQI of the mobile station apparatus 5 according to Embodiment 2 of the invention. In the flow as shown in FIGS. 16A and 16B, as a next step when YES in step T103, it is determined whether the uplink subframe is assigned a plurality of uplink control channels to transmit the channel quality indicator CQI in the uplink component frequency band assigned the uplink control channel to transmit acknowledgement/negative-acknowledgement ACK/NACK (step T110). When it is determined that a plurality of uplink control channels is not assigned, selected is an uplink control channel to transmit the channel quality indicator CQI assigned to the uplink component frequency band assigned the uplink control channel to transmit acknowledgement/negative-acknowledgement ACK/NACK (step T111). Meanwhile, when it is determined that a plurality of uplink control channels is assigned, selected is an uplink control channel assigned to transmission of the channel quality indicator CQI in response to the downlink component frequency band of the highest priority (step T112).

After step T111 and step T112, the mobile station apparatus 5 finishes the processing related to selection of uplink control channels to transmit the channel quality indicator CQI, and transmits the channel quality indicator CQI to the base station apparatus 3 using the selected uplink control channel.

In addition, Embodiment 2 may not use Embodiment 1 together. For example, when a plurality of radio resources of uplink control channels to transmit the channel quality indicator for each downlink component frequency band occurs in the same uplink subframe, the uplink control channel selection part 409 may select an uplink control channel to transmit the channel quality indicator CQI in response to the downlink component frequency band of the lowest frequencies. In other words, in FIG. 15, the processing of step T106 may be to select an uplink control channel assigned to transmission of the channel quality indicator CQI in response to the downlink component frequency band of the lowest frequencies. In Embodiment 2, also when Embodiment 1 is not used together, the mobile station apparatus 5 is capable of transmitting acknowledgement/negative-acknowledgment ACK/NACK with a higher priority than the channel quality indicator CQI.

In addition, the base station apparatus 3 selects the downlink control channel indicative of the uplink control channel to transmit acknowledgement/negative-acknowledgment ACK/NACK by itself, thereby grasps the uplink component frequency band in which is arranged the uplink control channel to transmit acknowledgement/negative-acknowledgment ACK/NACK, and recognizes the uplink control channel assigned to transmission of the channel quality indicator CQI used by the mobile station apparatus 5 in transmission of the channel quality indicator CQI and acknowledgement/negative-acknowledgment ACK/NACK.

Embodiment 3

In Embodiment 3 of the invention, as compared with Embodiment 2, when a plurality of control channels to transmit the channel quality indicator CQI is further set in the uplink component frequency band assigned the radio resource of the uplink control channel to transmit acknowledgement/negative-acknowledgment ACK/NACK, the mobile station apparatus 5 selects a radio resource of an uplink control channel assigned to transmit the channel quality indicator CQI of the downlink component frequency band in which is arranged information indicative of the uplink control channel in the uplink component frequency band used in transmission of acknowledgement/negative-acknowledgment ACK/NACK. Then, the mobile station apparatus 5 transmits the channel quality indicator CQI of the downlink component frequency band assigned the selected radio resource. The information indicative of the uplink control channel in the uplink component frequency band used in transmission of acknowledgement/negative-acknowledgment ACK/NACK is of the downlink control channel.

Figure 17:
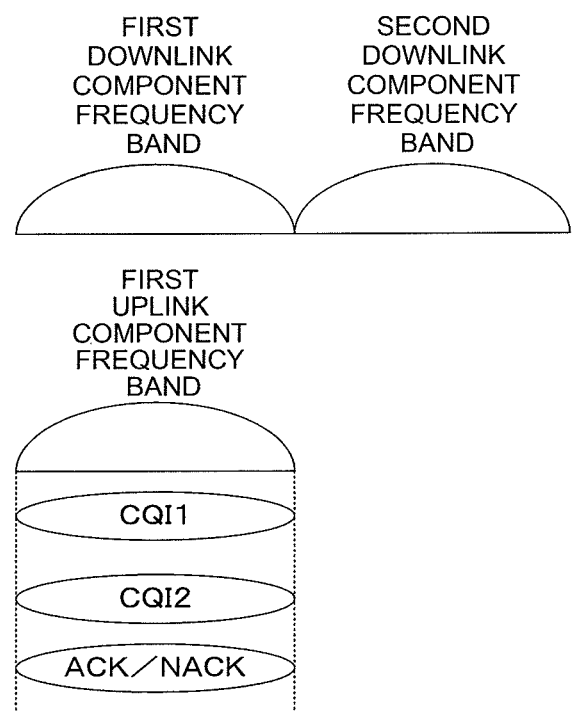
FIG. 17 is a diagram illustrating the case of concurrent occurrences of a plurality of uplink channels to transmit the channel quality indicator CQI and an uplink channel to transmit acknowledgement/negative-acknowledgement ACK/NACK in some uplink subframe in Embodiment 3 of the invention.

FIG. 17 is a diagram illustrating the case of concurrent occurrences of a plurality of uplink channels to transmit the channel quality indicator CQI and an uplink channel to transmit acknowledgement/negative-acknowledgement ACK/NACK in some uplink subframe in Embodiment 3 of the invention. In addition, described herein is the case of two downlink component frequency bands (first downlink component frequency band, and second downlink component frequency band) and one uplink component frequency band (first uplink component frequency band).

In the mobile station apparatus 5, in the first uplink component frequency band, the radio resource of uplink control channel CQI 1 to transmit the channel quality indicator CQI of the first downlink component frequency band is beforehand allocated from the radio resource control part 103 of the base station apparatus 3. Similarly, in the mobile station apparatus 5, in the first uplink component frequency band, beforehand allocated is the radio resource of uplink control channel CQI 2 to transmit the channel quality indicator CQI of the second downlink component frequency band. Further, the mobile station apparatus 5 receives a downlink control channel indicative of the uplink control channel to transmit acknowledgement/negative-acknowledgment ACK/NACK that is a radio resource of the first uplink component frequency band, in the first downlink component frequency band.

Described is the relationship between the downlink control channel and the uplink control channel of acknowledgement/negative-acknowledgment ACK/NACK. In the uplink component frequency band are beforehand configured radio resources of uplink control channels to transmit acknowledgement/negative-acknowledgment ACK/NACK for downlink shared channels for each downlink component frequency band. Further, the radio resource of each uplink control channel to transmit acknowledgement/negative-acknowledgment ACK/NACK is beforehand associated with downlink control channel elements forming the downlink control channel. One downlink control channel element is comprised of a plurality of downlink resource elements while being comprised of the downlink resource elements dispersed in the downlink component frequency band.

The downlink control channel elements and radio resources of uplink control channels to transmit acknowledgement/negative-acknowledgment ACK/NACK are beforehand also assigned numbers, and each downlink control channel element is beforehand associated with the radio resource of each uplink control channel to transmit acknowledgement/negative-acknowledgment ACK/NACK. The downlink control channel is comprised of one or more downlink control channel elements, and the mobile station apparatus 5 recognizes that the apparatus 5 is assigned the radio resource of the uplink control channel to transmit acknowledgement/negative-acknowledgment ACK/NACK associated with the downlink control channel element of the lowest number among one or more downlink control elements forming the received downlink control channel.

In the downlink component frequency bands and uplink component frequency bands as shown in FIG. 14 of Embodiment 2, the radio resource of the uplink control channel to transmit acknowledgement/negative-acknowledgment ACK/NACK in response to the downlink shared channel of the first downlink component frequency band is configured in the first uplink component frequency band, the radio resource of the uplink control channel to transmit acknowledgement/negative-acknowledgment ACK/NACK in response to the downlink shared channel of the second downlink component frequency band is configured in the second uplink component frequency band, and the radio resource of the uplink control channel to transmit acknowledgement/negative-acknowledgment ACK/NACK in response to the downlink shared channel of the third downlink component frequency band is configured in the third uplink component frequency band.

Meanwhile, in the downlink component frequency bands and uplink component frequency bands as shown in FIG. 17 of Embodiment 3, the radio resource of the uplink control channel to transmit acknowledgement/negative-acknowledgment ACK/NACK in response to the downlink shared channel of the first downlink component frequency band is configured in the first uplink component frequency band, and the radio resource of the uplink control channel to transmit acknowledgement/negative-acknowledgment ACK/NACK in response to the downlink shared channel of the second downlink component frequency band is also configured in the first uplink component frequency band. The radio resource of the uplink control channel to transmit acknowledgement/negative-acknowledgment ACK/NACK in response to the downlink shared channel of each downlink component frequency band may be configured separately, or may be shared and configured.

The uplink control channel selection part 409 of the mobile station apparatus 5 selects the radio resource of the uplink control channel assigned to transmit the channel quality indicator CQI of the downlink component frequency band in which is arranged the downlink control channel detected in the reception processing part 401 of the mobile station apparatus 5. The transmission processing part 405 of the mobile station apparatus 5 generates a signal including the channel quality indicator CQI of the downlink component frequency band and acknowledgement/negative-acknowledgment ACK/NACK, which is assigned the radio resource of the uplink control channel selected in the uplink control channel selection part 409, and transmits the signal to the base station apparatus 3.

The uplink control channel processing part 619 of the mobile station apparatus 5 generates the signal including the channel quality indicator CQI and acknowledgement/negative-acknowledgment ACK/NACK in a form different from the signal including only the channel quality indicator CQI. In FIG. 17, the mobile station apparatus 5 receives and detects the downlink control channel in the first downlink component frequency band, thereby selects the radio resource of uplink control channel CQI 1 assigned to transmit the channel quality indicator CQI of the first downlink component frequency band, and transmits the signal including the channel quality indicator CQI of the first downlink component frequency band and acknowledgement/negative-acknowledgment ACK/NACK to the base station apparatus 3.

<Flow of Selection of Uplink Control Channels to Transmit the Channel Quality Indicator CQI>

Figure 18:
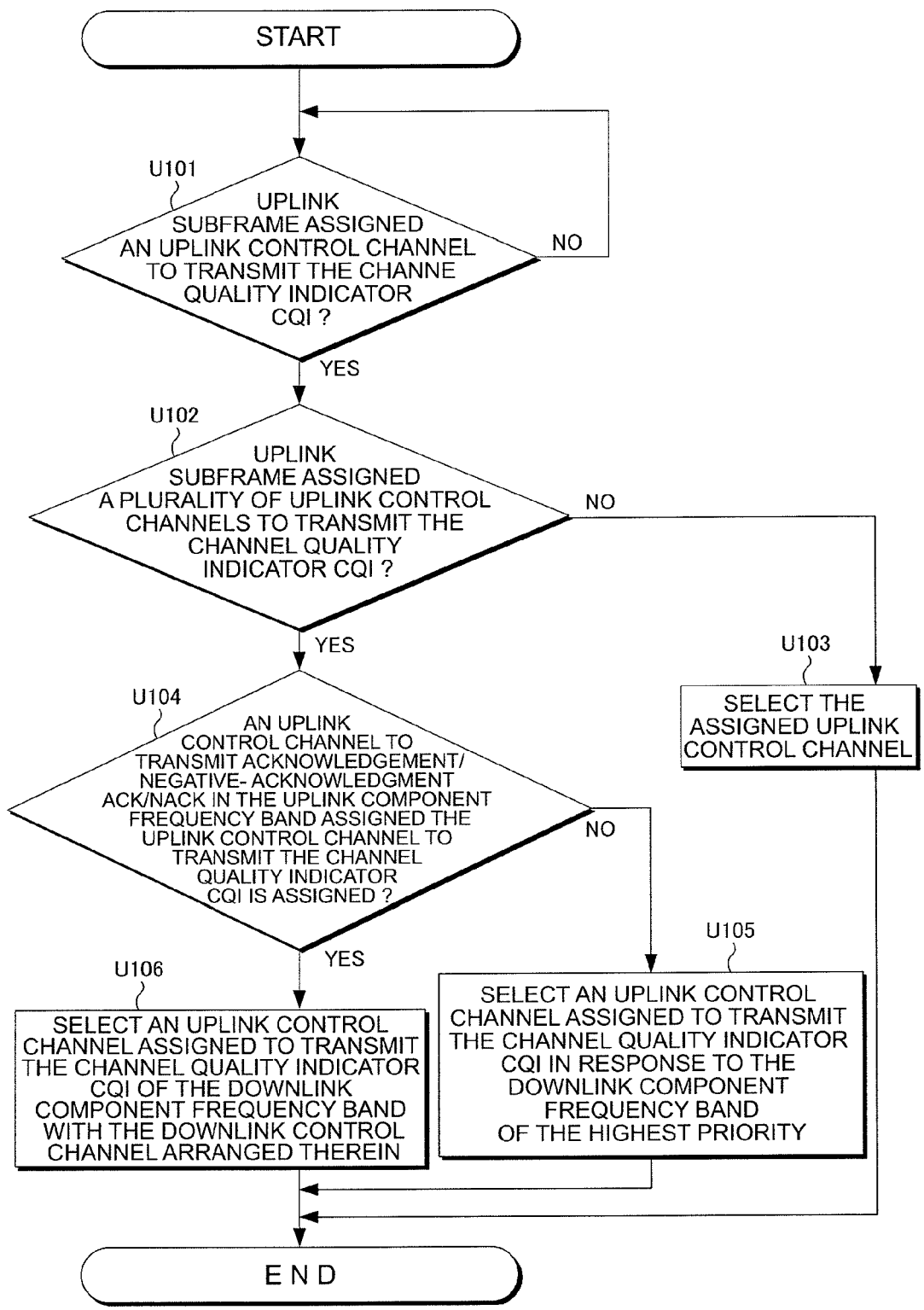
FIG. 18 is a flowchart showing an example of processing on an uplink subframe basis related to selection of uplink control channels to transmit the channel quality indicator CQI of the mobile station apparatus 5 according to Embodiment 3 of the invention.

FIG. 18 is a flowchart showing an example of processing on an uplink subframe basis related to selection of uplink control channels to transmit the channel quality indicator CQI of the mobile station apparatus 5 according to Embodiment 3 of the invention. The uplink control channel selection part 409 determines whether or not an uplink subframe is an uplink subframe assigned an uplink control channel to transmit the channel quality indicator CQI (step U101). When the uplink control channel selection part 409 determines that the uplink subframe is not an uplink subframe assigned an uplink control channel to transmit the channel quality indicator CQI, the processing proceeds again to step U101 in a next uplink subframe. Meanwhile, when the uplink control channel selection part 409 determines that the uplink subframe is an uplink subframe assigned an uplink control channel to transmit the channel quality indicator CQI, the uplink control channel selection part 409 determines whether or not the uplink subframe is an uplink subframe assigned a plurality of uplink control channels to transmit the channel quality indicator CQI (step U102).

When the uplink control channel selection part 409 determines that the uplink subframe is not an uplink subframe assigned a plurality of uplink control channels to transmit the channel quality indicator CQI, the uplink control channel selection part 409 selects the assigned uplink control channel (step U103). When the uplink control channel selection part 409 determines that the uplink subframe is an uplink subframe assigned a plurality of uplink control channels to transmit the channel quality indicator CQI, the uplink control channel selection part 409 determines whether or not the uplink subframe is assigned an uplink control channel to transmit acknowledgement/negative-acknowledgment ACK/NACK in the uplink component frequency band assigned the uplink control channel to transmit the channel quality indicator CQI (step U104).

When the uplink control channel selection part 409 determines that the uplink subframe is not assigned an uplink control channel to transmit acknowledgement/negative-acknowledgment ACK/NACK in the uplink component frequency band assigned the uplink control channel to transmit the channel quality indicator CQI, the uplink control channel selection part 409 selects an uplink control channel assigned to transmit the channel quality indicator CQI in response to the downlink component frequency band of the highest priority (step U105). When the uplink control channel selection part 409 determines that the uplink subframe is assigned an uplink control channel to transmit acknowledgement/negative-acknowledgment ACK/NACK in the uplink component frequency band assigned the uplink control channel to transmit the channel quality indicator CQI, the uplink control channel selection part 409 selects an uplink control channel assigned to transmit the channel quality indicator CQI of the downlink component frequency band with the downlink control channel arranged therein (step U106).

After step U103, step U105 and step U106, the mobile station apparatus 5 finishes the processing related to selection of uplink control channels to transmit the channel quality indicator CQI, and transmits the channel quality indicator CQI to the base station apparatus 3 using the selected uplink control channel.

The invention enables channel quality indicators CQIs in response to a plurality of downlink component frequency bands to be efficiently controlled and further enables the mobile station apparatus 5 to suitably transmit signals including the channel quality indicators CQIs. When in the same uplink subframe occur a radio resource of an uplink control channel to transmit acknowledgement/negative-acknowledgment ACK/NACK, and a plurality of radio resources of uplink control channels to transmit the channel quality indicator CQI for each of the downlink component frequency bands, the mobile station apparatus 5 selects the radio resource of the uplink control channel to transmit the channel quality indicator CQI assigned to the uplink component frequency band assigned the uplink control channel to transmit acknowledgement/negative-acknowledgment ACK/NACK, and is thereby capable of maintaining the single-carrier attribute of transmission signal, and mobile station apparatuses limited in power are capable of transmitting signals to meet the required quality.

Further, the mobile station apparatus 5 selects the uplink control channel assigned to transmit the channel quality indicator CQI of the downlink component frequency band in which is arranged the information indicative of the uplink control channel of the uplink component frequency band used in transmission of acknowledgement/negative-acknowledgment ACK/NACK, and transmits the channel quality indicator CQI of the downlink component frequency band in response to the selected uplink control channel. By this means, when a plurality of uplink control channels to transmit the channel quality indicator CQI is set in the uplink component frequency band assigned the radio resource of the uplink control channel to transmit acknowledgement/negative-acknowledgment ACK/NACK, the base station apparatus 3 is capable of instantaneously selecting the downlink component frequency band such that the base station apparatus 3 wants the mobile station apparatus 5 to transmit the channel quality indicator CQI.

Embodiment 4

In Embodiment 4 of the invention, as compared with Embodiment 1, when the mobile station apparatus 5 selects a radio resource of a particular uplink control channel in an uplink subframe assigned radio resources of a plurality of uplink control channels to transmit the channel quality indicators CQIs of a plurality of downlink component frequency bands, and transmits the channel quality indicator CQI, the mobile station apparatus 5 changes the content indicated by the channel quality indicator CQI. In other words, the mobile station apparatus 5 changes the content indicated by the channel quality indicator CQI between the case where a plurality of radio resources of uplink control channels, which are beforehand allocated from the base station apparatus 3 to transmit the channel quality indicator for each of the downlink component frequency bands, occurs in the same uplink subframe, and the case where a plurality of radio resources does not occur. More specifically, the mobile station apparatus 5 changes the frequency bandwidth of downlink associated with the channel quality indicator CQI.

Figure 19:
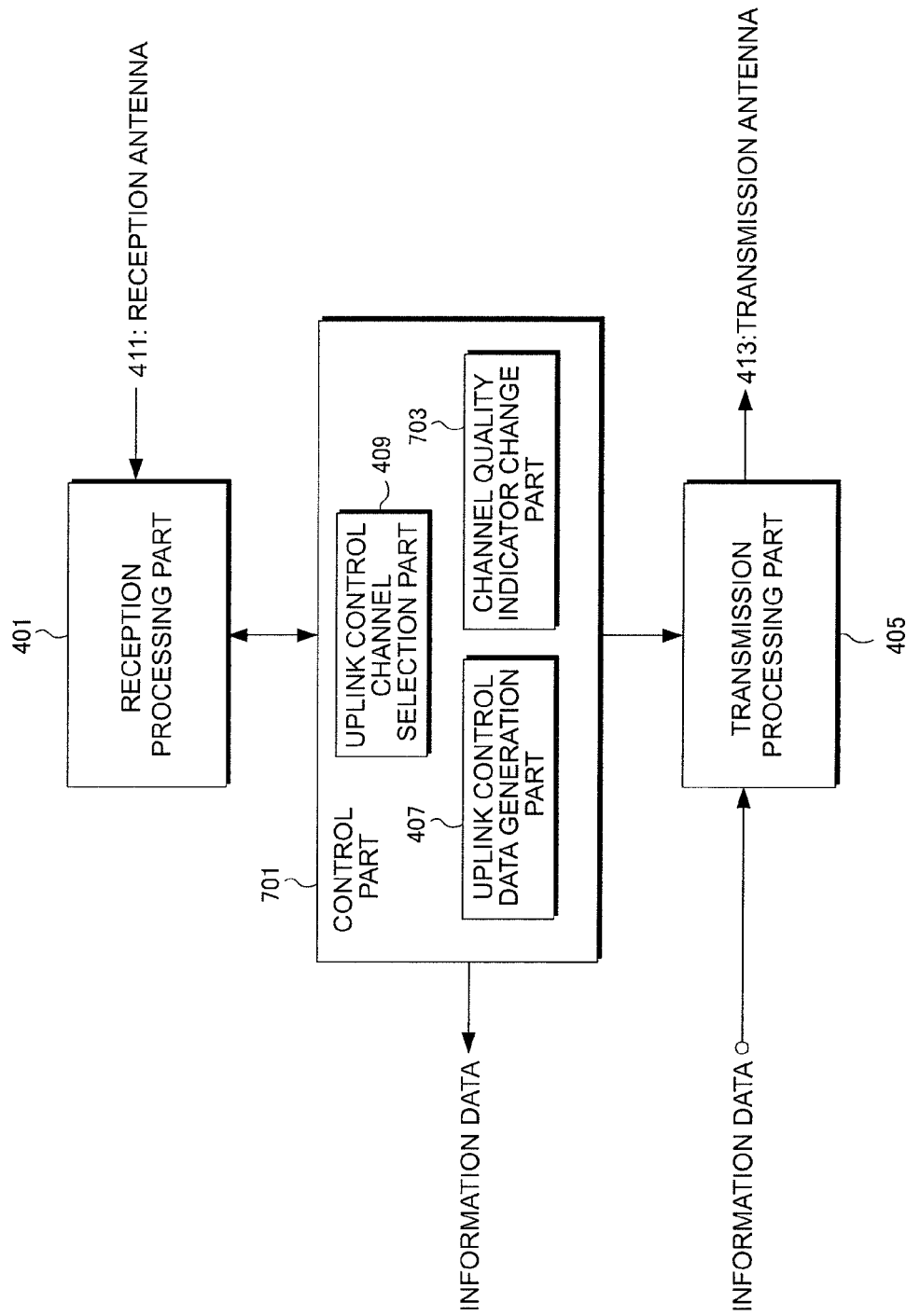
FIG. 19 is a schematic block diagram illustrating a configuration of the mobile station apparatus 5 according to Embodiment 4 of the invention.

FIG. 19 is a schematic block diagram illustrating a configuration of the mobile station apparatus 5 according to Embodiment 4 of the invention. As compared with the configuration of the mobile station apparatus 5 according to Embodiment 1 as shown in FIG. 7, a channel quality indicator change part 703 is configured in a control part 701, and in this respect, the configuration differs. The channel quality indicator change part 703 changes the content indicated by the channel quality indicator CQI between the case where a plurality of radio resources of uplink control channels, which are beforehand allocated from the base station apparatus 3 for transmission of the channel quality indicator CQI for each downlink component frequency band, occurs in the same uplink subframe, and the case where a plurality of radio resources does not occur. The channel quality indicator change part 703 receives the channel quality of each of the downlink component frequency bands input from the reception processing part 401. The channel quality indicator change part 703 changes the frequency bandwidth of downlink associated with the channel quality indicator CQI.

Figure 20A:
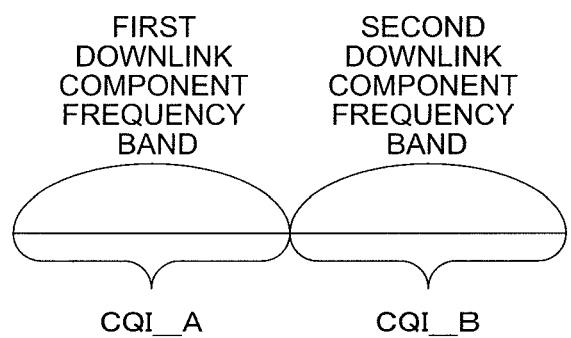
FIG. 20A is a diagram illustrating a downlink frequency bandwidth associated with the channel quality indicator CQI according to Embodiment 4 of the invention (in the case where a plurality of CQIs does not occur in the same subframe)
Figure 20B:
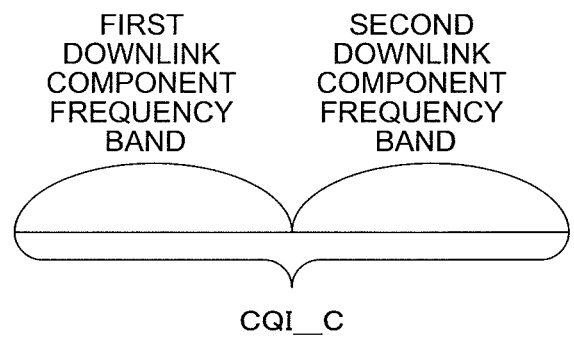
FIG. 20B is another diagram illustrating a downlink frequency bandwidth associated with the channel quality indicator CQI according to Embodiment 4 of the invention (in the case where a plurality of CQIs occurs in the same subframe)

FIGS. 20A and 20B are diagrams illustrating downlink frequency bandwidths associated with the channel quality indicator CQI. Described herein is the case of two downlink component frequency bands.

FIG. 20A is a diagram illustrating a downlink frequency bandwidth associated with the channel quality indicator CQI according to Embodiment 4 of the invention (in the case where a plurality of CQIs does not occur in the same subframe.) FIG. 20A shows the downlink frequency bandwidth associated with the channel quality indicator CQI when a plurality of radio resources of uplink control channels, which are beforehand allocated from the base station apparatus 3 to transmit the channel quality indicator CQI for each downlink component frequency band, does not occur in the same uplink subframe, and the downlink frequency bandwidth associated with the channel quality indicator CQI is the downlink component frequency bandwidth. The control part 701 generates the channel quality indicator CQI, based on average channel quality in the frequency band with the downlink frequency bandwidth set by the channel quality indicator change part 703. In other words, in FIG. 20A, the mobile station apparatus 5 transmits, to the base station apparatus 3, a signal including channel quality indicator CQI_A in response to the first downlink component frequency band or channel quality indicator CQI_B in response to the second downlink component frequency band, using the radio resource of a particular uplink control channel.

FIG. 20B is a diagram illustrating a downlink frequency bandwidth associated with the channel quality indicator CQI according to Embodiment 4 of the invention (in the case where a plurality of CQIs occurs in the same subframe.) FIG. 20B shows the downlink frequency bandwidth associated with the channel quality indicator CQI when a plurality of radio resources of uplink control channels, which are beforehand allocated from the base station apparatus 3 to transmit the channel quality indicator CQI for each downlink component frequency band, occurs in the same uplink subframe, and the downlink frequency bandwidth associated with the channel quality indicator CQI is the entire downlink component frequency bandwidth used by the mobile station apparatus 5 in communications with the base station apparatus. The control part 701 generates the channel quality indicator CQI, based on average channel quality in the frequency band with the downlink frequency bandwidth set by the channel quality indicator change part 703. In other words, in FIG. 20B, the mobile station apparatus 5 transmits, to the base station apparatus 3, a signal including channel quality indicator CQI_C in response to the frequency band comprised of the first downlink component frequency band and the second downlink component frequency band, using the radio resource of a particular uplink control channel. Further, in the cases of FIG. 20A and FIG. 20B, the number of bits representing the channel quality indicator CQI is maintained at the same value.

Figure 21A:
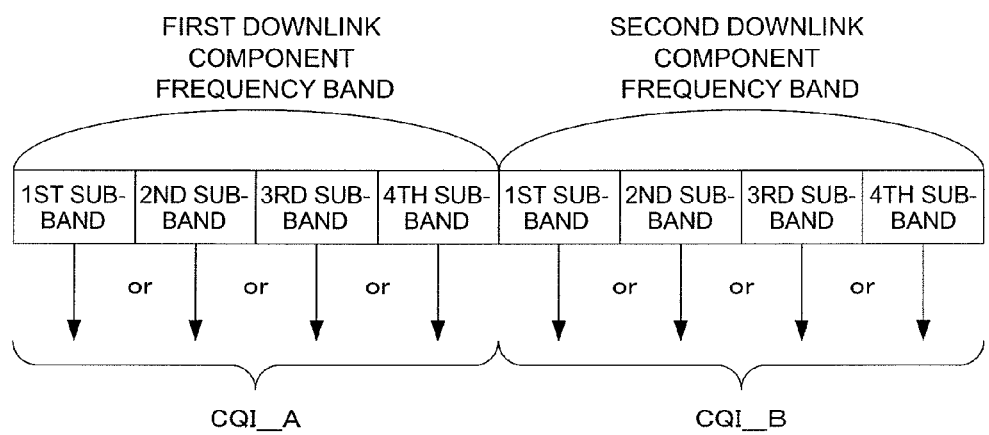
FIG. 21A is a diagram illustrating a downlink frequency bandwidth and sub-band width associated with the channel quality indicator CQI according to Embodiment 4 of the invention (in the case where a plurality of CQIs does not occur in the same subframe)
Figure 21B:
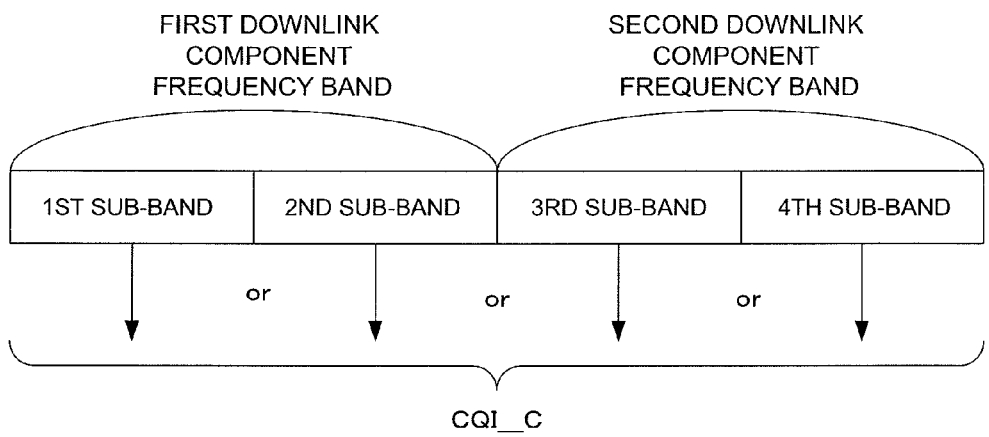
FIG. 21B is another diagram illustrating a downlink frequency bandwidth and sub-band width associated with the channel quality indicator CQI according to Embodiment 4 of the invention (in the case where a plurality of CQIs occurs in the same subframe)

FIGS. 21A and 21B are diagrams illustrating downlink bandwidths associated with the channel quality indicator CQI. Described herein is the case of two downlink component frequency bands.

FIG. 21A is a diagram illustrating a downlink frequency bandwidth and sub-band width associated with the channel quality indicator CQI according to Embodiment 4 of the invention (in the case where a plurality of CQIs does not occur in the same subframe.) FIG. 21A shows the downlink frequency bandwidth associated with the channel quality indicator CQI when a plurality of radio resources of uplink control channels, which are beforehand allocated from the base station apparatus 3 to transmit the channel quality indicator CQI for each downlink component frequency band, does not occur in the same uplink subframe, and the downlink frequency bandwidth associated with the channel quality indicator CQI is the downlink component frequency bandwidth.

Further, the downlink component frequency band is divided into some frequency bands (hereinafter, each referred to as a sub-band), and the mobile station apparatus 5 generates the channel quality indicator CQI in response to the sub-band with the best channel quality in the downlink component frequency band in the uplink control data generation part 407, and transmits the channel quality indicator CQI to the base station apparatus 3. In FIG. 21A, each downlink component frequency band is divided into four sub-bands (first sub-band, second sub-band, third sub-band and fourth sub-band). In other words, in FIG. 21A, the mobile station apparatus 5 transmits, to the base station apparatus 3, a signal including channel quality indicator CQI_A in response to the sub-band with the best channel quality in the first downlink component frequency band or channel quality indicator CQI_B in response to the sub-band with the best channel quality in the second downlink component frequency band, using the radio resource of a particular uplink control channel.

FIG. 21B is another diagram illustrating a downlink frequency bandwidth and sub-band width associated with the channel quality indicator CQI according to Embodiment 4 of the invention (in the case where a plurality of CQIs occurs in the same subframe.) FIG. 21B shows the downlink frequency bandwidth associated with the channel quality indicator CQI when a plurality of radio resources of uplink control channels, which are beforehand allocated from the base station apparatus 3 to transmit the channel quality indicator CQI for each downlink component frequency band, occurs in the same uplink subframe, and the downlink frequency bandwidth associated with the channel quality indicator CQI is the entire downlink component frequency bandwidth used by the mobile station apparatus 5 in communications with the base station apparatus 3.

Further, each of all the downlink component frequency bands is divided into sub-bands corresponding to the number (4) of sub-bands shown in FIG. 21A, and the mobile station apparatus 5 generates the channel quality indicator CQI in response to the sub-band with the best channel quality in all the downlink component frequency bands in the uplink control data generation part 407, and transmits the channel quality indicator CQI to the base station apparatus 3. In other words, in FIG. 21B, the mobile station apparatus 5 transmits, to the base station apparatus 3, a signal including channel quality indicator CQI_C in response to the sub-band with the best channel quality in the frequency band comprised of the first downlink component frequency band and the second downlink component frequency band, using the radio resource of a particular uplink control channel.

The difference between FIG. 21A and FIG. 21B is the difference in the frequency bandwidth of the sub-band, and the channel quality indicator change part 703 changes the frequency bandwidth of the sub-band. Further, in the cases of FIG. 21A and FIG. 21B, the number of bits representing the channel quality indicator CQI is maintained at the same value. Furthermore, as compared with the channel quality indicator CQI as shown in FIGS. 20A and 20B, the channel quality indicator CQI as shown in FIGS. 21A and 21B is comprised of information indicating the sub-band.

The invention enables channel quality indicators CQIs in response to a plurality of downlink component frequency bands to be efficiently controlled and further enables the mobile station apparatus 5 to suitably transmit signals including the channel quality indicators CQIs. The mobile station apparatus 5 is capable of transmitting the channel quality indicator CQI of different meaning without changing the number of bits of the channel quality indicator CQI in the case where a plurality of radio resources of uplink control channels to transmit the channel quality indicator CQI for each of the downlink component frequency bands occurs in the same uplink subframe, and in the case such radio resources do not occur. The base station apparatus 3 is capable of receiving the suitable channel quality indicator CQI from the mobile station apparatus 5 when the base station apparatus 3 wants the channel quality indicator CQI associated with all the downlink component frequency bands more than the channel quality indicator CQI associated with a particular downlink component frequency band, and is capable of performing radio resource allocation and determination of modulation scheme and coding rate of downlink shared channels for a plurality of downlink component frequency bands.

Embodiment 5

In Embodiment 5 of the invention, as compared with Embodiment 1, when a plurality of radio resources of uplink control channels to transmit the channel quality indicator CQI for each downlink component frequency band occurs in the same uplink subframe, the mobile station apparatus 5 selects the radio resource of an uplink control channel assigned to transmit the channel quality indicator CQI of the downlink component frequency band with the best channel quality, and transmits the channel quality indicator CQI of the downlink component frequency band with the best channel quality.

Figure 22:
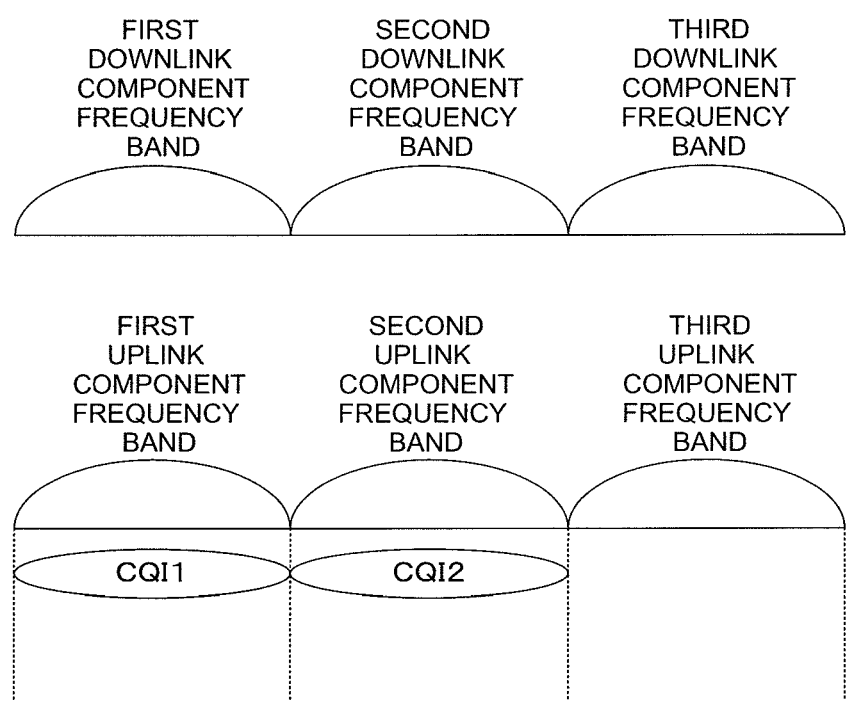
FIG. 22 is a diagram illustrating the case of concurrent occurrences of a plurality of uplink channels to transmit the channel quality indicator CQI in some uplink subframe in Embodiment 5 of the invention.

FIG. 22 is a diagram illustrating the case of concurrent occurrences of a plurality of uplink channels to transmit the channel quality indicator CQI in some uplink subframe in Embodiment 5 of the invention. In addition, described herein is the case of three downlink component frequency bands (first downlink component frequency band, second downlink component frequency band and third downlink component frequency band) and three uplink component frequency bands (first uplink component frequency band, second uplink component frequency band and third uplink component frequency band). In the mobile station apparatus 5, from the radio resource control part 103 of the base station apparatus 3 are beforehand allocated the radio resource of uplink control channel CQI 1 to transmit the channel quality indicator CQI of the first downlink component frequency band in the first uplink component frequency band, and the radio resource of uplink control channel CQI 2 to transmit the channel quality indicator CQI of the second downlink component frequency band in the second uplink component frequency band.

The uplink control channel selection part 409 of the mobile station apparatus 5 selects a radio resource of an uplink control channel assigned to transmit the channel quality indicator CQI of the downlink component frequency band with the best channel quality among a plurality of downlink component frequency bands measured in the reception processing part 401 of the mobile station apparatus 5. The transmission processing part 401 of the mobile station apparatus 5 generates a signal including the channel quality indicator CQI of the downlink component frequency band with the best channel quality, and transmits the signal to the base station apparatus 3.

Since selection of radio resources of uplink control channels assigned to transmit the channel quality indicator CQI is performed under initiative of the mobile station apparatus 5, the base station apparatus 3 needs to detect the uplink control channel selected in the mobile station apparatus 5. The radio resource control part 103 grasps that a plurality of radio resources of uplink control channels to transmit the channel quality indicator CQI for each downlink component frequency band occurs in the same uplink subframe, and therefore, through the control part 105, controls the reception processing part 101 to detect the uplink control channel used in transmission of the channel quality indicator CQI. The uplink control channel detection part 329 of the reception processing part 101 detects the reception power of a reception signal of each uplink control channel beforehand assigned to the mobile station apparatus 5, and judges that the uplink control channel with the detected reception power being the highest is used by the mobile station apparatus 5 in transmission of the channel quality indicator CQI. Then, the uplink control channel detection part 329 demodulates and decodes the signal of the uplink control channel judged as being used by the mobile station apparatus 5 in transmission of the channel quality indicator CQI, and detects control data comprised of the channel quality indicator CQI to output to the control part 105.

Figure 23:
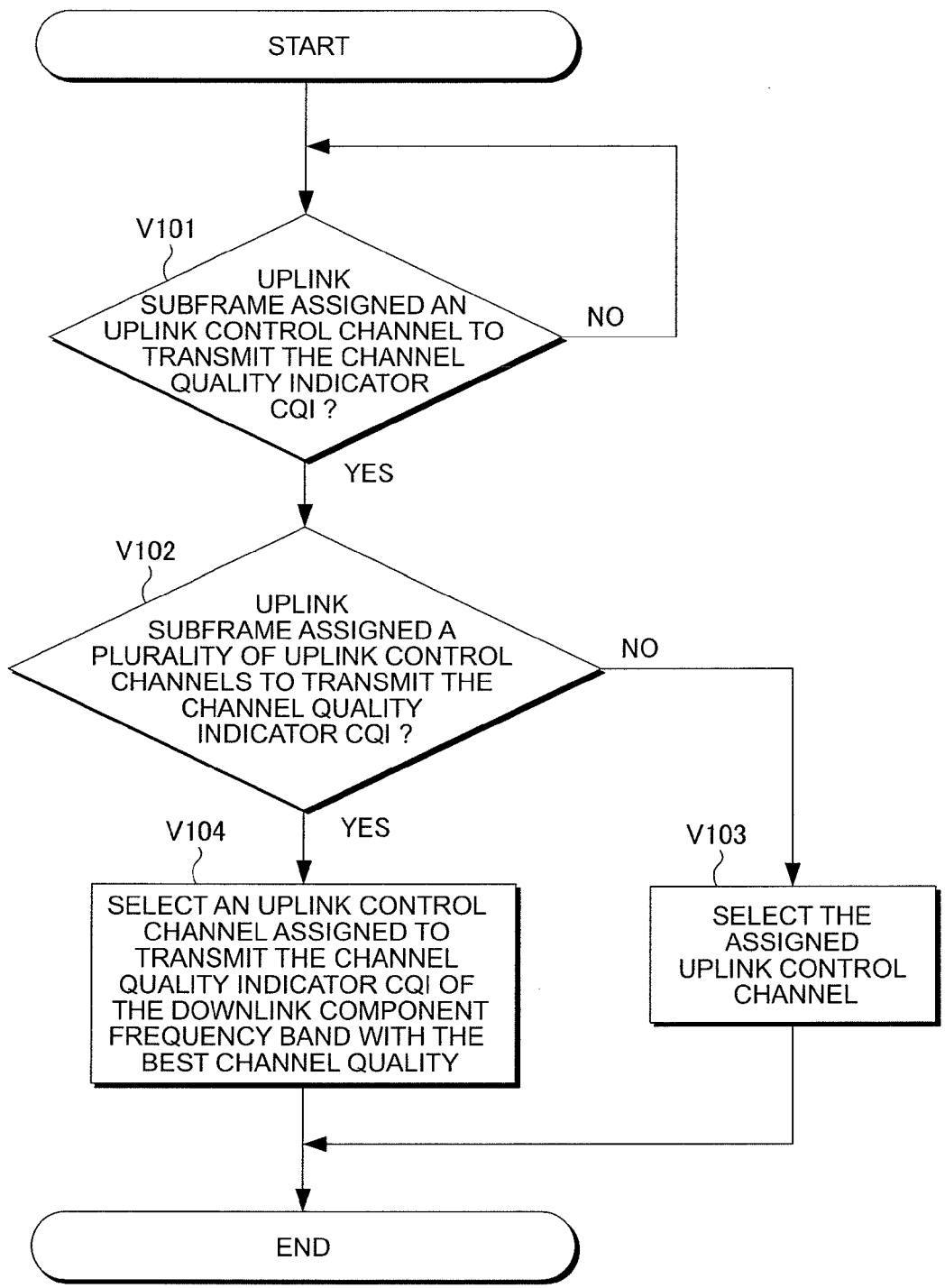
FIG. 23 is a flowchart showing an example of processing on an uplink subframe basis related to selection of uplink control channels to transmit the channel quality indicator CQI of the mobile station apparatus 5 according to Embodiment 5 of the invention.

<Flow of Selection of Uplink Control Channels>to Transmit the Channel Quality Indicator CQI FIG. 23 is a flowchart showing an example of processing on an uplink subframe basis related to selection of uplink control channels to transmit the channel quality indicator CQI of the mobile station apparatus 5 according to Embodiment 5 of the invention. The uplink control channel selection part 409 determines whether or not an uplink subframe is an uplink subframe assigned an uplink control channel to transmit the channel quality indicator CQI (step V101). When the uplink control channel selection part 409 determines that the uplink subframe is not an uplink subframe assigned an uplink control channel to transmit the channel quality indicator CQI, the processing proceeds again to step V101 in a next uplink subframe. Meanwhile, when the uplink control channel selection part 409 determines that the uplink subframe is an uplink subframe assigned an uplink control channel to transmit the channel quality indicator CQI, the uplink control channel selection part 409 determines whether or not the uplink subframe is an uplink subframe assigned a plurality of uplink control channels to transmit the channel quality indicator CQI (step V102).

When the uplink control channel selection part 409 determines that the uplink subframe is not an uplink subframe assigned a plurality of uplink control channels to transmit the channel quality indicator CQI, the uplink control channel selection part 409 selects the assigned uplink control channel (step V103). When the uplink control channel selection part 409 determines that the uplink subframe is an uplink subframe assigned a plurality of uplink control channels to transmit the channel quality indicator CQI, the uplink control channel selection part 409 selects an uplink control channel assigned to transmission of the channel quality indicator CQI of the downlink component frequency band with the best channel quality (step V104). After step V103 and step V104, the mobile station apparatus 5 finishes the processing related to selection of uplink control channels to transmit the channel quality indicator CQI, and transmits the channel quality indicator CQI to the base station apparatus 3 using the selected uplink control channel.

The invention enables channel quality indicators CQIs in response to a plurality of downlink component frequency bands to be efficiently controlled and further enables the mobile station apparatus 5 to suitably transmit signals including the channel quality indicators CQIs. When a plurality of radio resources of uplink control channels to transmit the channel quality indicator CQI for each of the downlink component frequency bands occurs in the same uplink subframe, the mobile station apparatus 5 selects an uplink control channel assigned to transmit the channel quality indicator CQI of the downlink component frequency band with the best channel quality, and is thereby capable of maintaining the single-carrier attribute of transmission signal, and mobile station apparatuses limited in power are capable of transmitting signals to meet the required quality. Further, the base station apparatus 3 receives the channel quality indicator CQI of the downlink component frequency band with the best channel quality from the mobile station apparatus 5, and therefore, is capable of obtaining the maximum gain of frequency scheduling and the maximum gain of adaptive modulation.

The distinctive operation of the invention as described above is capable of being actualized by causing a computer to execute the control program. In other words, a control program of the invention is a control program in a mobile station apparatus that receives signals transmitted from a base station apparatus using a plurality of downlink component frequency bands each having a beforehand determined frequency bandwidth, and is characterized by making a series of processing computer readable and executable commands where the processing includes the processing of generating a channel quality indicator indicative of channel quality in response to each of the downlink component frequency bands in an uplink control data generation part, the processing of selecting a particular radio resource in an uplink control channel selection part when a plurality of radio resources, which are beforehand allocated from the base station apparatus to transmit the channel quality indicator for each of the downlink component frequency bands, occurs in the same time frame, and the transmission processing of arranging the channel quality indicator generated in the uplink control data generation part in the radio resource selected in the uplink control channel selection part to transmit to the base station apparatus in a transmission processing part.

Thus, when a plurality of radio resources, which are beforehand allocated from the base station apparatus to transmit the channel quality indicator for each of the downlink component frequency bands, occurs in the same time frame, the mobile station apparatus selects a particular radio resource. Therefore, when a plurality of radio resources of uplink control channels to transmit the channel quality indicator CQI for each of the downlink component frequency bands occurs in the same uplink subframe, by selecting a particular radio resource, it is possible to maintain the single-carrier attribute of transmission signal, and mobile station apparatuses limited in power are capable of transmitting signals to meet the required quality.

Further, a control program of the invention is a control program in a mobile station apparatus that receives signals transmitted from a base station apparatus using a plurality of downlink component frequency bands each having a beforehand determined frequency bandwidth, and is characterized by making a series of processing computer readable and executable commands where the processing includes the processing of generating a channel quality indicator in response to each of the downlink component frequency bands in an uplink control data generation part, the processing of selecting a radio resource allocated to transmit a channel quality indicator of a downlink component frequency band of high priority based on information indicative of priorities for each of the downlink component frequency bands in an uplink control channel selection part when a plurality of radio resources, which are beforehand allocated from the base station apparatus to transmit the channel quality indicator for each of the downlink component frequency bands, occurs in the same time frame, and the processing of arranging the channel quality indicator generated in the uplink control data generation part in the radio resource, allocated to transmit the channel quality indicator of the downlink component frequency band of high priority, selected in the uplink control channel selection part and transmitting the channel quality indicator to the base station apparatus in a transmission processing part.

Thus, when a plurality of radio resources, which are beforehand allocated from the base station apparatus to transmit the channel quality indicator for each of the downlink component frequency bands, occurs in the same time frame, the mobile station apparatus selects a radio resource allocated to transmit the channel quality indicator of the downlink component frequency band of high priority based on the information indicative of priorities for each of the downlink component frequency bands. Therefore, when a plurality of radio resources of uplink control channels to transmit the channel quality indicator CQI for each of the downlink component frequency bands occurs in the same uplink subframe, by selecting a particular radio resource, it is possible to maintain the single-carrier attribute of transmission signal, and mobile station apparatuses limited in power are capable of transmitting signals to meet the required quality. Further, the mobile station apparatus preferentially transmits the channel quality indicator CQI of the downlink component frequency band of high priority to the base station apparatus, and the base station apparatus is capable of performing suitable scheduling on the downlink component frequency band of high priority in scheduling, using the channel quality indicator CQI.

Furthermore, a control program of the invention is a control program in a base station apparatus that receives a signal transmitted from a mobile station apparatus using one or more uplink component frequency bands each having a beforehand determined frequency bandwidth, and is characterized by making a series of processing computer readable and executable commands where the processing includes the processing of receiving a signal including a channel quality indicator indicative of channel quality of a downlink component frequency band transmitted from the mobile station apparatus in a reception processing part, the processing of setting priorities related to selection of radio resources to transmit the channel quality indicator indicative of channel quality of a downlink component frequency band, for each of the downlink component frequency bands in a radio resource control part, and the processing of transmitting information indicative of the priorities set in the radio resource control part to the mobile station apparatus in a base-station side transmission processing part.

Thus, since the base station apparatus transmits the information indicative of the priorities to the mobile station apparatus, the mobile station apparatus preferentially transmits the channel quality indicator CQI of the downlink component frequency band of high priority to the base station apparatus, and the base station apparatus is capable of performing suitable scheduling on the downlink component frequency band of high priority in scheduling, using the channel quality indicator CQI.

The programs that operate in the mobile station apparatus and the base station apparatus related to the invention are programs (programs that cause the computer to function) which control the CPU and the like, to achieve the functions of the above-mentioned Embodiments related to the invention. Then, the information handled in the apparatuses is temporarily stored in RAM at the time of the processing, subsequently stored in various kinds of ROM and HDD, and when necessary, read out by the CPU to be modified and written. As a storage medium to store the programs, any medium may be used including semiconductor media (for example, ROM, non-volatile memory card, etc.), optical recording media (for example, DVD, MO, MD, CD, BD, etc.), magnetic recording media (for example, magnetic tape, flexible disk, etc.) and the like. Further, as well as the case where the functions of the above-mentioned Embodiments are actualized by executing the loaded programs, there is the case where the functions of the invention are actualized by performing the processing in coordination with the operating system, another application program or the like based on instructions of the programs.

Further, in the case of distributing the programs to the market, it is possible to store the program in a transportable recording medium to distribute, or to transfer the program to a server computer connected via a network such as the Internet or the like. In this case, the storage media of the server computer are also included in the invention. Furthermore, a part or whole of the mobile station apparatus and base station apparatus in the above-mentioned Embodiments may be actualized as LSI that is typically an integrated circuit. Each function block of the mobile station apparatus and base station apparatus may be made in chip form separately, or a part or whole of the blocks may be integrated and made in chip form. Still furthermore, the technique of integrated circuits is not limited to the LSI, and may be achieved by dedicate circuits or general-purpose processor. Moreover, when the technique of integrated circuits as a substitute for the LSI appears as semiconductor techniques progress, it is possible to use the integrated circuit by the technique.

As mentioned above, the Embodiments of the invention are specifically described with reference to the drawings, but specific configurations are not limited to the Embodiments, and design and the like within the scope without departing from the subject matter of the invention are also included in the invention.

Description of Symbols

1 Wireless communication system
3 Base station apparatus
5A~5C Mobile station apparatus
101 Reception processing part
103 Radio resource control part
107 Transmission processing part
405 Transmission processing part
407 Uplink control data generation part
409 Uplink control channel selection part
703 Channel quality indicator change part

The invention claimed is:
1. A wireless communication system comprising:
a base station apparatus; and
a mobile station apparatus configured to receive signals transmitted from the base station apparatus using a plurality of downlink component frequency bands each having a beforehand determined frequency bandwidth, and the base station apparatus is configured to receive a signal transmitted from the mobile station apparatus using one or more uplink component frequency bands each having a beforehand determined frequency bandwidth, wherein
the base station apparatus comprises:
a reception processing part configured to receive a signal including a channel quality indicator indicative of channel quality of a downlink component frequency band transmitted from the mobile station apparatus, and
the mobile station apparatus comprises:
an uplink control data generation part configured to generate a channel quality indicator in response to each of the downlink component frequency bands,
an uplink control channel selection part configured to select a particular periodic physical uplink control channel (PUCCH) in case that a plurality of periodic PUCCHs, which are beforehand allocated from the base station apparatus to transmit the channel quality indicator for each of the downlink component frequency bands, occur in the same UL subframe, wherein, an UL subframe where each periodic PUCCH of the plurality of periodic PUCCHs occurs is determined based on the cycle of the UL subframe and the position of the UL subframe where an occurrence of the periodic PUCCH has started, and a transmission processing part configured to arrange the channel quality indicator generated in the uplink control data generation part in the periodic PUCCH selected in the uplink control channel selection part to transmit to the base station apparatus.

2. A wireless communication system comprising:

a base station apparatus; and a mobile station apparatus configured to receive signals transmitted from the base station apparatus using a plurality of downlink component frequency bands, and the base station apparatus is configured to receive a signal transmitted from the mobile station apparatus using one or more uplink component frequency bands, wherein the base station apparatus is configured to receive a signal including a channel quality indicator indicative of channel quality of a downlink component frequency band transmitted from the mobile station apparatus, and the mobile station apparatus is configured to select a channel quality indicator of a downlink component frequency band of the highest priority based on information indicative of priorities for each of the downlink component frequency bands in case that a plurality of periodic physical uplink control channels (PUCCHs), each of which is beforehand allocated from the base station apparatus to transmit the channel quality indicator for each of the downlink component frequency bands, occur in the same UL subframe, wherein, an UL subframe where each periodic PUCCH of the plurality of periodic PUCCHs occurs is determined based on the cycle of the UL subframe and the position of the UL subframe where an occurrence of the periodic PUCCH has started, and is configured to transmit a signal including the selected channel quality indicator of the downlink component frequency band to the base station apparatus.

3. The wireless communication system according to claim 2, wherein the base station apparatus is further configured to set the priorities for each of the downlink component frequency bands.

4. A mobile station apparatus which is configured to receive signals transmitted from a base station apparatus using a plurality of downlink component frequency bands each having a beforehand determined frequency bandwidth, the mobile station apparatus comprising:

an uplink control data generation part configured to generate a channel quality indicator indicative of channel quality in response to each of the downlink component frequency bands;

an uplink control channel selection part configured to select a particular periodic physical uplink control channel (PUCCH) in case that a plurality of periodic PUCCHs, which are beforehand allocated from the base station apparatus to transmit the channel quality indicator for each of the downlink component frequency bands, occur in the same UL subframe, wherein, an UL subframe where each periodic PUCCH of the plurality of periodic PUCCHs occurs is determined based on the cycle of the UL subframe and the position of the UL subframe where an occurrence of the periodic PUCCH has started; and a transmission processing part configured to arrange the channel quality indicator generated in the uplink control data generation part in the periodic PUCCH selected in the uplink control channel selection part and to transmit the channel quality indicator to the base station apparatus.

5. A communication control method of a mobile station apparatus, the communication control method comprising:

receiving signals transmitted from a base station apparatus using a plurality of downlink component frequency bands;

selecting a channel quality indicator of a downlink component frequency band of the highest priority based on information indicative of priorities for each of the downlink component frequency bands in case that a plurality of periodic physical uplink control channels (PUCCHs), each of which is beforehand allocated from the base station apparatus to transmit the channel quality indicator indicative of channel quality for each of the downlink component frequency bands, occur in the same UL subframe, wherein, an UL subframe where each periodic PUCCH of the plurality of periodic PUCCHs occurs is determined based on the cycle of the UL subframe and the position of the UL subframe where an occurrence of the periodic PUCCH has started; and transmitting a signal including the selected channel quality indicator of the downlink component frequency band to the base station apparatus.

6. A base station apparatus which is configured to transmit signals to a mobile station apparatus using a plurality of downlink component frequency bands each having a beforehand determined frequency bandwidth, and is configured to receive a signal transmitted from the mobile station apparatus using one or more uplink component frequency bands each having a beforehand determined frequency bandwidth, the base station apparatus comprising:

a reception processing part configured to receive a signal including a channel quality indicator which is arranged and transmitted in a particular periodic physical uplink control channel (PUCCH) that is selected in case that a plurality of periodic PUCCHs, which are beforehand allocated to transmit the channel quality indicator indicative of channel quality for each of the downlink component frequency bands, occur in the same UL subframe, wherein, an UL subframe where each periodic PUCCH of the plurality of periodic PUCCHs occurs is determined based on the cycle of the UL subframe and the position of the UL subframe where an occurrence of the periodic PUCCH has started.

7. A communication control method of a base station apparatus, the communication control method comprising:

transmitting signals to a mobile station apparatus using a plurality of downlink component frequency bands;

receiving a signal transmitted from the mobile station apparatus using one or more uplink component frequency bands; and receiving a signal including a channel quality indicator of a downlink component frequency band of the highest priority selected based on information indicative of priorities for each of the downlink component frequency bands, in case that a plurality of periodic physical uplink control channels (PUCCHs), each of which is beforehand allocated to transmit the channel quality indicator indicative of channel quality for each of the downlink component frequency bands, occur in the same UL subframe, wherein, an UL subframe where each periodic PUCCH of the plurality of periodic PUCCHs occurs is determined based on the cycle of the UL subframe and the position of the UL subframe where an occurrence of the periodic PUCCH has started.

8. The communication control method according to claim 7, further comprising:

setting the priorities for each of the downlink component frequency bands.

9. A communication control method used in a mobile station apparatus in a wireless communication system comprised of the mobile station apparatus that is configured to receive signals transmitted from a base station apparatus using a plurality of downlink component frequency bands each having a beforehand determined frequency bandwidth, and the base station apparatus that is configured to receive a signal transmitted from the mobile station apparatus using one or more uplink component frequency bands each having a beforehand determined frequency bandwidth, the communication control method comprising:

generating a channel quality indicator indicative of channel quality in response to each of the downlink component frequency bands;

selecting a particular periodic physical uplink control channel (PUCCH) in case that a plurality of periodic PUCCHs, which are beforehand allocated from the base station apparatus to transmit the channel quality indicator for each of the downlink component frequency bands, occur in the same UL subframe, wherein, an UL subframe where each periodic PUCCH of the plurality of periodic PUCCHs occurs is determined based on the cycle of the UL subframe and the position of the UL subframe where an occurrence of the periodic PUCCH has started; and arranging the generated channel quality indicator in the selected periodic PUCCH to transmit to the base station apparatus.

10. A communication control method used in a mobile station apparatus in a wireless communication system comprised of the mobile station apparatus that is configured to receive signals transmitted from a base station apparatus using a plurality of downlink component frequency bands, and the base station apparatus that is configured to receive a signal transmitted from the mobile station apparatus using one or more uplink component frequency bands, the communication control method comprising:

selecting a channel quality indicator of a downlink component frequency band of the highest priority based on information indicative of priorities for each of the downlink component frequency bands in case that a plurality of periodic physical uplink control channels (PUCCHs), each of which is beforehand allocated from the base station apparatus to transmit the channel quality indicator indicative of channel quality for each of the downlink component frequency bands, occur in the same UL subframe, wherein, an UL subframe where each periodic PUCCH of the plurality of periodic PUCCHs occurs is determined based on the cycle of the UL subframe and the position of the UL subframe where an occurrence of the periodic PUCCH has started; and transmitting a signal including the selected channel quality indicator of the downlink component frequency band to the base station apparatus.

11. A communication control method used in a base station apparatus in a wireless communication system comprised of a mobile station apparatus that is configured to receive signals transmitted from the base station apparatus using a plurality of downlink component frequency bands each having a beforehand determined frequency bandwidth, and the base station apparatus that is configured to receive a signal transmitted from the mobile station apparatus using one or more uplink component frequency bands each having a beforehand determined frequency bandwidth, the communication control method comprising:

beforehand allocating periodic physical uplink control channels (PUCCHs) to transmit a channel quality indicator indicative of channel quality for each of the downlink component frequency bands; and receiving a signal including the channel quality indicator that is arranged and transmitted in a particular periodic PUCCH in case that a plurality of beforehand allocated periodic PUCCHs occur in the same UL subframe, wherein, an UL subframe where each periodic PUCCH of the plurality of periodic PUCCHs occurs is determined based on the cycle of the UL subframe and the position of the UL subframe where an occurrence of the periodic PUCCH has started.

12. A communication control method used in a base station apparatus in a wireless communication system comprised of a mobile station apparatus that is configured to receive signals transmitted from the base station apparatus using a plurality of downlink component frequency bands, and the base station apparatus that is configured to receive a signal transmitted from the mobile station apparatus using one or more uplink component frequency bands, the communication control method comprising:

beforehand allocating periodic physical uplink control channels (PUCCHs) to transmit a channel quality indicator indicative of channel quality for each of the downlink component frequency bands; and receiving a signal including the channel quality indicator of a downlink component frequency band of the highest priority selected based on information indicative of priorities for each of the downlink component frequency bands, in case that a plurality of beforehand allocated periodic PUCCHs occur in the same UL subframe, wherein, an UL subframe where each periodic PUCCH of the plurality of periodic PUCCHs occurs is determined based on the cycle of the UL subframe and the position of the UL subframe where an occurrence of the periodic PUCCH has started.

13. The communication control method according to claim 12, further comprising:

setting the priorities for each of the downlink component frequency bands.

14. An integrated circuit used in a mobile station apparatus that is configured to receive signals transmitted from a base station apparatus using a plurality of downlink component frequency bands each having a beforehand determined frequency bandwidth, constructing a series of functions in chip the functions comprising:

generating a channel quality indicator indicative of channel quality in response to each of the downlink component frequency bands;

selecting a particular periodic physical uplink control channel (PUCCH) in case that a plurality of periodic PUCCHs, which are beforehand allocated from the base station apparatus to transmit the channel quality indicator for each of the downlink component frequency bands, occur in the same UL subframe, wherein, an UL subframe where each periodic PUCCH of the plurality of periodic PUCCHs occurs is determined based on the cycle of the UL subframe and the position of the UL subframe where an occurrence of the periodic PUCCH has started; and arranging the generated channel quality indicator in the selected periodic PUCCH to transmit to the base station apparatus.

15. An integrated circuit used in a mobile station apparatus that is configured to receive signals transmitted from a base station apparatus using a plurality of downlink component frequency bands, constructing a series of functional processing in chip form, the processing comprising:

selecting a channel quality indicator of a downlink component frequency band of the highest priority based on information indicative of priorities for each of the downlink component frequency bands in case that a plurality of periodic physical uplink control channels (PUCCHs), each of which is beforehand allocated from the base station apparatus to transmit the channel quality indicator indicative of channel quality for each of the downlink component frequency bands, occur in the same UL subframe, wherein, an UL subframe where each periodic PUCCH of the plurality of periodic PUCCHs occurs is determined based on the cycle of the UL subframe and the position of the UL subframe where an occurrence of the periodic PUCCH has started; and transmitting a signal including the selected channel quality indicator of the downlink component frequency band to the base station apparatus.

16. An integrated circuit used in a base station apparatus which is configured to transmit signals to a mobile station apparatus using a plurality of downlink component frequency bands each having a beforehand determined frequency bandwidth, and is configured to receive a signal transmitted from the mobile station apparatus using one or more uplink component frequency bands each having a beforehand determined frequency bandwidth, constructing a series of functional processing in chip form, the processing comprising:

beforehand allocating periodic physical uplink control channels (PUCCHs) to transmit a channel quality indicator indicative of channel quality for each of the downlink component frequency bands; and receiving a signal including the channel quality indicator that is arranged and transmitted in a particular periodic PUCCH in case that a plurality of beforehand allocated periodic PUCCHs occur in the same UL subframe, wherein, an UL subframe where each periodic PUCCH of the plurality of periodic PUCCHs occurs is determined based on the cycle of the UL subframe and the position of the UL subframe where an occurrence of the periodic PUCCH has started.

17. An integrated circuit used in a base station apparatus which is configured to transmit signals to a mobile station apparatus using a plurality of downlink component frequency bands, and is configured to receive a signal transmitted from the mobile station apparatus using one or more uplink component frequency bands, constructing a series of functional processing in chip form, the processing comprising:

beforehand allocating periodic physical uplink control channels (PUCCHs) to transmit a channel quality indicator indicative of channel quality for each of the downlink component frequency bands; and receiving a signal including a channel quality indicator of a downlink component frequency band of the highest priority selected based on information indicative of priorities for each of the downlink component frequency bands in case that a plurality of beforehand allocated periodic PUCCHs occur in the same UL subframe, wherein, an UL subframe where each periodic PUCCH of the plurality of periodic PUCCHs occurs is determined based on the cycle of the UL subframe and the position of the UL subframe where an occurrence of the periodic PUCCH has started.

18. The integrated circuit according to claim 17, constructing a series of functional processing in chip form, the processing further comprising:

setting the priories for each of the downlink component frequency bands.

\* \* \* \* \*